US005554208A

United States Patent [19]
Mullhaupt et al.

[11] Patent Number: 5,554,208
[45] Date of Patent: Sep. 10, 1996

[54] ENHANCED GAS SEPARATIONS AND ZEOLITE COMPOSITIONS THEREFOR

[75] Inventors: Joseph T. Mullhaupt, Williamsville; Paula C. Stephenson, East Amherst, both of N.Y.

[73] Assignee: Praxair Technology, Inc., Danbury, Conn.

[21] Appl. No.: 511,847

[22] Filed: Aug. 7, 1995

Related U.S. Application Data

[62] Division of Ser. No. 165,876, Dec. 14, 1993, Pat. No. 5,441,557.

[51] Int. Cl.⁶ ................................ B01D 53/047
[52] U.S. Cl. ................ 95/96; 95/130; 95/902; 96/133; 502/79
[58] Field of Search ............... 95/95, 96, 130, 95/138, 142, 902; 96/108, 121, 133; 502/60, 79

[56] References Cited

U.S. PATENT DOCUMENTS

| | | | |
|---|---|---|---|
| 4,481,018 | 11/1984 | Coe et al. | 95/130 |
| 4,544,378 | 10/1985 | Coe et al. | 95/130 |
| 4,557,736 | 12/1985 | Sircar et al. | 55/62 |
| 4,859,217 | 8/1989 | Chao | 55/68 |
| 4,925,460 | 5/1990 | Coe et al. | 55/25 |
| 4,943,304 | 7/1990 | Coe et al. | 95/130 |
| 5,152,813 | 10/1992 | Coe et al. | 55/26 |
| 5,174,979 | 12/1992 | Chao et al. | 423/715 |
| 5,258,058 | 11/1993 | Coe et al. | 95/130 X |
| 5,258,060 | 11/1993 | Gaffney et al. | 95/130 X |
| 5,266,102 | 11/1993 | Gaffney et al. | 95/103 |
| 5,268,023 | 12/1993 | Kirner | 95/103 |
| 5,413,625 | 5/1995 | Chao et al. | 95/130 X |

*Primary Examiner*—Robert Spitzer
*Attorney, Agent, or Firm*—Alvin H. Fritschler

[57] ABSTRACT

Pressure swing adsorption of air and other gas separation operations are carried out using specific preferred zeolite adsorbent compositions based on the symmetry of the framework atoms and cations therein. Specific $SiO_2/Al_2O_3$ and cation/cation ratios for enhanced performance are identified. LiX adsorbent having a silica to alumina ratio on the order of 2.364 provides enhanced PSA performance.

15 Claims, 33 Drawing Sheets

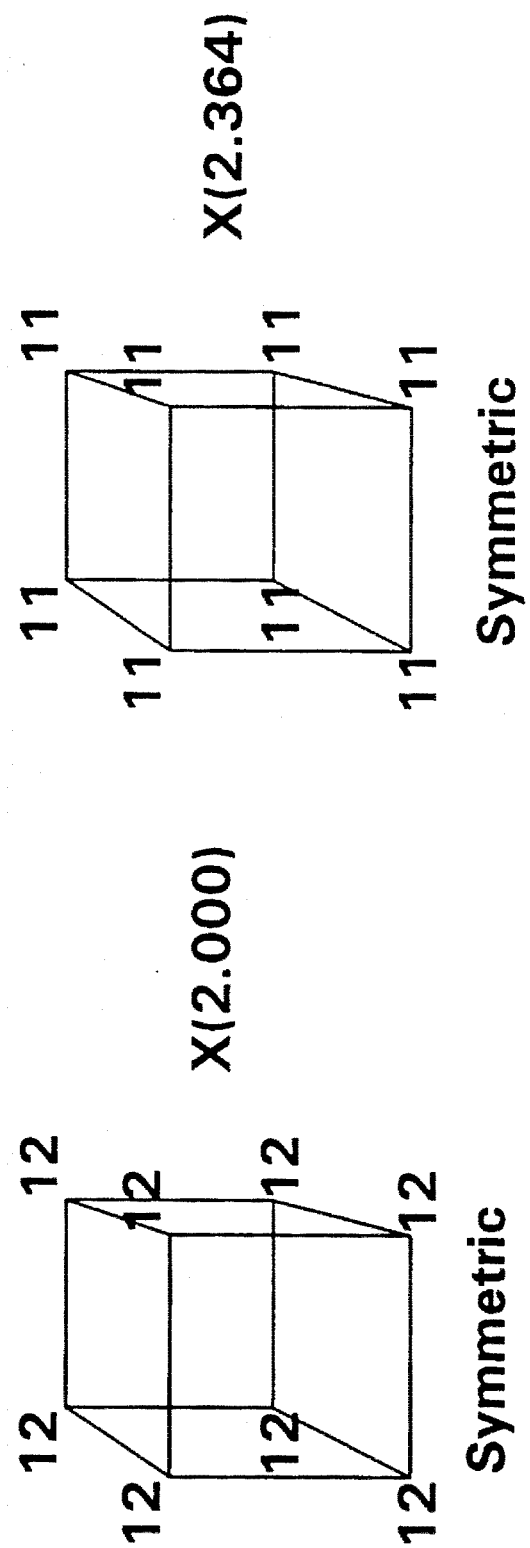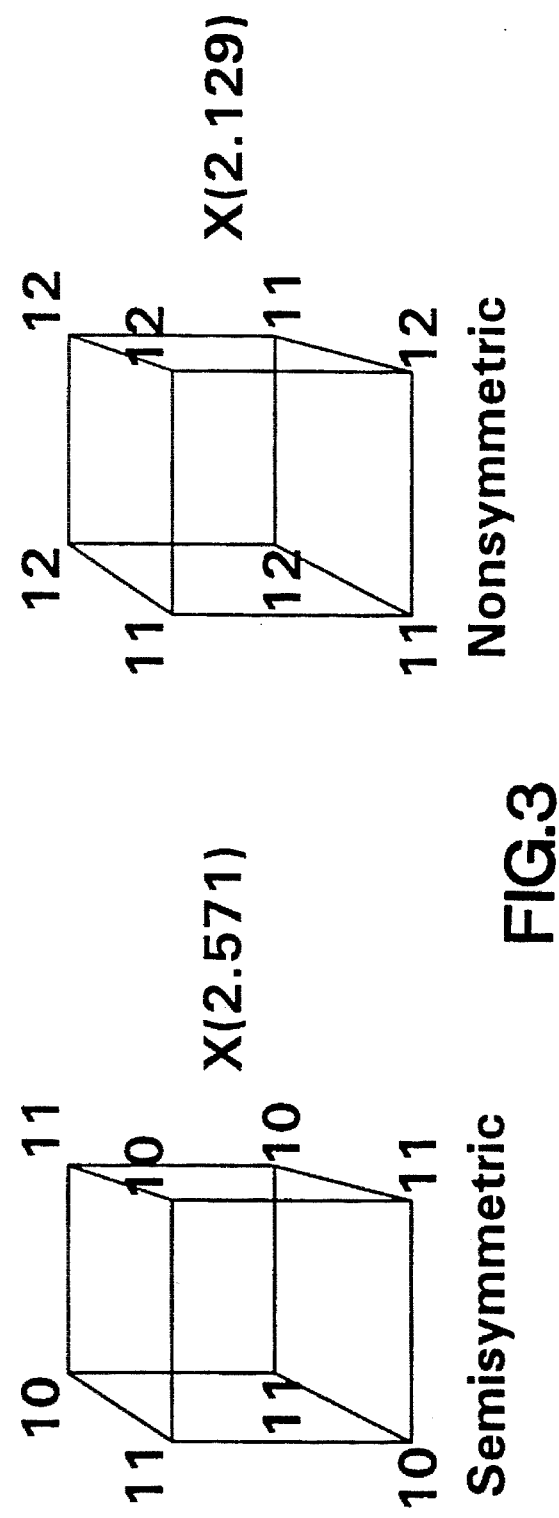
FIG. 3

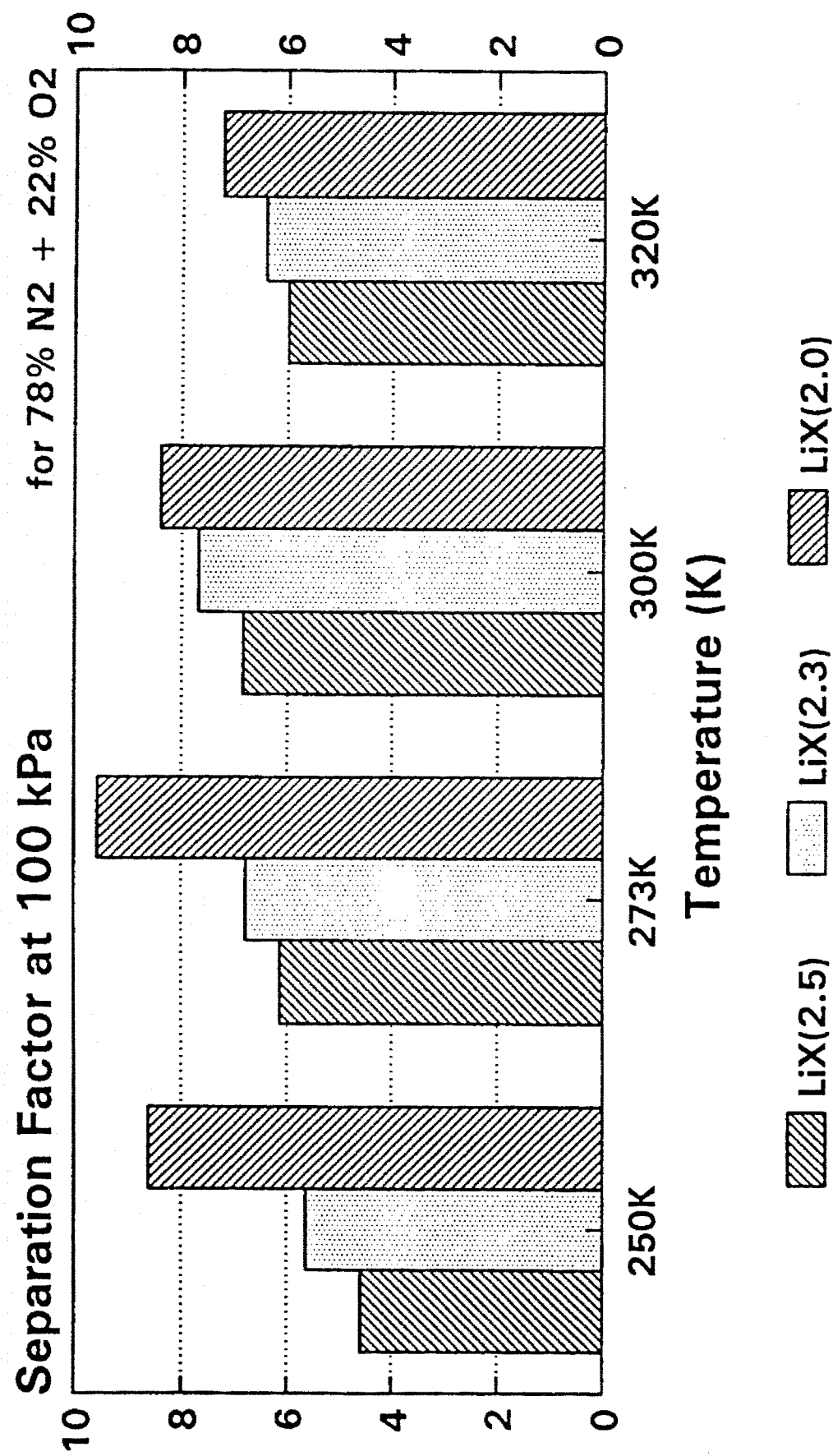

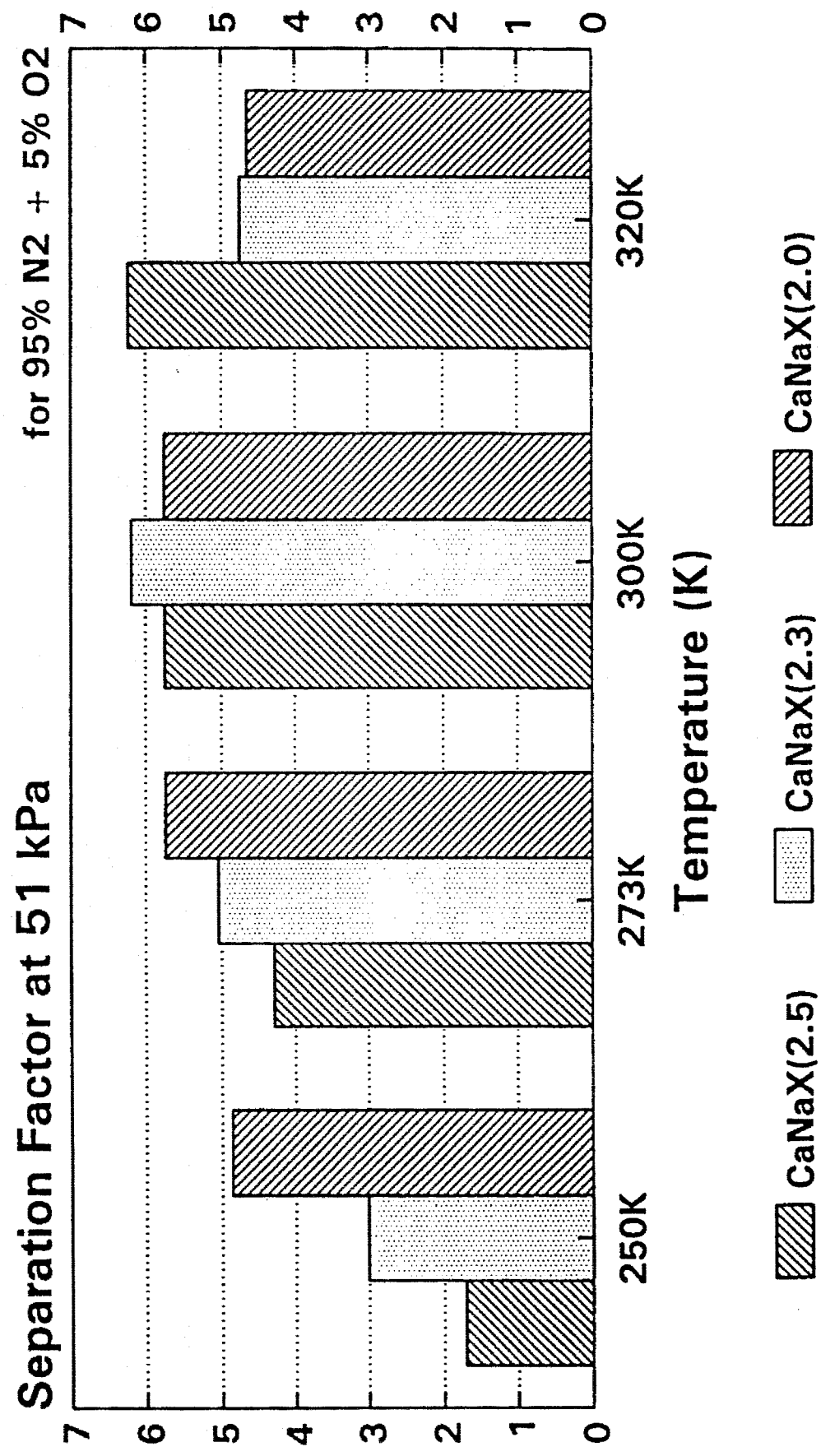

ENHANCED GAS SEPARATIONS AND ZEOLITE COMPOSITIONS THEREFOR

This application is a Division of prior U.S. application: Ser. No. 08/165,876 Filing Date Dec. 14, 1993, now U.S. Pat. No. 5,441,557.

BACKGROUND OF THE INVENTION

1. Field of the Invention

The invention relates to gas separation operations. More particularly, it relates to enhanced air and other gas separation operations using preferred zeolitic adsorbents.

2. Description of the Prior Art

For a wide variety of commercial applications in which cryogenic air separation plants may not be economically feasible, pressure swing adsorption (PSA) systems are particularly suitable. For example, PSA systems have been used to supply high purity oxygen for various applications, such as chemical processing, steel mills, paper mills, and lead and gas production operations.

In PSA processing, a feed gas mixture, such as air, containing a more readily adsorbable component and a less readily adsorbable component, e.g., the nitrogen and oxygen components of air, is passed to the feed end of an adsorbent bed capable of selectively adsorbing the more readily adsorbable component at an upper adsorption pressure. The less readily adsorbable component, e.g., oxygen, passes through the bed and is recovered from the discharge end of the bed. Thereafter, the bed is depressurized to a lower desorption pressure for desorption of the more readily adsorbable component, and its removal from the feed end of the bed prior to the introduction of additional quantities of the feed gas mixture for repressurization of the bed and adsorption of the more readily adsorbable component as cyclic adsorption-desorption-repressurization operations are continued in the bed.

Such PSA processing is commonly carried out in multi-bed adsorption systems, with each bed employing the PSA processing sequence on a cyclic basis interrelated to the carrying out of the processing sequence in the other beds of the adsorption system. In PSA systems for the recovery of high purity oxygen product as the less readily adsorbable component of air, each adsorbent bed will commonly contain an adsorbent material capable of selectively adsorbing nitrogen as the more readily adsorbable component, with the selectively adsorbed nitrogen being subsequently desorbed and recovered from the feed end of the bed upon reduction of the pressure of the bed from the upper adsorption pressure to a lower desorption pressure level. PSA systems for the recovery of nitrogen product have likewise been based on the use of adsorbents that selectively adsorb nitrogen from air as the more readily adsorbable component thereof, although other PSA-nitrogen processes are based on the use of oxygen-selective adsorbents, such as various carbon adsorbent materials.

Early PSA air separation systems utilized two or three beds, with well known molecular sieves, e.g., 13X zeolite molecular sieve material, being used as the adsorbent therein. Such zeolitic molecular sieve material, and other such materials, e.g., 5A zeolite molecular sieve material, capable of selectively adsorbing nitrogen from air are equilibrium type adsorbents. In the use of such adsorbents, an adsorption front of the selectively adsorbed nitrogen is formed at the feed end of the bed, and advances toward the discharge, or oxygen product, end of the bed as a result of equilibrium conditions established in the bed of zeolite molecular sieve material between the more readily adsorbable nitrogen and the less readily adsorbable oxygen component of feed air.

While conventional zeolite molecular sieves can be used in PSA operations, specially modified materials can also be employed for improved performance, such as for the improved adsorption of nitrogen from feed air, and the recovery of oxygen or nitrogen as the desired product gas. Thus, the lithium cation forms of conventional zeolite X have been developed for use in PSA processing. Such lithium, i.e., LiX, adsorbent is found to exhibit a highly desirable capacity and selectivity for the adsorption of nitrogen from feed air or other streams containing less polar or less polarizable molecular species, such as oxygen.

LiX adsorbent materials proposed for PSA processing operations are the lithium cation forms of zeolite in which the framework $SiO_2/Al_2O_3$ molar ratio is from about 2.0 to about 3.0, preferably from 2.0 to 2.5, and in which at least about 88%, preferably at least 90%, more preferably at least 95%, of the $AlO_2$-tetrahedral units are associated with lithium cations. The nitrogen adsorption properties of such highly exchanged forms of LiX were not predictable from the results obtainable using LiX materials in which 86 equivalent percent or less of the cations are lithium and the remainder are principally sodium ions. Such highly exchanged LiX materials are further described in the Chao patent, U.S. Pat. No. 4,859,217, which recognized that high lithium exchange was required for high nitrogen selectivity and that a 99% LiX (2.0) material had a higher nitrogen capacity than a 99% LiX (2.5) material, although no explanation was provided for this circumstance.

In the Coe patent, U.S. Pat. No. 4,481,018, it is disclosed that mixed cation-exchanged X zeolites and faujasites having a Si/Al ratio of about 1.0 to 1.2 (corresponding to a $SiO_2/Al_2O_3$ ratio of about 2.0 to 2.5) can be used for the separation of nitrogen from gas mixtures. The patent teaches a range of $SiO_2/Al_2O_3$ ratios and cation compositions for improved gas separations, but does not specify exact $SiO_2/Al_2O_3$ ratios or cation compositions that will result in superior selectivities for the more readily adsorbable component of the feed mixture. Likewise, the patent does not recognize or teach which structural or compositional features will control selectivity in these adsorbent materials.

Sircar et al., U.S. Pat. No. 4,557,736, have described the use of calcium/strontium-exchanged X zeolites as improved adsorbents. The $SiO_2/Al_2O_3$ ratios for enhanced performance are not specified, but ranges are given for calcium, strontium and sodium cation levels. The resulting materials were reported to have higher nitrogen adsorption capacities, lower heats of nitrogen adsorption and improved selectivities relative to non-exchanged precursors.

Lithium exchange was also disclosed in the Coe patent, U.S. Pat. No. 4,925,460, which relates to lithium-exchanged chabazites for air separation. The patent specifies a Si/Al ratio of 2.1–2.8 (corresponding to a $SiO_2/Al_2O_3$ ratio of 4.2–5.6), and a range of lithium exchange levels equal to, or greater than, 65%. Calcium-exchanged chabazites for gas separation are described in the Coe et al. patent, U.S. Pat. No. 4,943,304, which relates to the separation of minor components from bulk gases, and not to air separation or air purification applications. A Si/Al ratio of 1.9–2.3 is disclosed, as well as a special composition of Si/Al ratio=2, cation siting=1, and a cation distribution =1. Both the framework Si/Al ratio and the cations' position and distribution were said to affect the nitrogen adsorption properties of the adsorbent, but the relationship between the Si/Al ($SiO_2/Al_2O_3$) ratio and cation composition to adsorbent sample selectivity, i.e., the composition and/or structure of preferred adsorbent compositions, was not recognized in said patent.

The Coe patent, U.S. Pat. No. 4,544,378, teaches that mixed cation forms of X-type faujasites are advantageous for air separation purposes. Separation factors, determined by a gas chromatography method, are shown to be related to levels of cation exchange and adsorbent sample activation conditions. While higher selectivities are attributed to higher levels of cation exchange in an X (2.5) zeolite, no connection is made to specific compositions or framework structures for enhancing the selective adsorption characteristics of the mixed cation forms of X-type faujasites.

The advantages of mixed cation zeolites for air separation applications have also been recognized in two recently issued patents. Chao, U.S. Pat. No. 5,174,979, teaches the use of lithium/alkaline with metal zeolites of the X and A framework structures. $SiO_2/Al_2O_3$ ratios of about 1.85–3.0 were disclosed for X structures, and ratios of about 1.85–4.0 were disclosed for A structures. For lithium/alkaline earth metal X zeolites, cation ratios of about 95:5–50:50 are disclosed, while cation ratios of about 10:90–70:30 are disclosed for lithium/alkaline earth A zeolites. The Coe patent, U.S. Pat. No. 5,152,813, discloses the use of exchanged X zeolites with a Si/Al ratio of equal or less than 1.5 ($SiO_2/Al_2O_3$ ratio of equal or less than 3.0), having at least binary exchange of lithium and calcium and/or strontium, with preferable ratios of 5–50% calcium and/or strontium ions and 50–90% lithium ions. As with previous disclosures referred to above, these two patents claim ranges of Si/Al ($SiO_2/Al_2O_3$) ratios and cation concentrations, but do not teach specific combinations of framework and cation compositions for the achieving of enhanced performance of zeolites in PSA gas separation operations.

While the art has thus made significant progress in the development of special adsorbents to improve air separation and other PSA gas separation operations, there is a need for further improvement in the adsorbent field. In particular, there is a need to develop PSA air and other gas separation operations utilizing specific preferred zeolite compositions to better satisfy the ever-increasing requirements of a variety of industrial applications for the desirable pressure swing adsorption technology. Such specific preferred zeolite compositions employed in such enhanced PSA gas separation operations will enable enhanced selectivities for the more readily adsorbable component to be achieved, and lower cost zeolite adsorbent compositions to be considered, so as to achieve substantial savings in the operation of practical commercial PSA systems.

It is an object of the invention, therefore, to provide enhanced PSA processing operations and special adsorbents for use therein.

It is another object of the invention to provide enhanced performance in PSA air and other gas separation operations using preferred zeolite adsorbents.

It is a further object of the invention to provide specific combinations of framework and cation compositions capable of superior zeolite performance in PSA gas separation operations.

With these and other objects in mind, the invention is hereinafter described in detail, the novel features thereof being particularly pointed out in the appended claims.

SUMMARY OF THE INVENTION

Enhanced PSA air and other gas separation operations are carried out using specific zeolite adsorbent compositions determined based on the symmetry of the framework atoms and cations included in the adsorbent structure. Adsorbents determined by such symmetry are found to have specific $SiO_2/Al_2O_3$ and cation/cation ratios. Such compositions have superior equilibrium selectivities over those of neighboring compositions in the desired PSA and other gas separation operations.

BRIEF DESCRIPTION OF THE DRAWING

The invention is hereinafter described in detail with reference to the accompanying drawings in which:

FIG. 3 is a schematic representation of symmetric, semi-symmetric and nonsymmetric β-cage Al distributions in a unit cell of a zeolite adsorbent structure;

FIG. 5d is a chart illustrating the nitrogen selectivity of said three framework compositions at different recited operating conditions;

FIG. 7c is a chart illustrating the nitrogen selectivity of said adsorbents at different recited operating conditions;

DETAILED DESCRIPTION OF THE INVENTION

Figure 1:
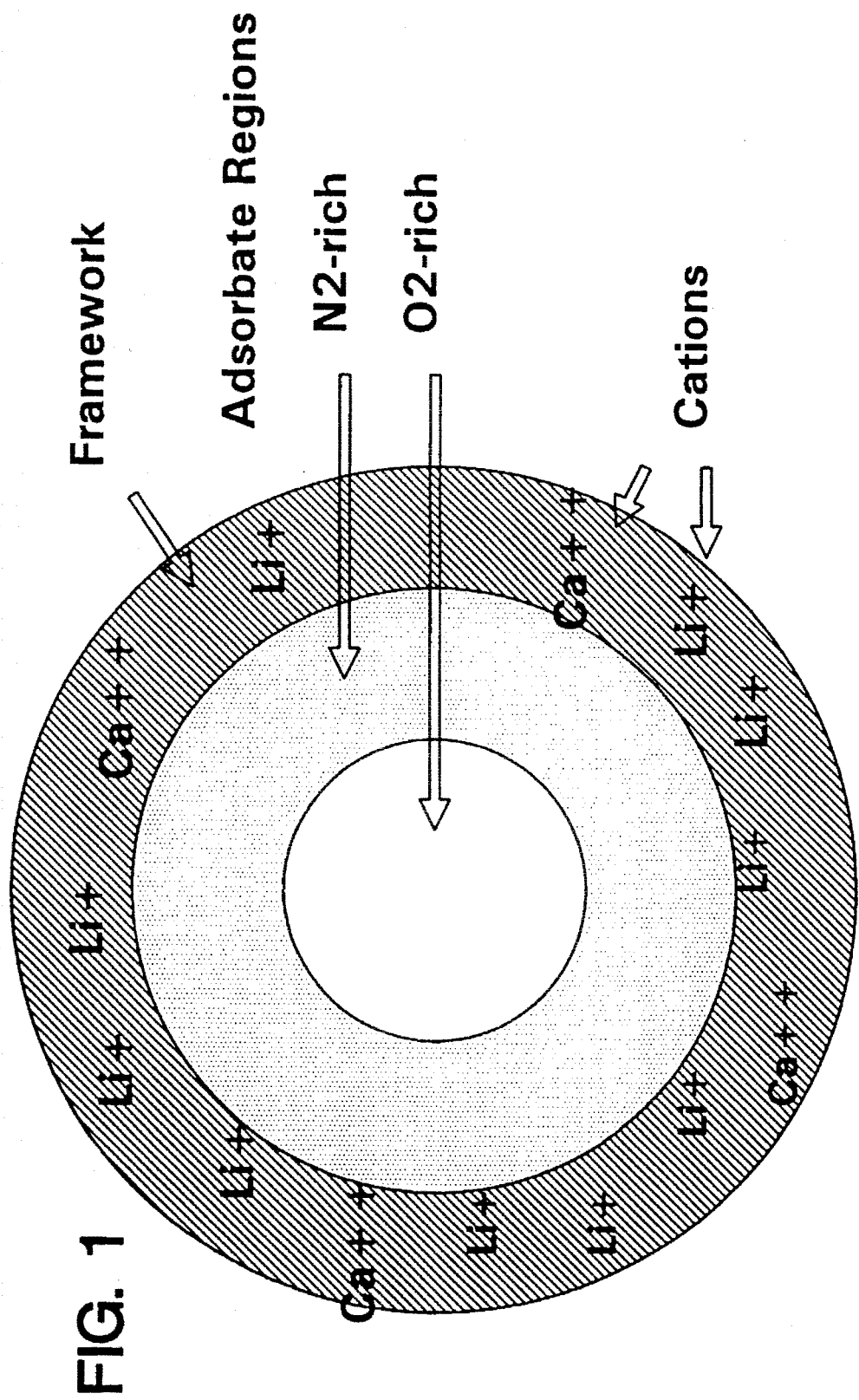
FIG. 1 is a schematic drawing illustrating a symmetric zeolite composition.

The objects of the invention are accomplished by the discovery that PSA air and other gas separation operations can be enhanced using a pattern of preferred compositions for zeolitic adsorbents. This pattern is manifest in symmetrical considerations for framework structures and cation compositions of zeolites that can be used to identify preferred zeolite compositions for applications in gas separation, particularly air separation and air purification applications. As a result, specific $SiO_2/Al_2O_3$ and cation/cation ratios can readily be identified within the broad ranges disclosed in the prior art efforts to develop special adsorbents for PSA operations.

It has been known that lower $SiO_2/Al_2O_3$ ratios lead to more cations in an adsorbent structure, and, hence, higher nitrogen capacities. However, the relationship between framework symmetry and selectivity has not heretofore been understood in the art. While it has been shown in the art that cation exchange, particularly at high exchange levels, can lead to higher nitrogen capacities, and in some cases to higher selectivities for the more readily adsorbable component of a gas mixture, specific cation compositions of superior performance have not been discovered.

In the practice of the invention, the specific zeolite framework and cation compositions that will exhibit higher equilibrium selectivities than those of neighboring compositions can readily be determined. The use of such preferred zeolite compositions, providing technical and economic advantages in gas separation operations, is facilitated as the discovered pattern referred to above enables the specific preferred compositions to be determined without undue experimentation, and further enables lower cost zeolite compositions to be evaluated for any given gas separation application. Both of these features can result in substantial cost savings with respect to practical commercial PSA air or other gas separation operations.

The pattern of preferred compositions referred to above can be summarized as set forth below:

For zeolites of single or highly exchanged cation compositions:

1. Symmetric framework compositions will show higher equilibrium selectivities than neighboring non-symmetric framework structures.

2. Semisymmetric framework compositions will show higher equilibrium selectivities than neighboring non-symmetric framework structures.

3. Symmetric framework compositions will show higher equilibrium selectivities than neighboring semisymmetric framework structures.

For zeolites of mixed cation compositions:

1. Symmetric framework compositions with symmetric cation compositions will show higher equilibrium selectivities than neighboring symmetric framework compositions with non-symmetric cation compositions.

2. Semisymmetric framework compositions with semisymmetric cation compositions will show higher equilibrium selectivities than neighboring semisymmetric framework compositions with non-symmetric cation compositions.

3. For the same framework composition, symmetric cation compositions will show higher equilibrium selectivities than neighboring semisymmetric cation compositions.

In order for the pattern of preferred compositions to be fully utilized in determining relative selectivities of various zeolite adsorbents for a particular application, comparisons should be limited to monovalent-monovalent vs. monovalent-monovalent, and divalent-divalent vs divalent-divalent, and monovalent-divalent vs monovalent-divalent comparisons.

The design principles for selecting and modifying zeolites to separate air are guided by certain general rules. In the case of equilibrium nitrogen-selective zeolites, structures having large pore volumes and large free pore diameters that are easy to produce are desired. Zeolite types A(LTA) and X(FAU) are desirable. To achieve higher nitrogen loadings, numerous exposed cations are also desired. In type X adsorbents, this implies low $SiO_2/Al_2O_3$ ratios (limit=2.0). For single cation forms, cations with higher effective charge-to-radius ratios are preferred, so that $Li^+$ is better than either $Na^+$ or $Ca^{++}$. Mixed cation forms, e.g. CaLiX, can offer advantages to either of the end members. Such general rules are based on after-the-fact observations, and do not address questions about oxygen loadings, selectivity, and temperature effects. In addition, there is no basis in such general rules for selecting particular mixed cation compositions. Also, the rules are qualitative and need to be tested in the laboratory on a case-by-case basis. In order to advance the art, it is important to determine the relationships between structure and composition in zeolites, and their impact on adsorptive separations. The discovery of the invention addresses this need in the art.

β-Cages in Zeolites A, X and Y

The structures of A, X and Y materials can be described in terms of β-cages, which are truncated octahedral arrays of tetrahedrally coordinated T-atoms, each bound to 4 oxygen atoms. Each β-Cage contains 24 T-atoms, either Al or Si for the zeolites of interest herein. The β-cages are attached to one another by groups of 4 O-atoms in A structures or of 6 in X or Y structures. The resulting β-cage networks define three-dimensional microporous systems of roughly spherical volumes called α-cages in A and "supercages" in X or Y structures. The latter are larger than the β-cages and are accessible through "windows" formed by rings of O-atoms. Adsorption of gases at pressures of interest for PSA operations occur in the α-cages or supercages.

The true unit cells of A(LTA) and of X and Y(FAU) each contain 8 β-cages, each of which is associated with an α-Cage or a supercage. In A type adsorbents, the β-cages are octahedrally coordinated, and the α-cages (free diameters= 11.4Å) have 6 windows with free diameters of 4.1Å. In X and Y structures, the β-cages are tetrahedrally coordinated, and the supercages (free diameter=11.8Å) have 4 windows with free diameters of 7.4 Å.

Distribution of Al atoms in Unit Cells

The zeolites of interest for adsorptive gas separations consist of interlinked chains of alternating T- and O-atoms, for example: —O—Si—O—Si—O—Al—O—Si—Al—O—Si—O—Al—O. The number of Al atoms per unit cell in A, X and Y is given by:

$$N_{Al}=192/(1+R_{Si/Al}),$$

where "$R_{Si/Al}$" is the mole ratio of Si to Al atoms, as well as ½ the $SiO_2/Al_2O_3$ ratio. Note that "$N_{Al}$" decreases as "$R_{Si/Al}$" increases. The theoretical lower limit for the $SiO_2/Al_2O_3$ ratio=2, which is a consequence of the empirical Lowenstein's Rule. This rule states that the distribution of Al in the chain —O—$T_i$—O—$T_j$—O— must be such that $T_i$ and $T_j$ cannot both be Al atoms.

Arrangement of Exchangeable Atoms

Each Al atom in the framework is associated with a net unit negative charge. To preserve electron neutrality in a unit cell with "$N_{Al}$" Al atoms, nonframework cations are present according to: $N_{Al}=\Sigma[(n_{monovalent})+(2*n_{divalent})+(3*n_{trivalent})+...]$, where $n_{monovalent}$, $n_{divalent}$, $n_{trivalent}$ ... are the number of cations with the indicated valence in the unit cell.

For each structure, the cations occupy crystallo-graphically distinct sites on or within the β-cages or the interconnections. In X and Y, the number of cation sites ≧ number of cations. The various types of sites have different energies, which control the equilibrium distribution of cations among them. The problem of locating all of the cations in a singly exchanged X or Y has not been resolved, and even less is known about the locations of mixed cations. Some sites are within the structure so that cation size is important as well as the identity and charge.

In type A zeolites, the cations occupy sites in the center of the six-membered rings of the β-cages (64 per true unit cell), as well as sites in the windows of the α-cages. When there are more than 64 Al-atoms per unit cell ($SiO_2/Al_2O_3$<4.00), there may be cations occupying sites in the windows. For example, monovalent ions such as $Na^+$ and $K^+$ (alone or in combination) in such sites may impede transport of $N_2$ relative to $O_2$ under some experimental conditions, leading to rate selectivity. The equilibrium selectivity of the invention is distinguished from such pore restriction effects.

Model for Adsorption in zeolites

Basic Features

The zeolites of interest for equilibrium-selective adsorptive separations all contain microporous networks like those described above for the LTA and FAU topologies. In activated zeolites the gases are adsorbed in the α-cages or their analogs. The total pore volume is a rough measure of the adsorptive capacity so that large values are desirable. The effects of the shape of the α-cages or their analogs has not yet been determined. Those in A, X and Y are roughly spherical, while those in mordenite and chabazite are approximately cylindrical.

For air separation in $N_2$-selective zeolites, the nitrogen capacity is related to the number of exposed cations, which, in turn, is controlled by the $SiO_2Al_2O_3$ ratio. Cations for air separation have usually been selected from the alkali or alkaline earth elements, either singly or as mixed cations. Some of these cations have desirably high values of electrostatic field potential "$z*e/r$", the ratio of effective charge to radius. These cations also possess convenient chemical properties for synthesis and ion exchange. In X and Y, the smaller cations can fit in the shielded site I locations. Larger ones can occupy the shielded site I' positions. The relatively exposed positions are sites II, II' and III.

The adsorption of gas molecules is attributed to the interaction of the molecular properties of the gases with the fields produced by the cations. The framework atoms and their distributed negative charge also contribute to adsorption, but the separation is associated with differences in the molecule-cation interactions. In the case of air separation, the molecular properties of polarizability and electronic quadrupole moment are important. The polarizability of $N_2$ is about 10% larger than that of $O_2$, while the quadrupole moment of $N_2$ is 3.68 times that for $O_2$. The selectivity for $N_2$ is attributed to larger contributions to the adsorption energy for $N_2$ than for $O_2$ for the following electrostatic interactions: cation field with polarizability and cation field gradient with quadrupole moment. Until now, the focus of attention has been on interactions localized at one α-cage or supercage.

Implications for Separation

The equilibrium adsorption properties of types A and X in various cation forms for $N_2$, $O_2$ and their mixtures, can be expressed in different ways to reflect both the usefulness for separation and the adsorptive interactions from which this utility arises. One simple and convenient set of characteristic properties comprises $\Delta N_2$ loadings, selectivities at feed and desorption pressures, and the enthalpies of adsorption. It will be appreciated that these can be readily calculated from pure gas isotherms for selected process conditions.

This set forms a convenient bridge between isotherm data and process parameters, such as bed size factor, power recovery and purity. For example, the bed size factor is related to the $\Delta N_2$ loading, which is, in turn, controlled by the isotherm shape and the number and type of exposed cations. Power and recovery are related to the separation factors for the feed and desorption conditions, which are, in turn, controlled by the competitive adsorption of $N_2$ and $O_2$.

Competitive adsorption has been addressed in numerous theories, one of the earliest and most useful being the Loading Ratio Correlation. This formulation for mixed adsorption takes the view of the Langmuir isotherm. In it, $N_2$ and $O_2$ compete for a fixed number of adsorption sites, which have been identified in most theories as the exposed cations themselves. In the invention herein described and claimed, a much broader view, based on the unit cell, has been formed to identify symmetrical framework and cation compositions that possess higher selectivities than nonsymmetrical ones.

Discovery

Symmetrical Framework Compositions

Table 1 below recites a result of the study of the framework compositions for the unit cells of A, X and Y in terms of the number of Al atoms in the β-cages, in which the Al-atoms have been replaced by Si-atoms, one at a time, sequentially, in the 8 β-cages. The corresponding $SiO_2/Al_2O_3$ ratios are shown in the Table, starting from 2.000. Different structures span different ranges of $\Re=SiO_2/Al_2O_3$ ratio: (1) for A, $2.0<\Re<4.0$; (2) for X, $2.0<\Re<3.0$; and (3) for Y, $~3.0<\Re<~5.0$ and for high silica FAU structures, $~5.0<\Re$. Even though the space groups for A and X are different, they are both cubic and both have 8 β-cages in their respective unit cells.

TABLE 1

| Beta Cages in the Unit Cell | | | | | | | | No. Al Ions | Si/Al Ratio | $SiO_2/Al_2O_3$ Ratio |
|---|---|---|---|---|---|---|---|---|---|---|
| #1 | #2 | #3 | #4 | #5 | #6 | #7 | #8 | | | |
| Distribution of Al Atoms in the Zeolite Framework | | | | | | | | | | |
| 12 | 12 | 12 | 12 | 12 | 12 | 12 | 12 | 96 | 1.000 | 2.000 |
| 11 | 12 | 12 | 12 | 12 | 12 | 12 | 12 | 95 | 1.021 | 2.042 |
| 11 | 11 | 12 | 12 | 12 | 12 | 12 | 12 | 94 | 1.043 | 2.085 |
| 11 | 11 | 11 | 12 | 12 | 12 | 12 | 12 | 93 | 1.065 | 2.129 |
| 11 | 11 | 11 | 11 | 12 | 12 | 12 | 12 | 92 | 1.087 | 2.174 |
| 11 | 11 | 11 | 11 | 11 | 12 | 12 | 12 | 91 | 1.110 | 2.220 |
| 11 | 11 | 11 | 11 | 11 | 11 | 12 | 12 | 90 | 1.133 | 2.267 |
| 11 | 11 | 11 | 11 | 11 | 11 | 11 | 12 | 89 | 1.157 | 2.315 |
| 11 | 11 | 11 | 11 | 11 | 11 | 11 | 11 | 88 | 1.182 | 2.364 |
| 10 | 11 | 11 | 11 | 11 | 11 | 11 | 11 | 87 | 1.207 | 2.414 |
| 10 | 10 | 11 | 11 | 11 | 11 | 11 | 11 | 86 | 1.233 | 2.465 |
| 10 | 10 | 10 | 11 | 11 | 11 | 11 | 11 | 85 | 1.259 | 2.518 |
| 10 | 10 | 10 | 10 | 11 | 11 | 11 | 11 | 84 | 1.286 | 2.571 |
| 10 | 10 | 10 | 10 | 10 | 11 | 11 | 11 | 83 | 1.313 | 2.627 |
| 10 | 10 | 10 | 10 | 10 | 10 | 11 | 11 | 82 | 1.341 | 2.683 |
| 10 | 10 | 10 | 10 | 10 | 10 | 10 | 11 | 81 | 1.370 | 2.741 |
| 10 | 10 | 10 | 10 | 10 | 10 | 10 | 10 | 80 | 1.400 | 2.800 |
| 9 | 10 | 10 | 10 | 10 | 10 | 10 | 10 | 79 | 1.430 | 2.861 |
| 9 | 9 | 10 | 10 | 10 | 10 | 10 | 10 | 78 | 1.462 | 2.923 |
| 9 | 9 | 9 | 10 | 10 | 10 | 10 | 10 | 77 | 1.494 | 2.987 |
| 9 | 9 | 9 | 9 | 10 | 10 | 10 | 10 | 76 | 1.526 | 3.053 |
| 9 | 9 | 9 | 9 | 9 | 10 | 10 | 10 | 75 | 1.560 | 3.120 |
| 9 | 9 | 9 | 9 | 9 | 9 | 10 | 10 | 74 | 1.595 | 3.189 |
| 9 | 9 | 9 | 9 | 9 | 9 | 9 | 10 | 73 | 1.630 | 3.260 |
| 9 | 9 | 9 | 9 | 9 | 9 | 9 | 9 | 72 | 1.667 | 3.333 |
| DISTRIBUTION OF AL IONS IN THE ZEOLITE FRAMEWORK | | | | | | | | | | |
| 8 | 9 | 9 | 9 | 9 | 9 | 9 | 9 | 71 | 1.704 | 3.408 |
| 8 | 8 | 9 | 9 | 9 | 9 | 9 | 9 | 70 | 1.743 | 3.486 |
| 8 | 8 | 8 | 9 | 9 | 9 | 9 | 9 | 69 | 1.783 | 3.565 |
| 8 | 8 | 8 | 8 | 9 | 9 | 9 | 9 | 68 | 1.824 | 3.647 |
| 8 | 8 | 8 | 8 | 8 | 9 | 9 | 9 | 67 | 1.866 | 3.731 |
| 8 | 8 | 8 | 8 | 8 | 8 | 9 | 9 | 66 | 1.909 | 3.818 |
| 8 | 8 | 8 | 8 | 8 | 8 | 8 | 9 | 65 | 1.954 | 3.908 |
| 8 | 8 | 8 | 8 | 8 | 8 | 8 | 8 | 64 | 2.000 | 4.000 |
| 7 | 7 | 7 | 7 | 7 | 7 | 7 | 7 | 56 | 2.429 | 4.857 |
| 6 | 6 | 6 | 6 | 6 | 6 | 6 | 6 | 48 | 3.000 | 6.000 |
| 5 | 5 | 5 | 5 | 5 | 5 | 5 | 5 | 40 | 3.800 | 7.600 |
| 4 | 4 | 4 | 4 | 4 | 4 | 4 | 4 | 32 | 5.000 | 10.000 |

For purposes of this invention, "symmetric framework compositions" are defined as those with an equal average number of the aluminum atoms per β-cage for all 8 in the true unit cell. These occur at intervals of 8 Al atoms replaced by Si-atoms, in the sequence of $SiO_2/Al_2O_3$=2.000, 2.364, 2.800, 3.333, 4.000, 4.857, 6.000, . . . , as shown in said Table 1. No attempt is made herein to account for the locations of the Al atoms in each β-cage, and order-disorder considerations arising from such siting are not addressed herein. "Semisymmetric framework compositions" are defined as those with an equal average number "m" of Al-atoms each in 4 of the β-cages of the true unit cell, and "m+1" Al atoms each in the other four β-cages of each true unit cell, where 8m±4 is the total number of aluminum atoms in the true unit cell. These also occur at intervals of 8 Al-atoms replaced by Si-atoms, but in the sequence of $SiO_2/Al_2O_3$ =2.174, 2.571, 3.053, 3.647, 4.400, 5.385, 6.727, . . . , as shown in said Table 1.

It will be understood that the properties to be attributed to the special compositions of the invention will apply to a relatively narrow range of composition values on either side of those given above. Thus, a range corresponding to the replacement of ±1 Al-atom with an Si-atom pertains. In Table 2 below, some symmetric and semi-symmetric framework compositions of special interest, together with lower and upper limits thereof, are shown.

TABLE 2

PREFERRED ZEOLITE FRAMEWORK $SiO_2/Al_2O_3$ RATIOS

| ZEOLITE TYPE | SYMMETRIC COMPOSITIONS | | | SEMISYMMETRIC COMPOSITIONS | | |
|---|---|---|---|---|---|---|
| | Low | Center | High | Low | Center | High |
| A (LTA) | (1.96) | 2.000 | 2.042 | | | |
| | | | | 2.129 | 2.174 | 2.220 |
| | 2.315 | 2.364 | 2.414 | | | |
| | | | | 2.518 | 2.571 | 2.627 |
| X (FAU) | (1.92) | 2.000 | 2.042 | | | |
| | | | | 2.129 | 2.174 | 2.220 |
| | 2.315 | 2.364 | 2.414 | | | |
| | | | | 2.987 | 3.053 | 3.120 |
| Y (FAU) | 3.260 | 3.333 | 3.408 | | | |
| | | | | 3.565 | 3.647 | 3.731 |
| | 3.908 | 4.000 | 4.095 | | | |
| | | | | 4.295 | 4.400 | 4.508 |
| | 4.737 | 4.857 | 4.982 | | | |
| | | | | 5.245 | 5.385 | 5.529 |
| High Silica X, Y (FAU) | 5.837 | 6.000 | 6.170 | | | |
| | | | | 6.533 | 6.727 | 6.930 |
| | 7.366 | 7.600 | 7.846 | | | |
| | | | | 8.378 | 8.667 | 8.971 |
| | 9.636 | 10.000 | 10.387 | | | |

Symmetrical Compositions:
Cations of a Single Type

"Symmetric" and "Semisymmetric" compositions for cations of a single type are defined, for purposes of this invention, in a manner analogous to symmetric framework compositions. For monovalent cations, the symmetric and semisymmetric compositions are those average values disclosed in Table 1, with upper and lower limits as shown in Table 2. As indicated above, limits have been defined by varying the cation composition ±1 cation from the ideal preferred compositions. Under these definitions, for divalent cations, there can be no symmetric values corresponding to odd number of Al-atoms per β-cage, nor can there by any semisymmetric compositions. The symmetric divalent cation compositions occur at intervals of 16 Al-atoms replaced by Si-atoms, in the sequence of $SiO_2/Al_2O_3$=2.000, 2.364, 2.800, 4.000, 6.000, . . . , as shown in Table 1 above.

Symmetrical Compositions:
Mixed Cations

"Symmetric mixed cation compositions" are defined, for each symmetric framework composition, as those corresponding to the same average number of either monovalent cations, divalent cations, or mixtures thereof, of each type in the various combinations thereof being distributed in each β-cage of the true unit cell. The numbers of cations of different types associated with a particular β-cage may be different one from another. As indicated above, no determination is made to account for the locations of the cations associated with each β-cage, and order-disorder considerations have not been made. "Semisymmetric binary cation compositions" are defined for each semisymmetric framework composition as those binary cation compositions for which: (1) all 8 β-cages have the same number of cations of one type, on the average, and (2) for the other cation type, "m" of monovalent cations, "m/2" of divalent cations, either separately or in combination of each type in the various combinations thereof being distributed in each of 4 of the 8 β-cages of the true unit cell, and "m±1" monovalent cations or "((m/2)+1)" divalent cations, either separately or in combination, with each type in the various combinations thereof being distributed in each of the other 4 β-cages, on the average, of the unit cell. Limits for both symmetric and semisymmetric mixed cation forms are set by varying the exchanged cation composition ±1 cation from the ideal preferred compositions.

There are several binary cation mixtures of special importance. Symmetric monovalent-monovalent compositions are presented in Table 3 below for $SiO_2/Al_2O_3$=2.000 and 2.364. Semisymmetric monovalent-monovalent compositions are presented in Table 4 below for $SiO_2/Al_2O_3$=2.571. The upper and lower limits for the values in Tables 3 and 4 are being presented in Table 5. Also shown in Table 5 are the semisymmetric monovalent-monovalent cation compositions with their respective upper and lower limits for the framework compositions $SiO2/Al_2O_3$=2.800, 3.053 and 3.333. Symmetric divalent-divalent compositions are shown in Table 6 for $SiO_2/Al_2O_3$=2.000; with upper and lower limits being shown in Table 7. Symmetric monovalent-divalent compositions are set out in Table 8 for said ratio $\Re$=2.000 and 2.364. Semisymmetric monovalent-divalent compositions are set out in Table 9 for $SiO_2/Al_2O_3$=2.571, with upper and lower limits being set out in Table 10.

TABLE 3

SYMMETRIC MIXED CATION COMPOSITIONS

| Charges | \#1 | \#2 | \#3 | \#4 | \#5 | \#6 | \#7 | \#8 | No. Cations | Equivalent Fraction |
|---|---|---|---|---|---|---|---|---|---|---|
| For Type X with $SiO_2/Al_2O_3$ = 2.000 ||||||||||
| Monovalent | 11 | 11 | 11 | 11 | 11 | 11 | 11 | 11 | 88 | 0.917 |
| Monovalent | 1 | 1 | 1 | 1 | 1 | 1 | 1 | 1 | 8 | 0.083 |
| Monovalent | 10 | 10 | 10 | 10 | 10 | 10 | 10 | 10 | 80 | 0.833 |
| Monovalent | 2 | 2 | 2 | 2 | 2 | 2 | 2 | 2 | 16 | 0.167 |
| Monovalent | 9 | 9 | 9 | 9 | 9 | 9 | 9 | 9 | 72 | 0.750 |
| Monovalent | 3 | 3 | 3 | 3 | 3 | 3 | 3 | 3 | 24 | 0.250 |
| Monovalent | 8 | 8 | 8 | 8 | 8 | 8 | 8 | 8 | 64 | 0.667 |
| Monovalent | 4 | 4 | 4 | 4 | 4 | 4 | 4 | 4 | 32 | 0.333 |
| Monovalent | 7 | 7 | 7 | 7 | 7 | 7 | 7 | 7 | 56 | 0.583 |
| Monovalent | 5 | 5 | 5 | 5 | 5 | 5 | 5 | 5 | 40 | 0.417 |
| Monovalent | 6 | 6 | 6 | 6 | 6 | 6 | 6 | 6 | 48 | 0.500 |
| Monovalent | 6 | 6 | 6 | 6 | 6 | 6 | 6 | 6 | 48 | 0.500 |
| For Type X with $SiO_2/Al_2O_3$ = 2.364 ||||||||||
| Monovalent | 10 | 10 | 10 | 10 | 10 | 10 | 10 | 10 | 80 | 0.909 |
| Monovalent | 1 | 1 | 1 | 1 | 1 | 1 | 1 | 1 | 8 | 0.091 |
| Monovalent | 9 | 9 | 9 | 9 | 9 | 9 | 9 | 9 | 72 | 0.818 |
| Monovalent | 2 | 2 | 2 | 2 | 2 | 2 | 2 | 2 | 16 | 0.182 |
| Monovalent | 8 | 8 | 8 | 8 | 8 | 8 | 8 | 8 | 64 | 0.727 |
| Monovalent | 3 | 3 | 3 | 3 | 3 | 3 | 3 | 3 | 24 | 0.273 |
| Monovalent | 7 | 7 | 7 | 7 | 7 | 7 | 7 | 7 | 56 | 0.636 |
| Monovalent | 4 | 4 | 4 | 4 | 4 | 4 | 4 | 4 | 32 | 0.364 |
| Monovalent | 6 | 6 | 6 | 6 | 6 | 6 | 6 | 6 | 48 | 0.545 |
| Monovalent | 5 | 5 | 5 | 5 | 5 | 5 | 5 | 5 | 40 | 0.455 |

TABLE 4

SEMISYMMETRIC MIXED CATION COMPOSITIONS

| Charges | \#1 | \#2 | \#3 | \#4 | \#5 | \#6 | \#7 | \#8 | No. Cations | Equivalent Fraction |
|---|---|---|---|---|---|---|---|---|---|---|
| For Type X with $SiO_2/Al_2O_3$ = 2.571 ||||||||||
| Monovalent | 9 | 9 | 9 | 9 | 10 | 10 | 10 | 10 | 76 | 0.905 |
| Monovalent | 1 | 1 | 1 | 1 | 1 | 1 | 1 | 1 | 8 | 0.095 |
| Monovalent | 8 | 8 | 8 | 8 | 9 | 9 | 9 | 9 | 68 | 0.810 |
| Monovalent | 2 | 2 | 2 | 2 | 2 | 2 | 2 | 2 | 16 | 0.190 |
| Monovalent | 7 | 7 | 7 | 7 | 8 | 8 | 8 | 8 | 60 | 0.714 |
| Monovalent | 3 | 3 | 3 | 3 | 3 | 3 | 3 | 3 | 24 | 0.286 |
| Monovalent | 6 | 6 | 6 | 6 | 7 | 7 | 7 | 7 | 52 | 0.619 |
| Monovalent | 4 | 4 | 4 | 4 | 4 | 4 | 4 | 4 | 32 | 0.381 |
| Monovalent | 5 | 5 | 5 | 5 | 6 | 6 | 6 | 6 | 44 | 0.524 |
| Monovalent | 5 | 5 | 5 | 5 | 5 | 5 | 5 | 5 | 40 | 0.476 |
| Monovalent | 4 | 4 | 4 | 4 | 5 | 5 | 5 | 5 | 36 | 0.429 |
| Monovalent | 6 | 6 | 6 | 6 | 6 | 6 | 6 | 6 | 48 | 0.571 |
| Monovalent | 3 | 3 | 3 | 3 | 4 | 4 | 4 | 4 | 28 | 0.333 |
| Monovalent | 7 | 7 | 7 | 7 | 7 | 7 | 7 | 7 | 56 | 0.667 |
| Monovalent | 2 | 2 | 2 | 2 | 3 | 3 | 3 | 3 | 20 | 0.238 |
| Monovalent | 8 | 8 | 8 | 8 | 8 | 8 | 8 | 8 | 64 | 0.762 |
| Monovalent | 1 | 1 | 1 | 1 | 2 | 2 | 2 | 2 | 12 | 0.143 |
| Monovalent | 9 | 9 | 9 | 9 | 9 | 9 | 9 | 9 | 72 | 0.857 |
| Monovalent | 0 | 0 | 0 | 0 | 1 | 1 | 1 | 1 | 4 | 0.048 |
| Monovalent | 10 | 10 | 10 | 10 | 10 | 10 | 10 | 10 | 80 | 0.952 |

TABLE 5

ZEOLITE MIXED CATION COMPOSITIONS
Monovalent-Monovalent Cation Combinations
(Equivalent Fraction of Second Cation)

| LOW | CENTER | HIGH | LOW | CENTER | HIGH | LOW | CENTER | HIGH |
|---|---|---|---|---|---|---|---|---|
| ($SiO_2/Al_2O_3$ = 2.000) ||| ($SiO_2/Al_2O_3$ = 2.364) ||| ($SiO_2/Al_2O_3$ = 2.571) |||
| 0.073 | 0.083 | 0.094 | 0.080 | 0.091 | 0.102 | | | |

TABLE 5-continued

ZEOLITE MIXED CATION COMPOSITIONS
Monovalent-Monovalent Cation Combinations
(Equivalent Fraction of Second Cation)

| LOW | CENTER | HIGH | LOW | CENTER | HIGH | LOW | CENTER | HIGH |
|---|---|---|---|---|---|---|---|---|
|  |  |  |  |  |  | 0.083 | 0.095 | 0.107 |
| 0.156 | 0.167 | 0.177 | 0.170 | 0.182 | 0.193 |  |  |  |
|  |  |  |  |  |  | 0.179 | 0.190 | 0.202 |
| 0.240 | 0.250 | 0.260 | 0.261 | 0.273 | 0.284 |  |  |  |
|  |  |  |  |  |  | 0.274 | 0.286 | 0.298 |
| 0.323 | 0.333 | 0.344 | 0.352 | 0.364 | 0.375 |  |  |  |
|  |  |  |  |  |  | 0.369 | 0.381 | 0.393 |
| 0.406 | 0.417 | 0.427 | 0.443 | 0.455 | 0.456 |  |  |  |
|  |  |  |  |  |  | 0.464 | 0.476 | 0.488 |
| 0.490 | 0.500 | 0.510 | 0.534 | 0.545 | 0.557 |  |  |  |
|  |  |  |  |  |  | 0.560 | 0.571 | 0.583 |
| 0.573 | 0.583 | 0.594 | 0.625 | 0.636 | 0.648 |  |  |  |
| 0.656 | 0.667 | 0.677 |  |  |  | 0.655 | 0.667 | 0.679 |
|  |  |  | 0.716 | 0.727 | 0.739 |  |  |  |
| 0.740 | 0.750 | 0.760 |  |  |  | 0.750 | 0.762 | 0.774 |
|  |  |  | 0.807 | 0.816 | 0.830 |  |  |  |
| 0.823 | 0.833 | 0.844 |  |  |  | 0.845 | 0.857 | 0.869 |
|  |  |  | 0.898 | 0.909 | 0.920 |  |  |  |
| 0.906 | 0.917 | 0.927 |  |  |  | 0.940 | 0.952 | 0.964 |
| ($SiO_2/Al_2O_3 = 2.800$) | | | ($SiO_2/Al_2O_3 = 3.053$) | | | ($SiO_2/Al_2O_3 = 3.333$) | | |
| 0.088 | 0.100 | 0.113 |  |  |  |  |  |  |
|  |  |  | 0.092 | 0.105 | 0.118 |  |  |  |
| 0.188 | 0.200 | 0.213 |  |  |  | 0.097 | 0.111 | 0.125 |
|  |  |  | 0.197 | 0.211 | 0.224 |  |  |  |
| 0.288 | 0.300 | 0.313 |  |  |  | 0.208 | 0.222 | 0.236 |
|  |  |  | 0.303 | 0.316 | 0.329 |  |  |  |
| 0.388 | 0.400 | 0.413 |  |  |  | 0.319 | 0.333 | 0.347 |
|  |  |  | 0.408 | 0.421 | 0.434 |  |  |  |
| 0.488 | 0.500 | 0.513 |  |  |  | 0.431 | 0.444 | 0.458 |
|  |  |  | 0.513 | 0.526 | 0.539 |  |  |  |
| 0.588 | 0.600 | 0.613 |  |  |  | 0.542 | 0.556 | 0.569 |
|  |  |  | 0.618 | 0.632 | 0.645 |  |  |  |
| 0.688 | 0.700 | 0.713 |  |  |  | 0.653 | 0.667 | 0.681 |
|  |  |  | 0.724 | 0.737 | 0.750 |  |  |  |
| 0.788 | 0.800 | 0.813 |  |  |  | 0.764 | 0.778 | 0.792 |
|  |  |  | 0.829 | 0.842 | 0.855 |  |  |  |
| 0.888 | 0.900 | 0.913 |  |  |  | 0.875 | 0.889 | 0.903 |
|  |  |  | 0.934 | 0.947 | 0.961 |  |  |  |

TABLE 6

SYMMETRIC MIXED CATION COMPOSITIONS

| Charges | Beta Cages in the Unit Cell | | | | | | | | No. Cations | Equivalent Fraction |
|---|---|---|---|---|---|---|---|---|---|---|
| | #1 | #2 | #3 | #4 | #5 | #6 | #7 | #8 | | |
| | For Type X with $SiO_2\backslash Al_2O_3 = 2.000$ | | | | | | | | | |
| Divalent | 10 | 10 | 10 | 10 | 10 | 10 | 10 | 10 | 40 | 0.833 |
| Divalent | 2 | 2 | 2 | 2 | 2 | 2 | 2 | 2 | 8 | 0.167 |
| Divalent | 8 | 8 | 8 | 8 | 8 | 8 | 8 | 8 | 32 | 0.667 |
| Divalent | 4 | 4 | 4 | 4 | 4 | 4 | 4 | 4 | 16 | 0.333 |
| Divalent | 6 | 6 | 6 | 6 | 6 | 6 | 6 | 6 | 24 | 0.500 |
| Divalent | 6 | 6 | 6 | 6 | 6 | 6 | 6 | 6 | 24 | 0.500 |
| Divalent | 4 | 4 | 4 | 4 | 4 | 4 | 4 | 4 | 16 | 0.333 |
| Divalent | 8 | 8 | 8 | 8 | 8 | 8 | 8 | 8 | 32 | 0.667 |
| Divalent | 2 | 2 | 2 | 2 | 2 | 2 | 2 | 2 | 8 | 0.167 |
| Divalent | 10 | 10 | 10 | 10 | 10 | 10 | 10 | 10 | 40 | 0.833 |

TABLE 7

ZEOLITE MIXED CATION COMPOSITIONS
DIVALENT-DIVALENT CATION COMPOSITION
(EQUIVALENT FRACTION OF SECOND CATION)
$SiO_2/Al_2O_3 = 2.000$

| LOW | CENTER | HIGH |
|---|---|---|
| 0.146 | 0.167 | 0.188 |
| 0.313 | 0.333 | 0.354 |
| 0.479 | 0.500 | 0.521 |
| 0.646 | 0.667 | 0.688 |
| 0.813 | 0.833 | 0.854 |

TABLE 8

SYMMETRIC MIXED CATION COMPOSITIONS

Beta Cages in the Unit Cell

| Charges | #1 | #2 | #3 | #4 | #5 | #6 | #7 | #8 | No. Cations | Equivalent Fraction |
|---|---|---|---|---|---|---|---|---|---|---|
| For Type X with $SiO_2 \backslash Al_2O_3$ = 2.000 | | | | | | | | | | |
| Monovalent | 10 | 10 | 10 | 10 | 10 | 10 | 0 | 10 | 80 | 0.833 |
| Divalent | 2 | 2 | 2 | 2 | 2 | 2 | 2 | 2 | 8 | 0.167 |
| Monovalent | 8 | 8 | 8 | 8 | 8 | 8 | 8 | 8 | 64 | 0.667 |
| Divalent | 4 | 4 | 4 | 4 | 4 | 4 | 4 | 4 | 16 | 0.333 |
| Monovalent | 6 | 6 | 6 | 6 | 6 | 6 | 6 | 6 | 48 | 0.500 |
| Divalent | 6 | 6 | 6 | 6 | 6 | 6 | 6 | 6 | 24 | 0.500 |
| Monovalent | 4 | 4 | 4 | 4 | 4 | 4 | 4 | 4 | 32 | 0.333 |
| Divalent | 8 | 8 | 8 | 8 | 8 | 8 | 8 | 8 | 32 | 0.667 |
| Monovalent | 2 | 2 | 2 | 2 | 2 | 2 | 2 | 2 | 16 | 0.167 |
| Divalent | 10 | 10 | 10 | 10 | 10 | 10 | 10 | 10 | 40 | 0.833 |
| For Type X with $SiO_2 \backslash Al_2O_3$ = 2.364 | | | | | | | | | | |
| Monovalent | 9 | 9 | 9 | 9 | 9 | 9 | 9 | 9 | 72 | 0.818 |
| Divalent | 2 | 2 | 2 | 2 | 2 | 2 | 2 | 2 | 8 | 0.182 |
| Monovalent | 7 | 7 | 7 | 7 | 7 | 7 | 7 | 7 | 56 | 0.636 |
| Divalent | 4 | 4 | 4 | 4 | 4 | 4 | 4 | 4 | 16 | 0.364 |
| Monovalent | 5 | 5 | 5 | 5 | 5 | 5 | 5 | 5 | 40 | 0.455 |
| Divalent | 6 | 6 | 6 | 6 | 6 | 6 | 6 | 6 | 24 | 0.545 |
| Monovalent | 3 | 3 | 3 | 3 | 3 | 3 | 3 | 3 | 24 | 0.273 |
| Divalent | 8 | 8 | 8 | 8 | 8 | 8 | 8 | 8 | 32 | 0.727 |
| Monovalent | 1 | 1 | 1 | 1 | 1 | 1 | 1 | 1 | 8 | 0.091 |
| Divalent | 10 | 10 | 10 | 10 | 10 | 10 | 10 | 10 | 40 | 0.909 |

TABLE 9

SEMISYMMETRIC MIXED CATION COMPOSITIONS

Beta Cages in the Unit Cell

| Charges | #1 | #2 | #3 | #4 | #5 | #6 | #7 | #8 | No. Cations | Equivalent Fraction |
|---|---|---|---|---|---|---|---|---|---|---|
| For Type X with $SiO_2 \backslash Al_2O_3$ = 2.571 | | | | | | | | | | |
| Monovalent | 8 | 8 | 8 | 8 | 9 | 9 | 9 | 9 | 68 | 0.810 |
| Divalent | 2 | 2 | 2 | 2 | 2 | 2 | 2 | 2 | 8 | 0.190 |
| Monovalent | 6 | 6 | 6 | 6 | 7 | 7 | 7 | 7 | 52 | 0.619 |
| Divalent | 4 | 4 | 4 | 4 | 4 | 4 | 4 | 4 | 16 | 0.381 |
| Monovalent | 4 | 4 | 4 | 4 | 5 | 5 | 5 | 5 | 36 | 0.429 |
| Divalent | 6 | 6 | 6 | 6 | 6 | 6 | 6 | 6 | 24 | 0.571 |
| Monovalent | 2 | 2 | 2 | 2 | 3 | 3 | 3 | 3 | 20 | 0.238 |
| Divalent | 8 | 8 | 8 | 8 | 8 | 8 | 8 | 8 | 32 | 0.762 |
| Monovalent | 0 | 0 | 0 | 0 | 1 | 1 | 1 | 1 | 4 | 0.048 |
| Divalent | 10 | 10 | 10 | 10 | 10 | 10 | 10 | 10 | 40 | 0.952 |

TABLE 10

ZEOLITE MIXED CATION COMPOSITIONS
Monovalent-Divalent Cation Combinations
(Equivalent Fraction of Second Cation)

| ($SiO_2/Al_2O_3$ = 2.000) | | | ($SiO_2/Al_2O_3$ = 2.364) | | | ($SiO_2/Al_2O_3$ = 2.571) | | |
|---|---|---|---|---|---|---|---|---|
| LOW | CENTER | HIGH | LOW | CENTER | HIGH | LOW | CENTER | HIGH |
| 0.146 | 0.167 | 0.188 | | | | | | |
| | | | 0.159 | 0.182 | 0.205 | | | |
| | | | | | | 0.167 | 0.190 | 0.214 |
| 0.313 | 0.333 | 0.354 | | | | | | |
| | | | 0.341 | 0.364 | 0.386 | | | |
| | | | | | | 0.357 | 0.381 | 0.405 |
| 0.479 | 0.500 | 0.521 | | | | | | |

TABLE 10-continued

ZEOLITE MIXED CATION COMPOSITIONS
Monovalent-Divalent Cation Combinations
(Equivalent Fraction of Second Cation)

| | | | 0.523 | 0.545 | 0.568 | | | |
|---|---|---|---|---|---|---|---|---|
| | | | | | | 0.548 | 0.571 | 0.595 |
| 0.646 | 0.667 | 0.688 | | | | | | |
| | | | 0.705 | 0.727 | 0.750 | | | |
| | | | | | | 0.738 | 0.762 | 0.786 |
| 0.813 | 0.833 | 0.854 | | | | | | |
| | | | 0.856 | 0.909 | no | 0.929 | 0.952 | no |
| ($SiO_2/Al_2O_3$ = 2.800) | | | ($SiO_2/Al_2O_3$ = 3.053) | | | ($SiO_2/Al_2O_3$ = 3.333) | | |
| LOW | CENTER | HIGH | LOW | CENTER | HIGH | LOW | CENTER | HIGH |
| 0.175 | 0.200 | 0.225 | | | | | | |
| | | | 0.184 | 0.211 | 0.237 | | | |
| | | | | | | 0.194 | 0.222 | 0.250 |
| 0.375 | 0.400 | 0.425 | | | | | | |
| | | | 0.395 | 0.421 | 0.447 | | | |
| | | | | | | 0.417 | 0.444 | 0.472 |
| 0.575 | 0.600 | 0.625 | | | | | | |
| | | | 0.605 | 0.632 | 0.658 | | | |
| | | | | | | 0.639 | 0.667 | 0.694 |
| 0.775 | 0.800 | 0.824 | | | | | | |
| | | | 0.816 | 0.842 | 0.868 | | | |
| | | | | | | 0.861 | 0.889 | no |

Relation to Equilibrium Selectivity

Unit Cell Adsorption Values

Equilibrium selectivity in zeolites appears to be really based on competitive occupancy of relatively large adsorption volumes, not at individual cation sites. Prior investigations, which focused on the α-cages as the adsorption volume, suggest that the more strongly adsorbed component, e.g. $N_2$, will occupy regions close to the walls, and the cations, while the less strongly adsorbed component, e.g. $O_2$, will occupy regions near the center. This view of adsorption recognizes that adsorbed molecules do not "sit still" in cation sites, but are constantly in motion for the temperatures of interest in PSA separations.

It is submitted that the α-cages or supercages are still too small to be considered as the "adsorption volumes". In Table 11, the number of molecules per supercage is given for 6 different zeolites at two temperatures for $O_2$ at 26.7 kPa and for $N_2$ at 100 kPa. These data were calculated from pure gas isotherm data. The fractional values for oxygen, and the small number (≦4) for $N_2$, do not suggest competition at cation sites or in volumetric regions within the supercages.

TABLE 11

SUPERCAGE OCCUPANCIES (Molecules Per Supercage)

| | Oxygen at 26.7 kPa | | Nitrogen at 100 kPa | |
|---|---|---|---|---|
| Zeolite | 250K | 300K | 250K | 300K |
| NaX(2.3) | 0.130 | 0.054 | 2.071 | 0.678 |
| NaX(2.0) | 0.110 | 0.045 | 1.962 | 0.604 |
| LiX(2.5) | 0.210 | 0.070 | 2.711 | 1.313 |
| LiX(2.3) | 0.197 | 0.072 | 2.949 | 1.382 |
| LiX(2.0) | 0.211 | 0.082 | 3.766 | 1.761 |

Rather than choose the adsorption volume intuitively or for convenience, it is desirable that the true unit cell be chosen as the adsorption volume, since it is the smallest volume that represents the zeolite crystal. In Table 12 below, the number of molecules per unit cell is given for the same zeolites and conditions as in Table 11. Since there are 8 α-cages in A, and 8 supercages in X or Y structures per unit cell, the occupancy numbers are 8 times higher. The adsorption volume is therefore properly viewed as distributed in space, so that the spatial probabilities for finding will extend over 8 α-cages in A or 8 supercages in X and Y. Thus for an $N_2/O_2$ mixture, an $N_2$-rich adsorbate will be distributed in "pockets" in regions near the cations, and an $O_2$-rich adsorbate will be distributed in regions near the centers of the α-cages or supercages.

TABLE 12

UNIT CELL OCCUPANCIES
(MOLECULES PER UNIT CELL)

| | Oxygen at 26.7 kPa | | Nitrogen at 100 kPa | |
|---|---|---|---|---|
| Zeolite | 250K | 300K | 250K | 300K |
| NaX(2.3) | 1.042 | 0.429 | 16.571 | 5.427 |
| NaX(2.0) | 0.883 | 0.356 | 15.698 | 4.835 |
| LiX(2.5) | 1.682 | 0.561 | 21.688 | 10.502 |
| LiX(2.3) | 1.576 | 0.575 | 23.593 | 11.057 |
| LiX(2.0) | 1.691 | 0.660 | 30.130 | 14.089 |

Symmetry and Selectivity

Figure 2:
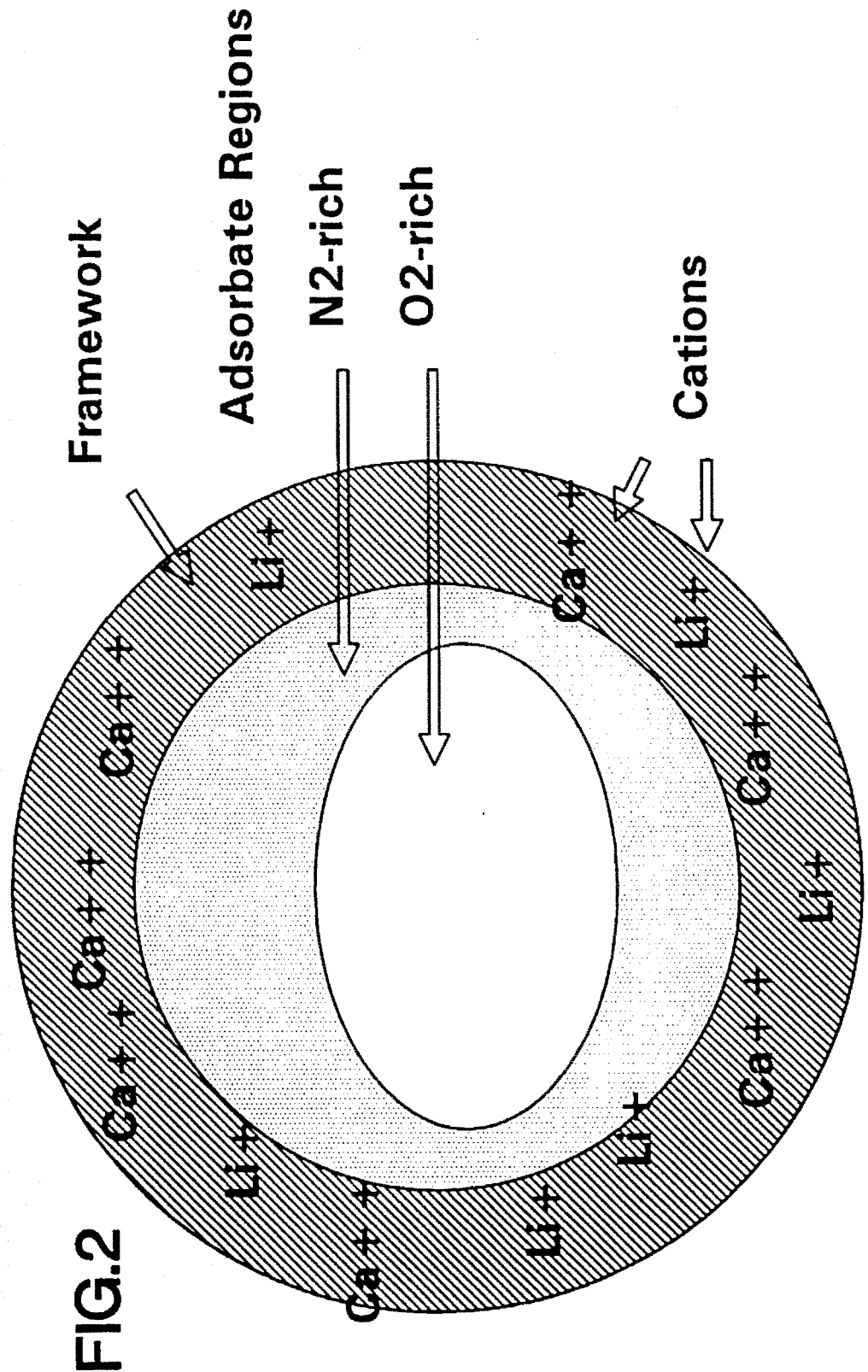
FIG. 2 is a schematic drawing illustrating an asymmetric zeolite composition.

It has been discovered that the selectivity for the more strongly adsorbable component, e.g. $N_2$, over the less strongly held component, e.g. $O_2$, in the gas mixture will be greater the higher the symmetry of the framework and cation compositions described earlier. If the number of charges associated with 1, 2 or 3 β-cages is different than the number in others in the unit cell, the field will then be distorted, and the less strongly held component ($O_2$) may approach closer to the cations, thereby competing more successfully with $N_2$. This effect is illustrated schematically in FIGS. 1 and 2 of the drawings. In FIG. 1, the symmetrical field keeps the $O_2$-rich mixture in the "center" of the adsorption volume, while the asymmetrical field, as shown in FIG. 2, allows the $O_2$-rich mixture of approach the cations. This symmetry effect is depicted schematically in another way in FIG. 3 of the drawings. In the illustrated embodiments, the cation charges associated with each β-cage are shown as integers at the apices of the cubes. It should be appreciated that this is not a representation of a crystal structure, but is just simply a way to show deviations from symmetry for a cubic array of 8 objects. The framework compositions corresponding to each array are also given in said FIG. 3.

Applications of the Discovery of the Invention

Usefulness of Symmetrical Compositions

Figure 4:
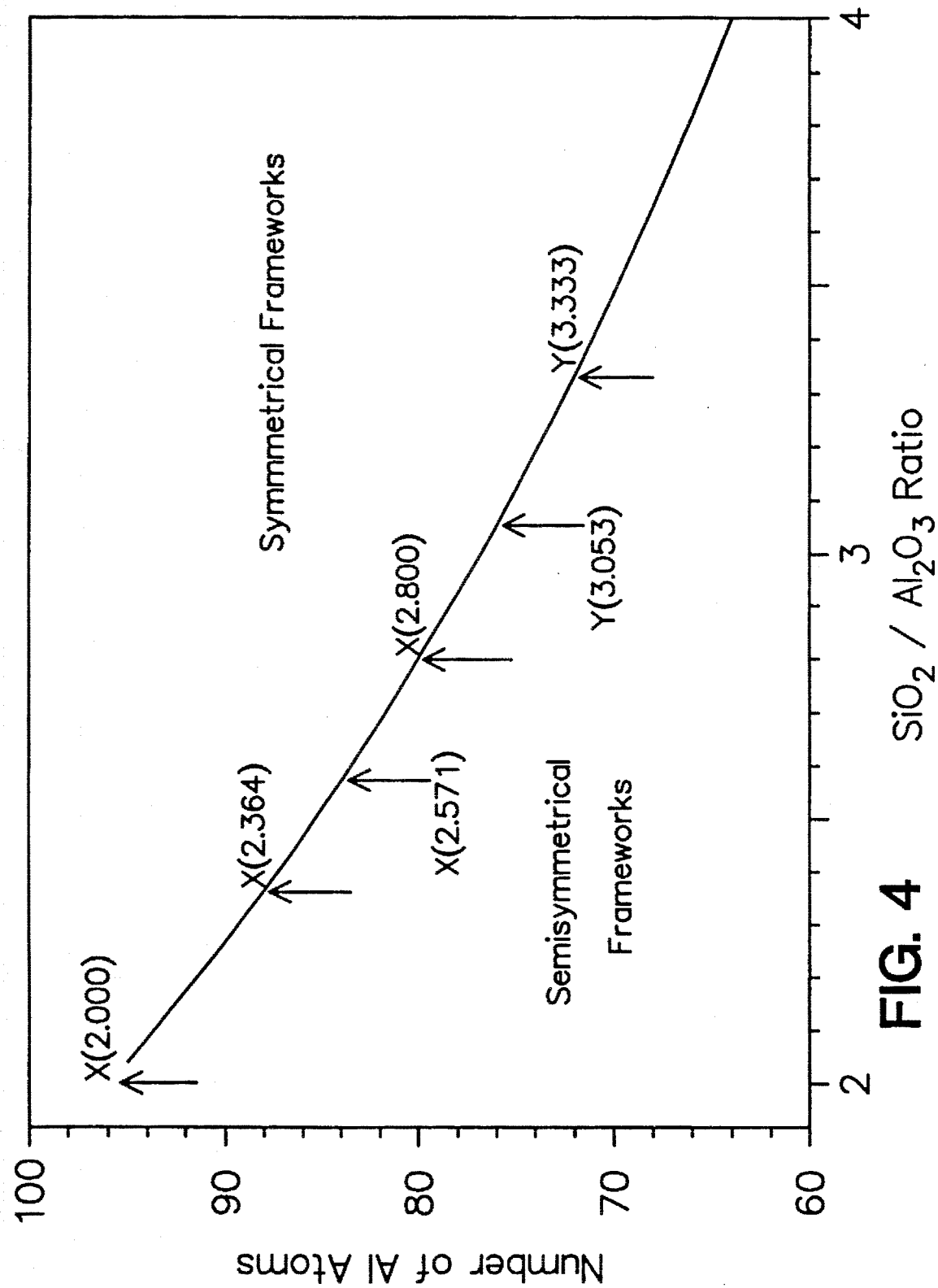
FIG. 4 is a graphic representation of the relationship between the framework charge in unit cells and various symmetric and semisymmetric framework compositions.

It is known that both adsorption capacity and selectivity are required for practical PSA adsorbents. FIG. 4 of the drawings shows the relationship between the framework charge in the unit cell and several symmetric and semisymmetric framework compositions. In view of the strong dependence of $N_2$ sorption on exposed cations, it is reasonable to expect that $\Delta N_2$ loadings will show a similar dependence for a given cation composition. From FIG. 4 and Table 2, new $N_2$-selective equilibrium adsorbents based on known zeolite forms can be determined. For air separation, preferred compositions of types X and A are particularly preferred. For air purification, preferred compositions of X and Y are preferred.

Illustrative Examples of Preferred Components of the Invention

The data herein have been obtained with a pressure microbalance under isothermal conditions for adsorbent samples activated under vacuum at 350° C. for about 16 hours. For a given sample, the adsorption isotherms for both $N_2$ and $O_2$ are mapped at 4 equilibrium points. The isotherm temperatures are 250, 273, 300 and 320K.

The data for each isotherm for each gas are fitted to a Loading Ratio Correlation (LRC) expression. LRC equations are used to calculate mixture adsorption data for competitive adsorption. Functions describing the separation are calculated at conditions chosen to sample some of those used in practical commercial PSA ($O_2$) cycles. The functions include measures of the $N_2$ sorbed and desorbed, and measures of selectivity at pressures and compositions corresponding to feed and desorption PSA processing steps. With respect to the illustrative examples below, these selectivity measures are employed, expressed as separation factors.

Evaluation of framework and cation compositions as preferred or non-preferred rely on symmetry, and narrow ranges, consistent with PSA performance, have been chosen to classify the "preferredness" or a particular composition. Limits for preferred framework compositions are, as indicated above, defined as the ranges corresponding to the replacement of ±1 Al-atom with an Si-atom for the ideal preferred compositions, which are, by definition, the centers of the ranges. These ranges have been outlined in Table 2 above for various framework types. Limits for both preferred and semi-symmetric mixed cation forms are likewise defined as the ranges corresponding to ±1 exchanged cation from the ideal preferred compositions, which are also defined as the centers of the ranges.

EXAMPLE 1

This example illustrates the concept of preferred compositions with regard to framework compositions. Three highly exchanged lithium X samples are compared at 24 conditions of temperature, pressure and $N_2/O_2$ gas composition. The results are as shown in FIG. 5a, FIG. 5b, FIG. 5c, FIG. 5d, FIG. 5e and FIG. 5f of the drawings. The LiX (2.0) and LiX (2.3) structures have symmetric framework compositions, as noted above, while LiX (2.5) is a semisymmetric one. In all 24 cases, the symmetric framework compositions show higher separation factors than the semisymmetric ones, thus confirming the discovered pattern of preferred compositions.

Figure 5A:
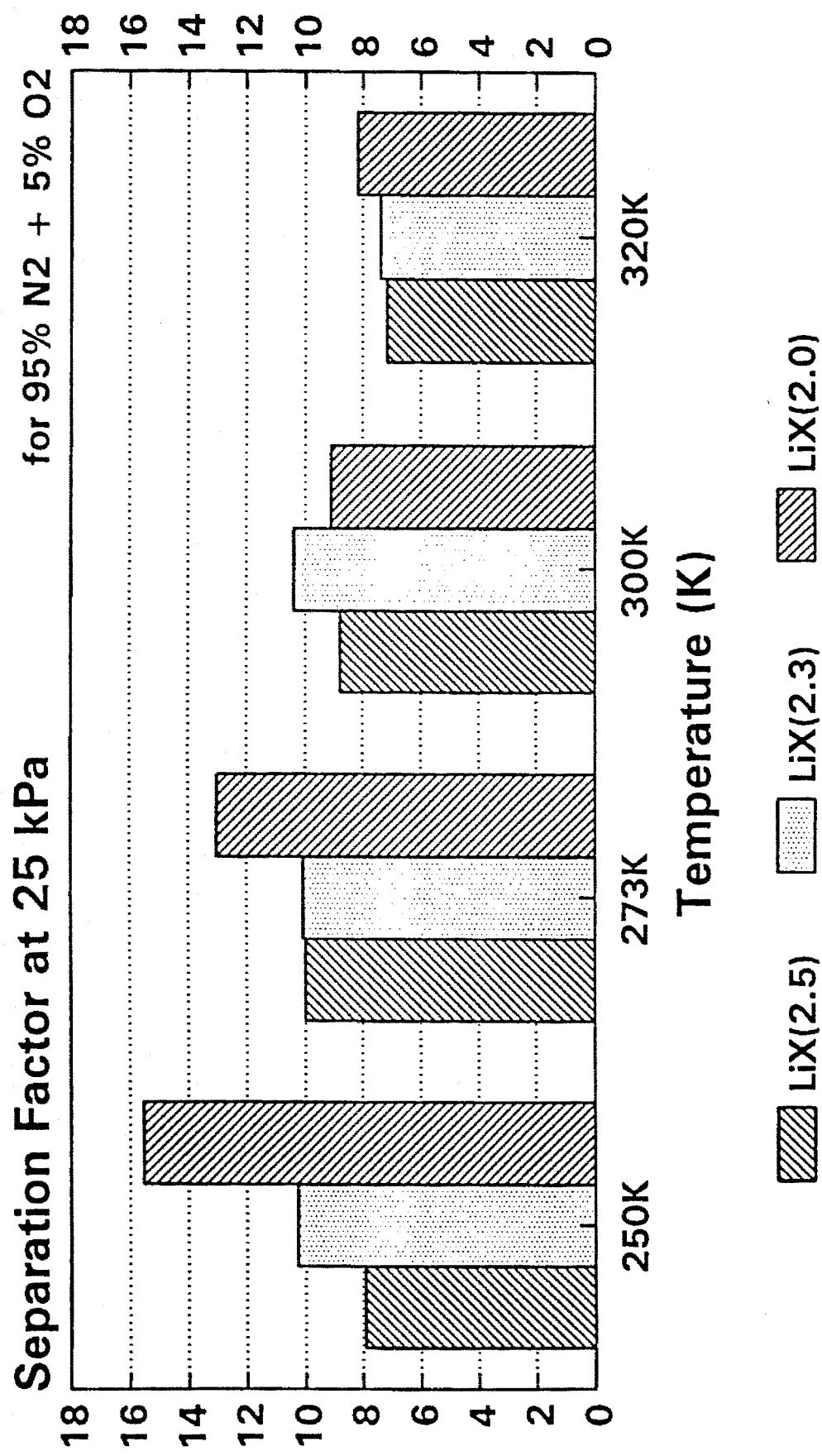
FIG. 5a is a chart illustrating the nitrogen selectivity of three lithium-exchanged framework compositions at recited operating conditions.
Figure 5B:
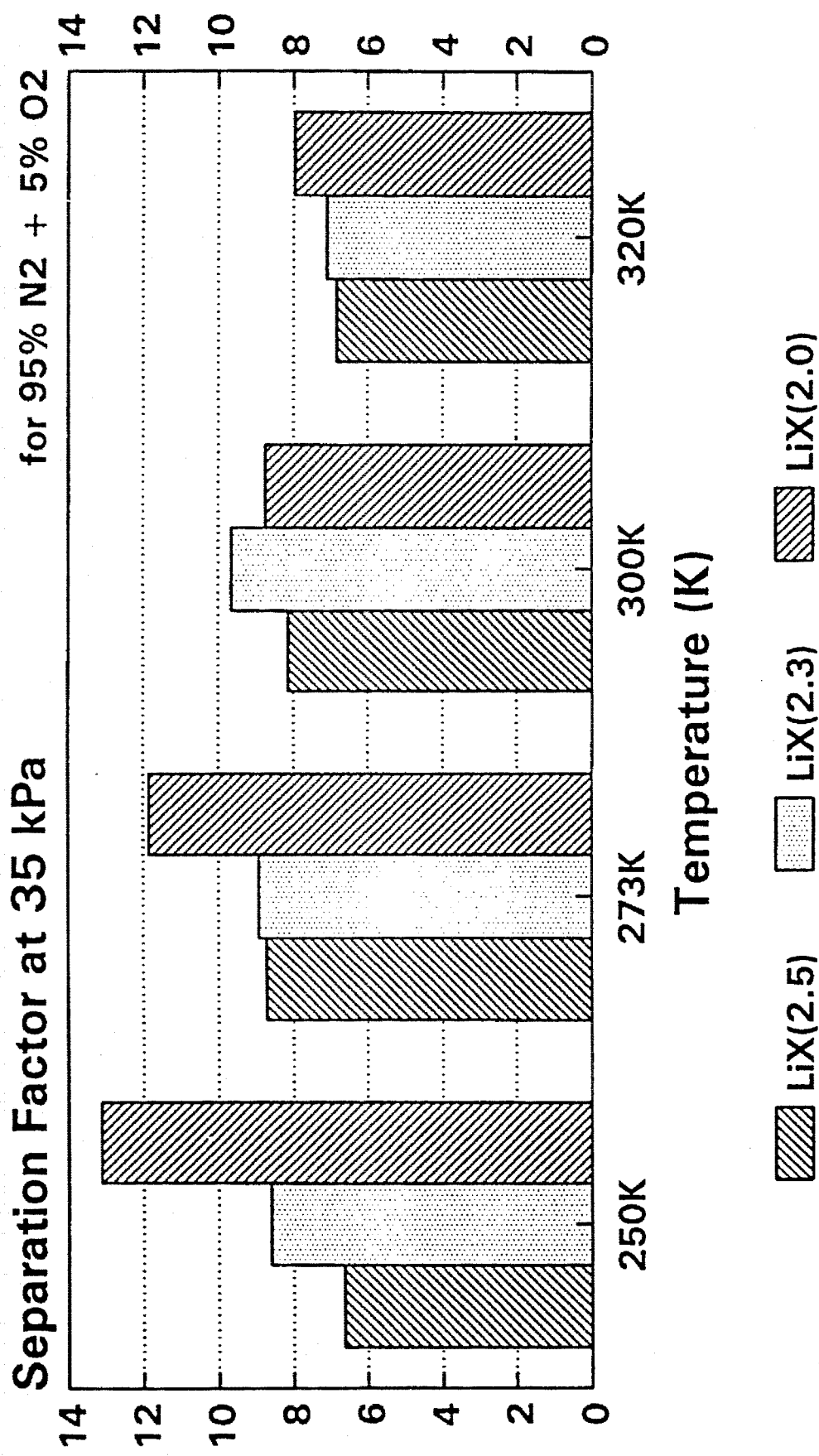
FIG. 5b is a chart illustrating the nitrogen selectivity of said three framework compositions and different recited operating conditions.
Figure 5C:
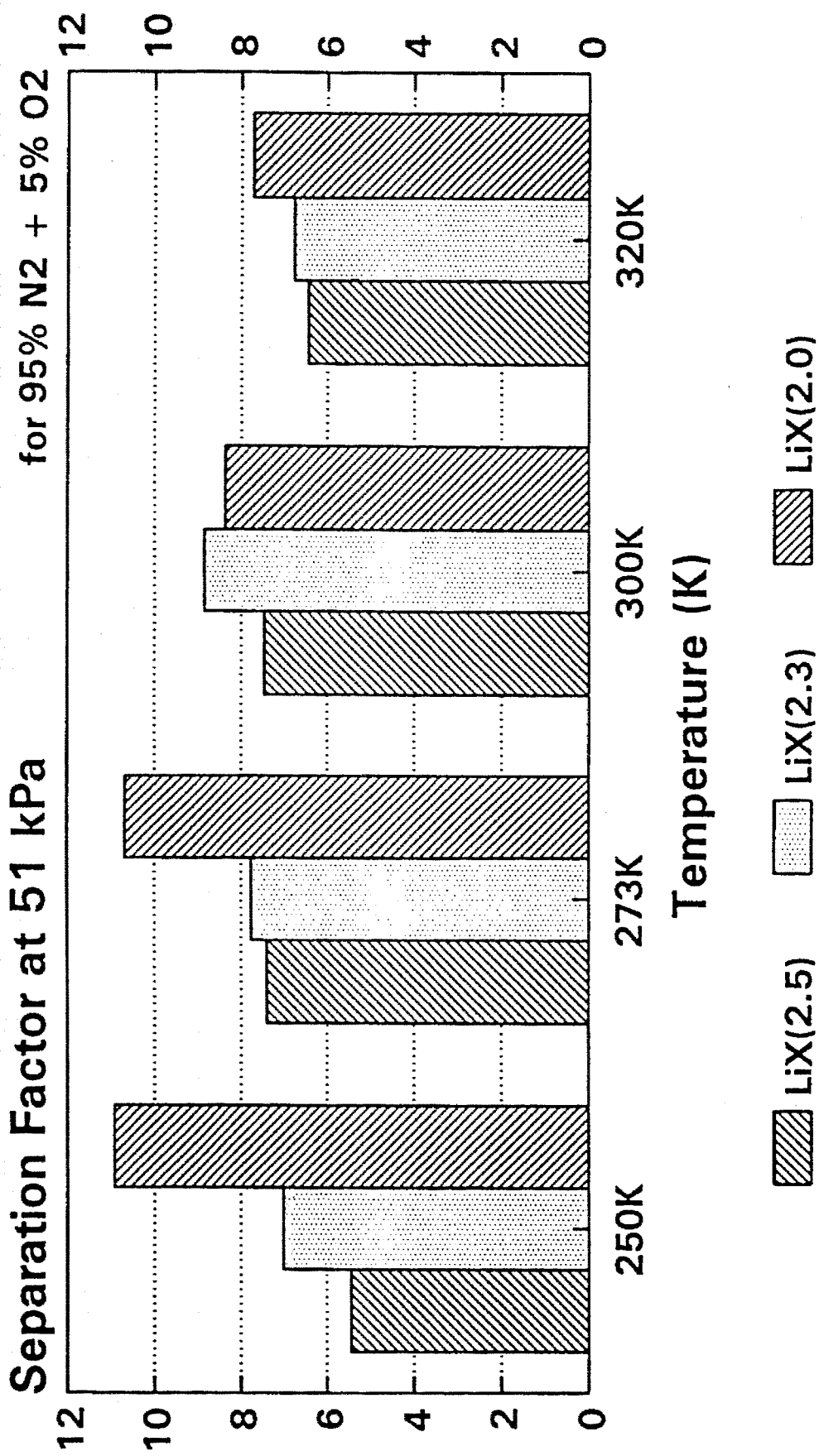
FIG. 5c is a chart illustrating the nitrogen selectivity of said three framework compositions at different recited operating conditions.
Figure 5E:
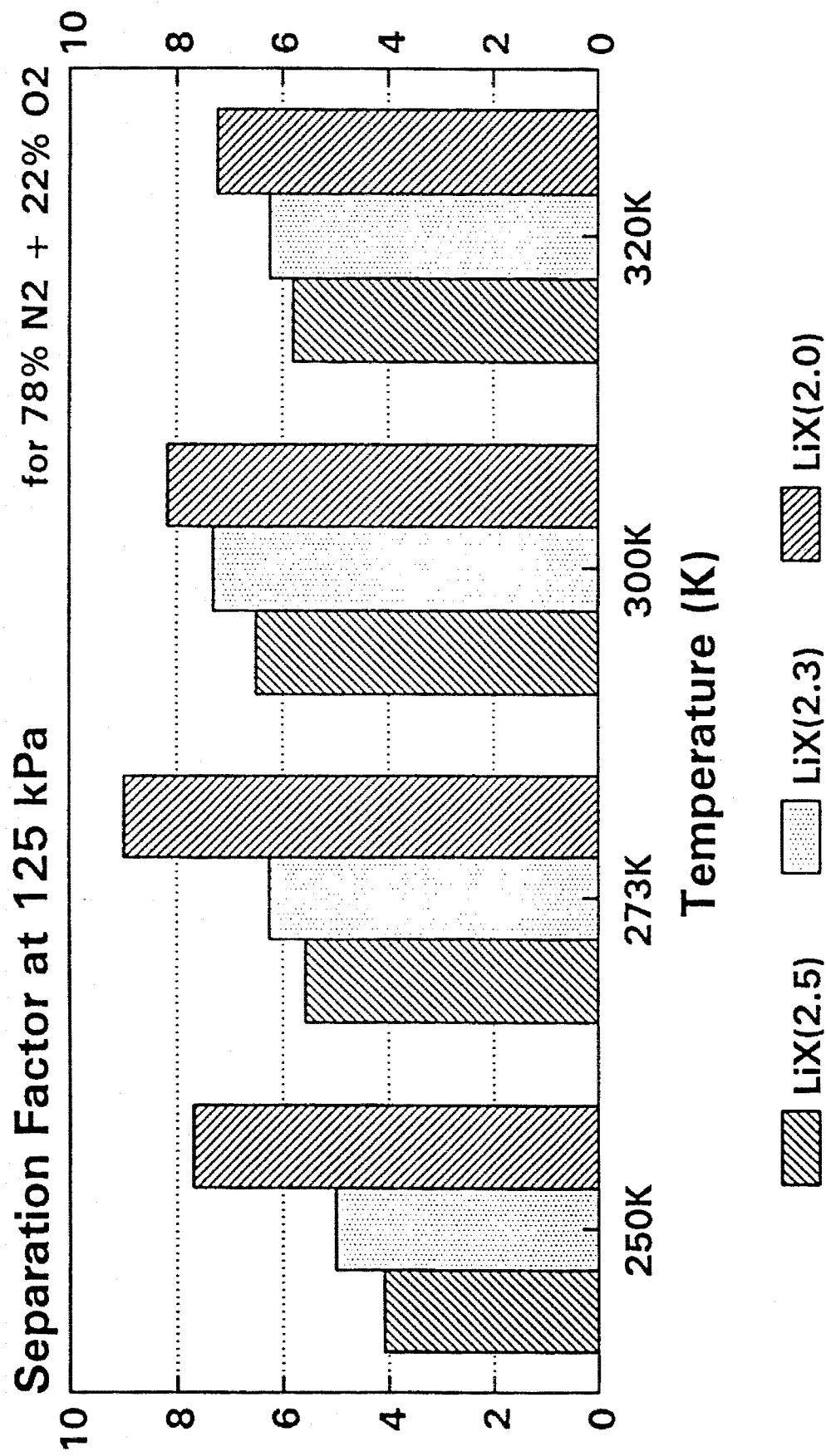
FIG. 5e is a chart illustrating the nitrogen selectivity of said three framework compositions at different recited operating conditions.
Figure 5F:
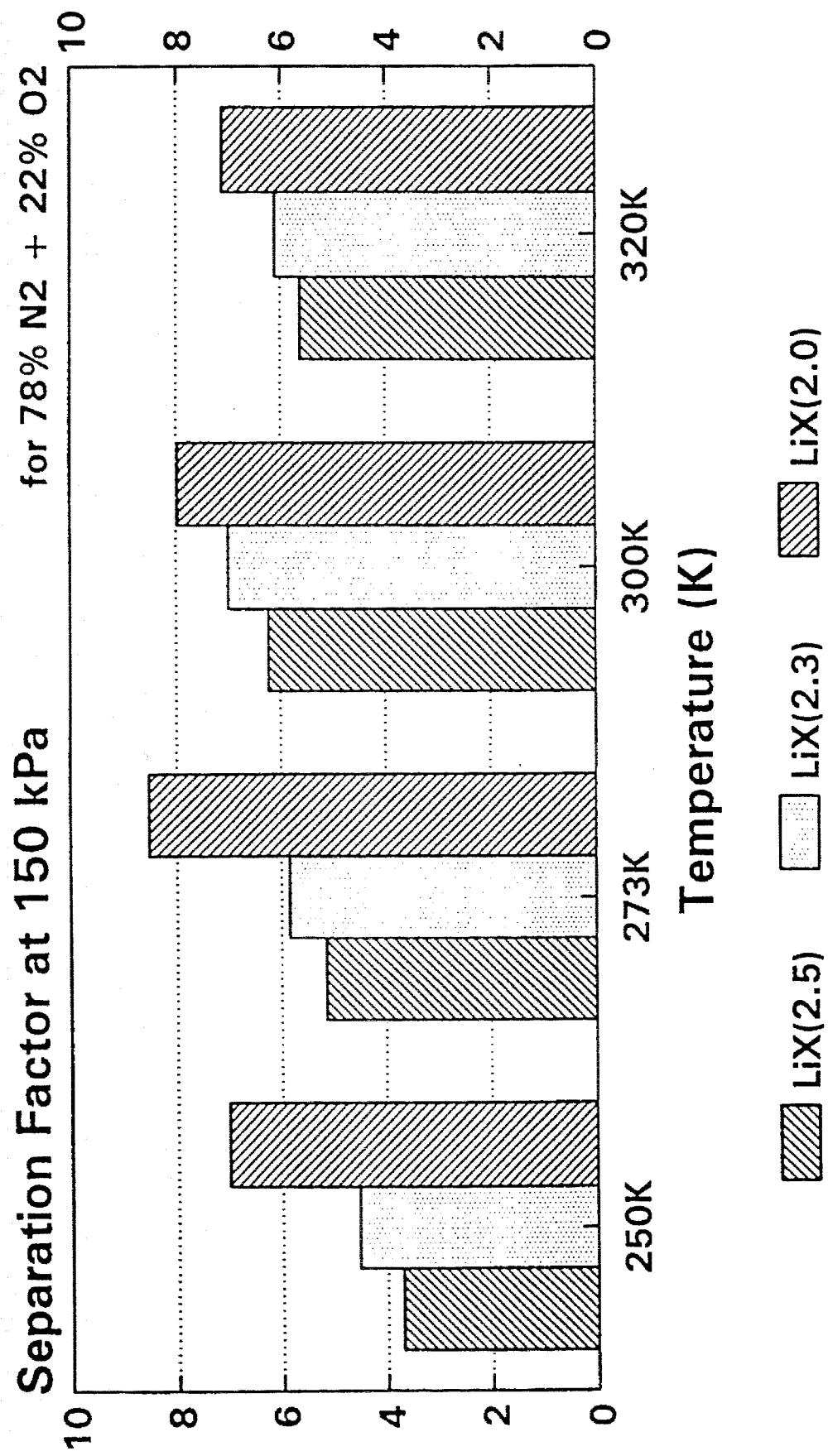
FIG. 5f is a chart illustrating the nitrogen selectivity of said framework compositions at different recited operating conditions.
Figure 6A:
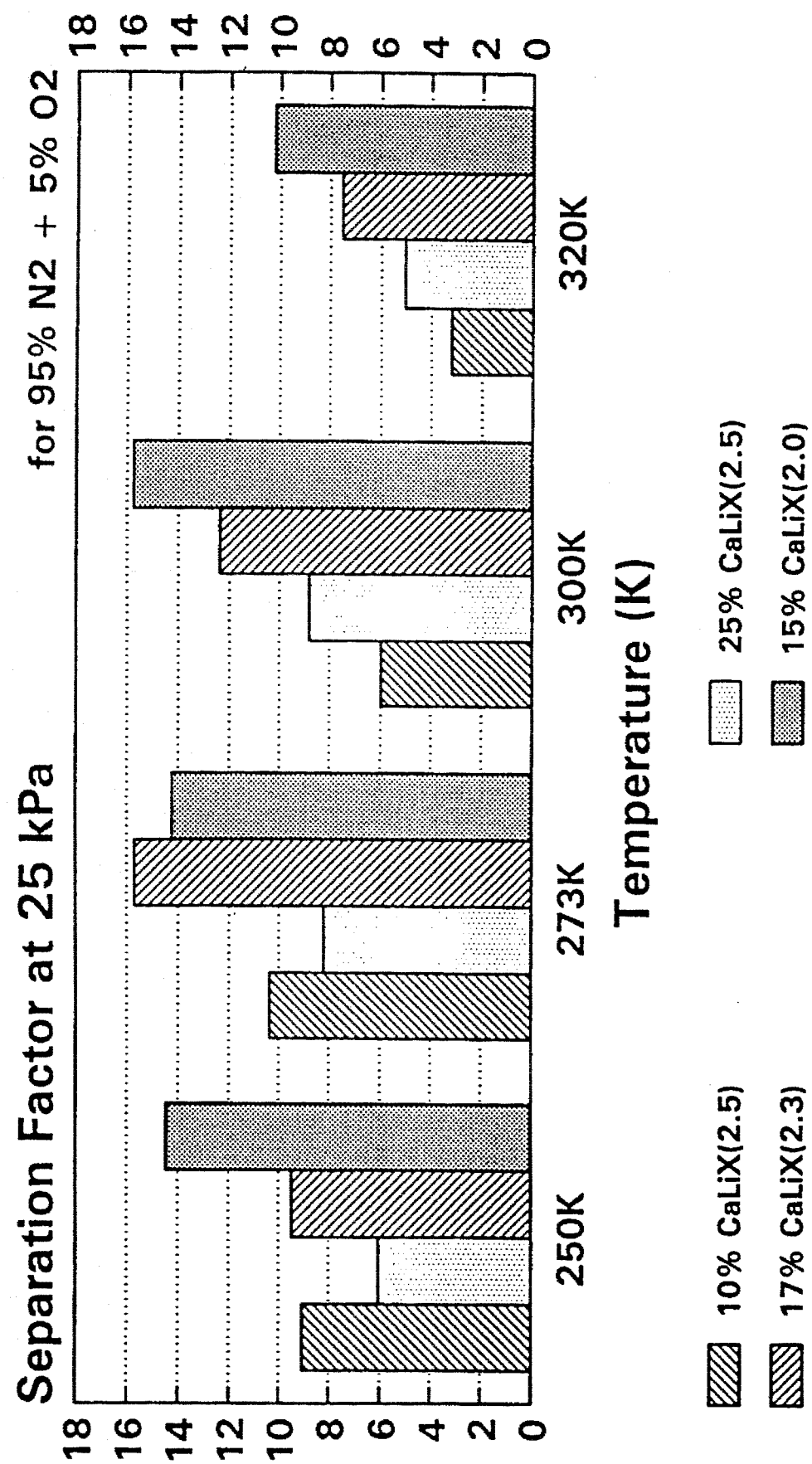
FIG. 6a is a chart showing the nitrogen selectivity of four calcium/lithium exchanged framework compositions at recited operating conditions.
Figure 6B:
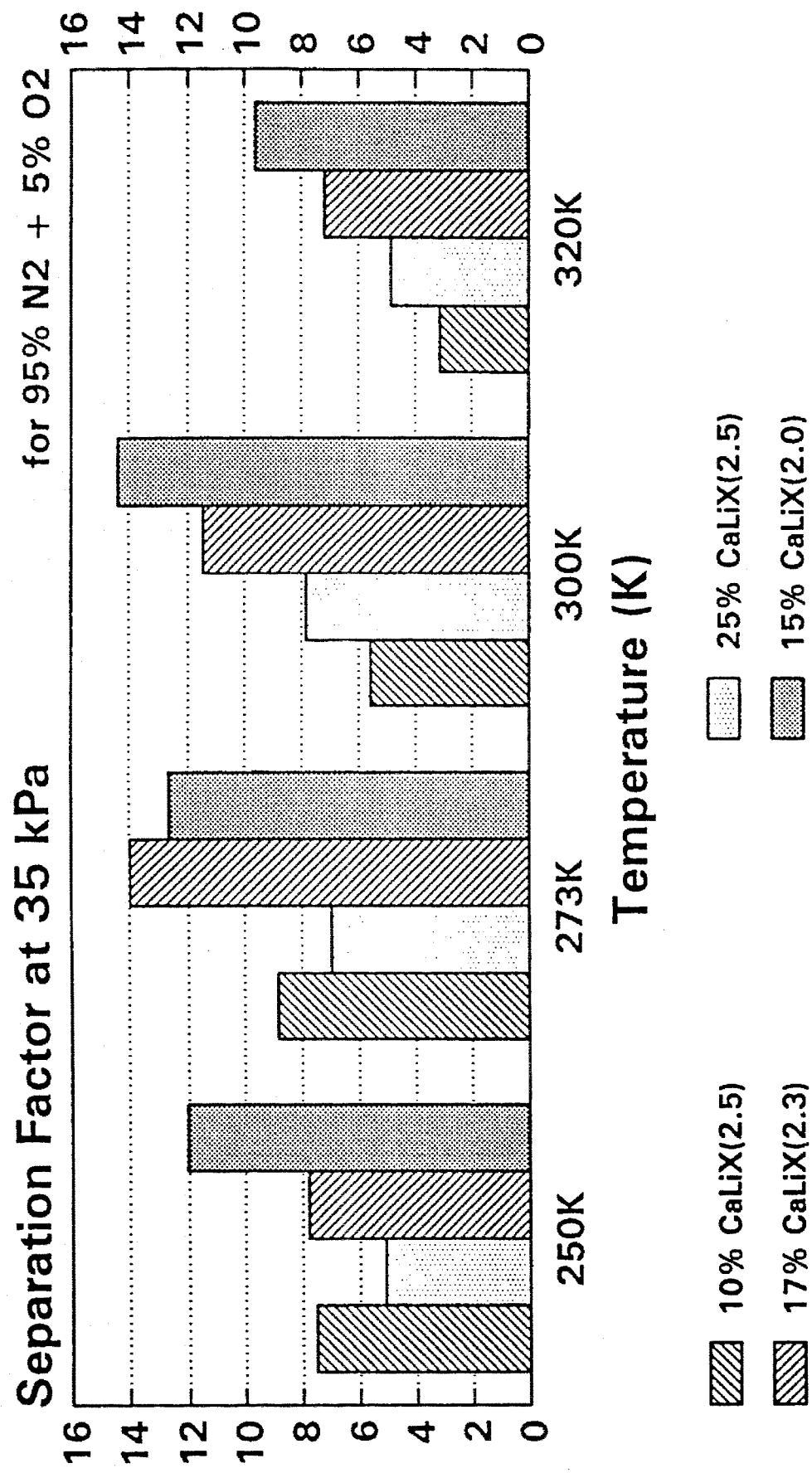
FIG. 6b is a chart showing the nitrogen selectivity of said framework compositions at different recited operating conditions.
Figure 6C:
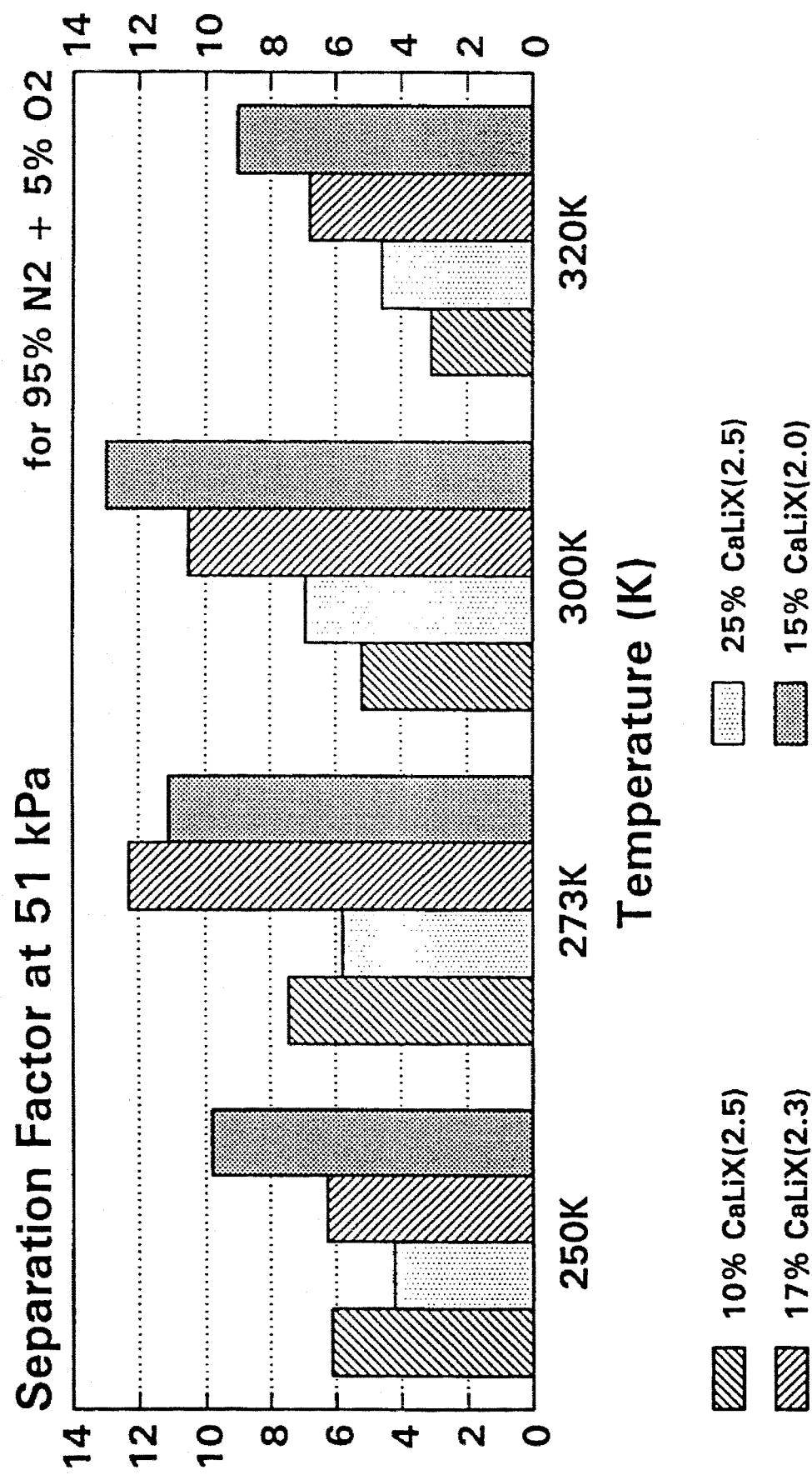
FIG. 6c is a chart showing the nitrogen selectivity of said framework compositions at different recited operating conditions.
Figure 6D:
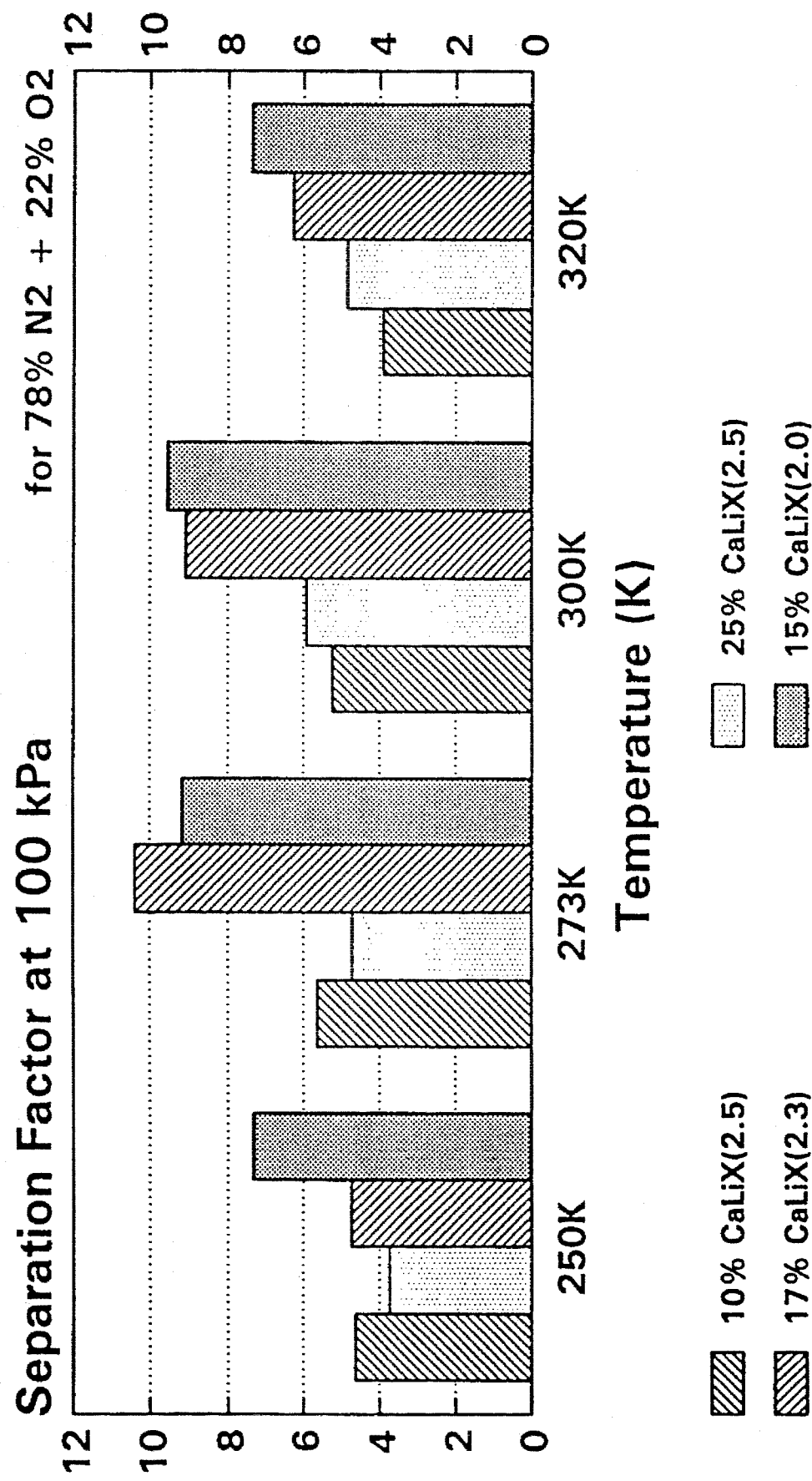
FIG. 6d is a chart showing the nitrogen selectivity of said framework compositions at different recited operating conditions.
Figure 6E:
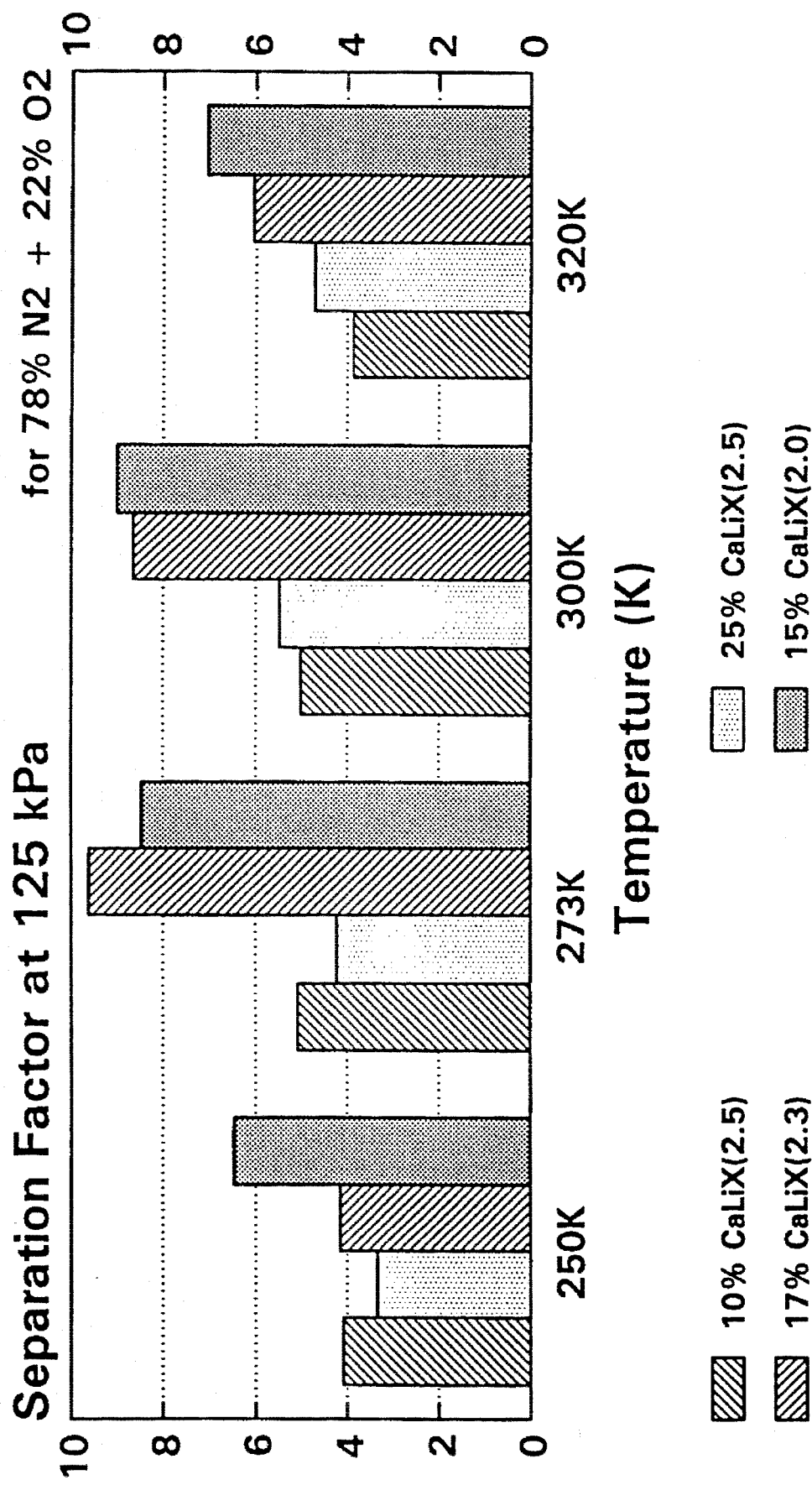
FIG. 6e is a chart showing the nitrogen selectivity of said framework compositions at different recited operating conditions.
Figure 6F:
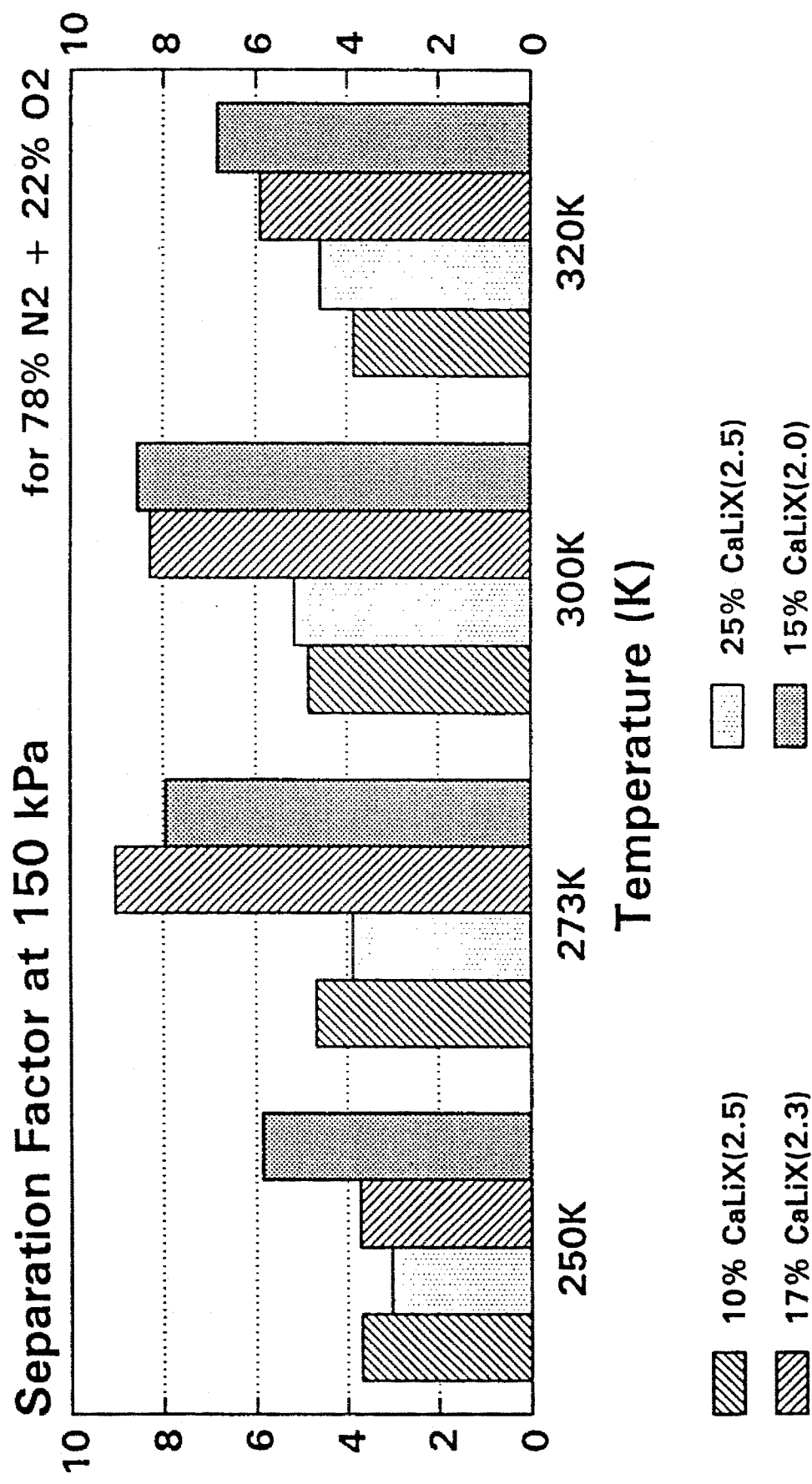
FIG. 6f is a chart showing the nitrogen selectivity of said framework compositions at different recited operating conditions.

It should be particularly noted that, under the particular conditions of FIG. 5a, FIG. 5b and FIG. 5c, at 300K operating temperature, the LiX (2.3) symmetrical material surprisingly enabled higher separation factor performance to be achieved than was obtained under like conditions using LiX (2.0) material.

EXAMPLE 2

The results obtained in this series of comparative operations is shown in FIG. 6a, FIG. 6b, FIG. 6c, FIG. 6d, FIG. 6e and FIG. 6f of the drawings, using CaLiX beads. The superior performance for symmetric framework compositions is shown in this illustrative example by comparison of four calcium-exchanged X zeolites at exchange levels of 10–25% calcium. At all 24 conditions tested, the symmetric framework examples, i.e. 15% CaLiX (2.0) and 17% CaLiX (2.3), exhibited higher separation factors than those of semisymmetric frameworks, i.e. 10% CaLiX (2.5) and 25% CaLiX (2.5). It is noted that, at the lower temperature, 250K, this effect is less pronounced.

This example also shows the effect of cation composition on performance. Table 10 above shows that the 17% CaLiX (2.3) and the 15% CaLiX (2.0) samples both fall in the ranges for preferred cation compositions, while the 10% and 25% CaLiX (2.5) samples fall outside these ranges. Thus, the superior performance of the 17% CaLiX (2.3) and the 15% CaLiX (2.0), as shown in FIGS. 6a–6f, can be attributed to both framework and cation effects.

It should also be noted that, in said examples summarized in FIGS. 6a–6f, the 2.3X material, i.e. 17% CaLiX (2.3), surprisingly exhibited higher separation factor performance at 273K than was achieved using the 2.0X material, i.e. 15% CaLiX, with the same PSA operating conditions.

EXAMPLE 3

In this example, the results of which are shown in FIGS. 7a–7f of the drawings, the interaction of preferred framework compositions and preferred cation compositions is shown. Three products based on a ~75% CaNaX have been considered, namely CaNaX (2.0), CaNaX (2.3) and CaNaX (2.5). On the basis of preferred framework compositions, the separation factors obtained in PSA operations could be expected to decrease in the order of CaNaX (2.0) or CaNaX (2.3)>CaNaX (2.5). In fact, this progression is observed for the nine air feed cases at 250, 273 and 300K operating temperature and for the six $N_2$-rich cases at 250 and 273K. From Table 10 above, it would appear that the selectivities obtained from the mixed cation compositions should decrease in the order CaNaX (2.5)>CaNaX (2.3)>CaNaX (2.0). This is observed for both gas compositions for the six cases at 320K. The relative selectivities of the three $N_2$-rich gas cases at 300K appear to reflect the transition between the two regions. Thus, the relative importance of the two effects, framework and cation composition, depends on the operating temperature employed.

Figure 7A:
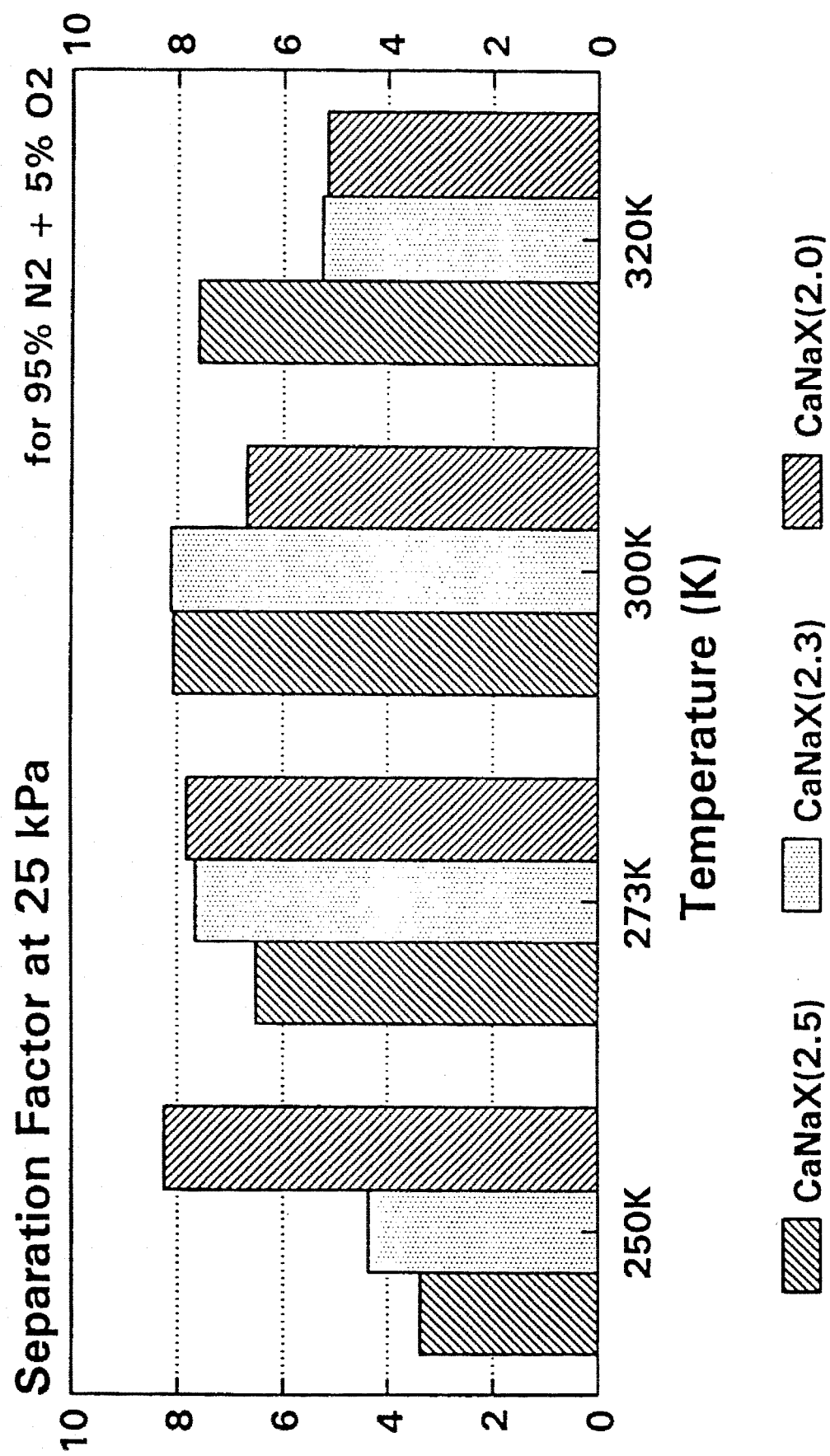
FIG. 7a is a chart illustrating the nitrogen selectivity of three CaNaX adsorbents having different framework compositions at recited operating conditions.
Figure 7B:
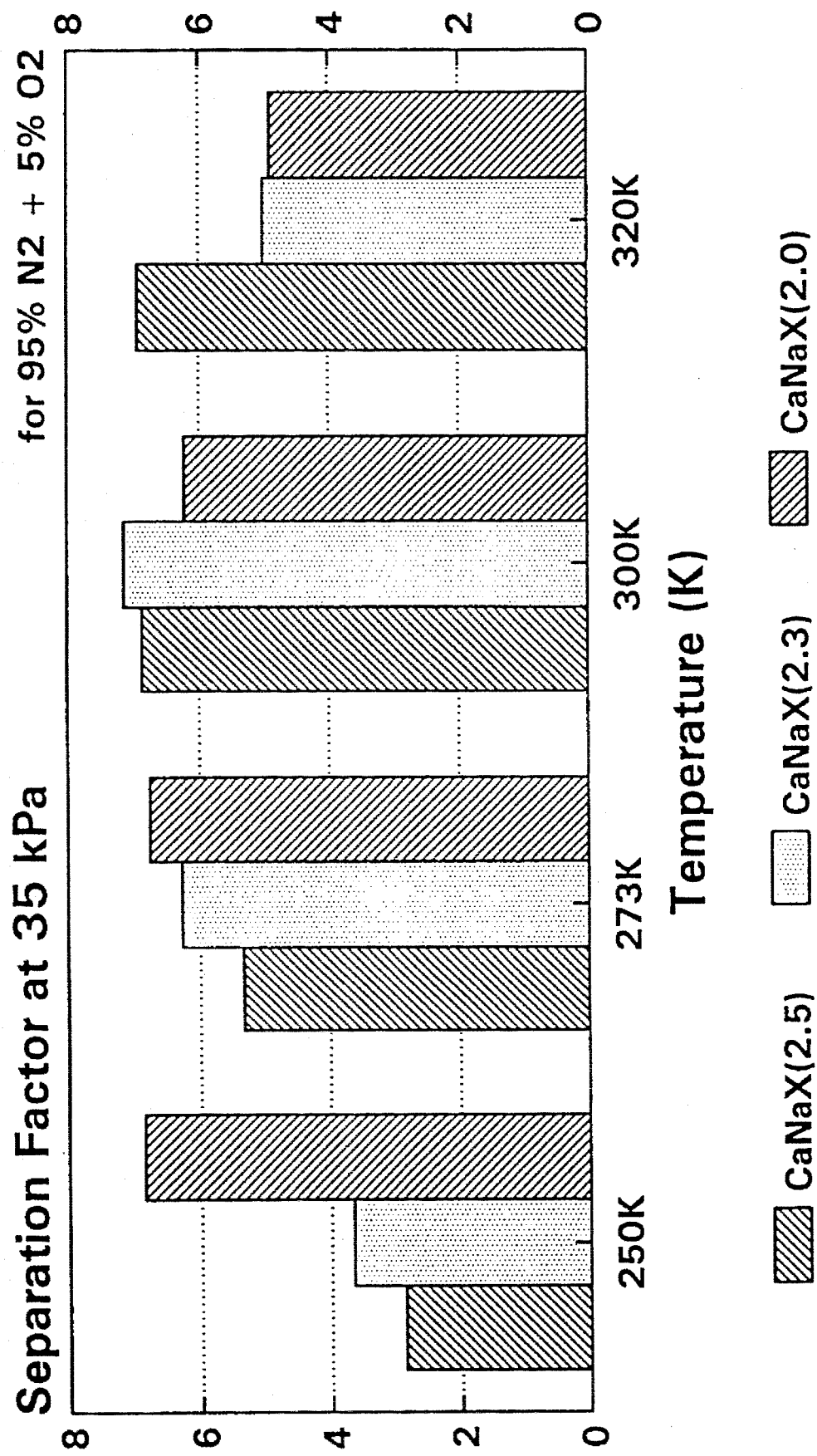
FIG. 7b is a chart illustrating the nitrogen selectivity of said adsorbents at different recited operating conditions.
Figure 7D:
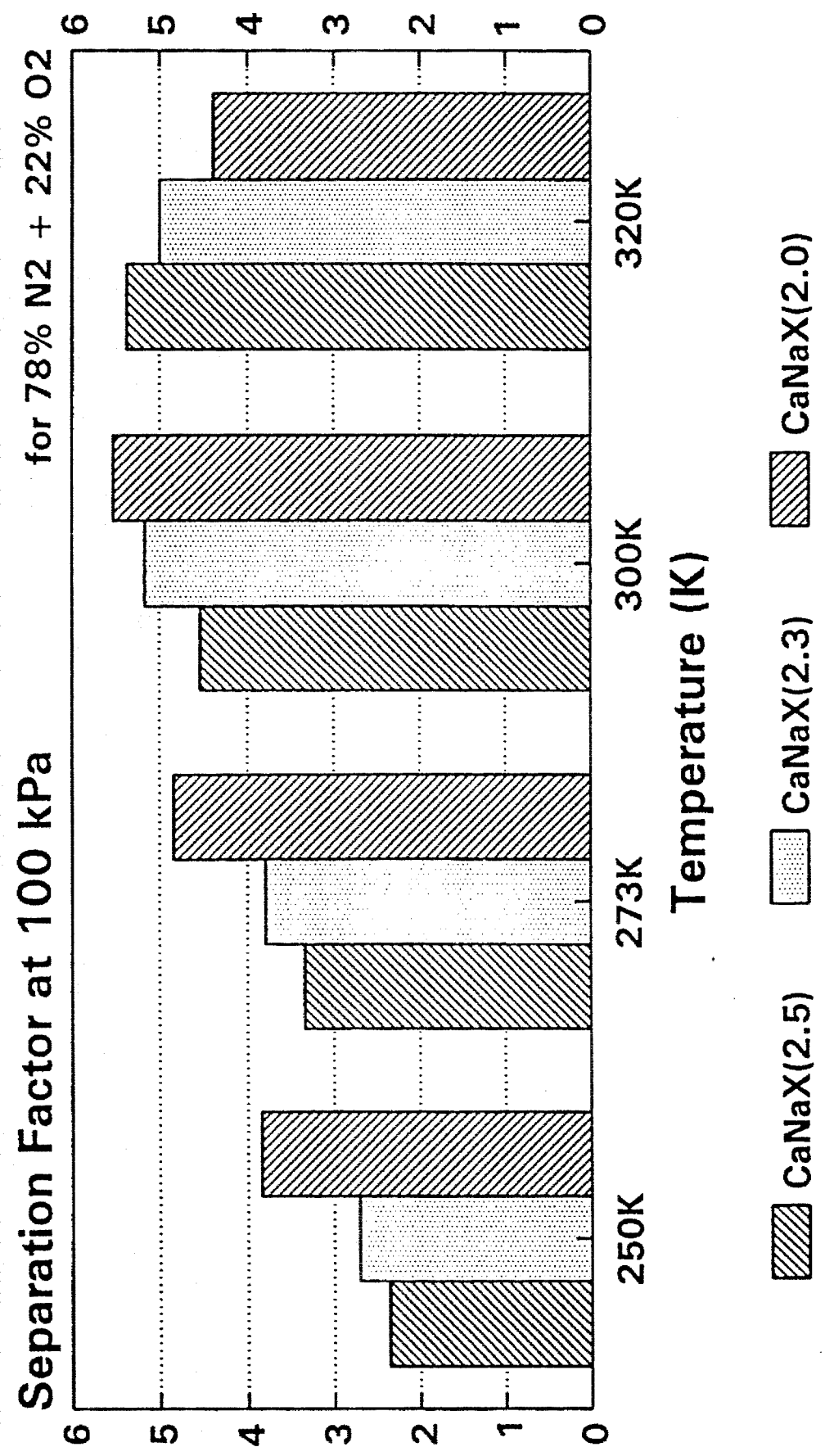
FIG. 7d is a chart illustrating the nitrogen selectivity of said adsorbents at different recited operating conditions.
Figure 7E:
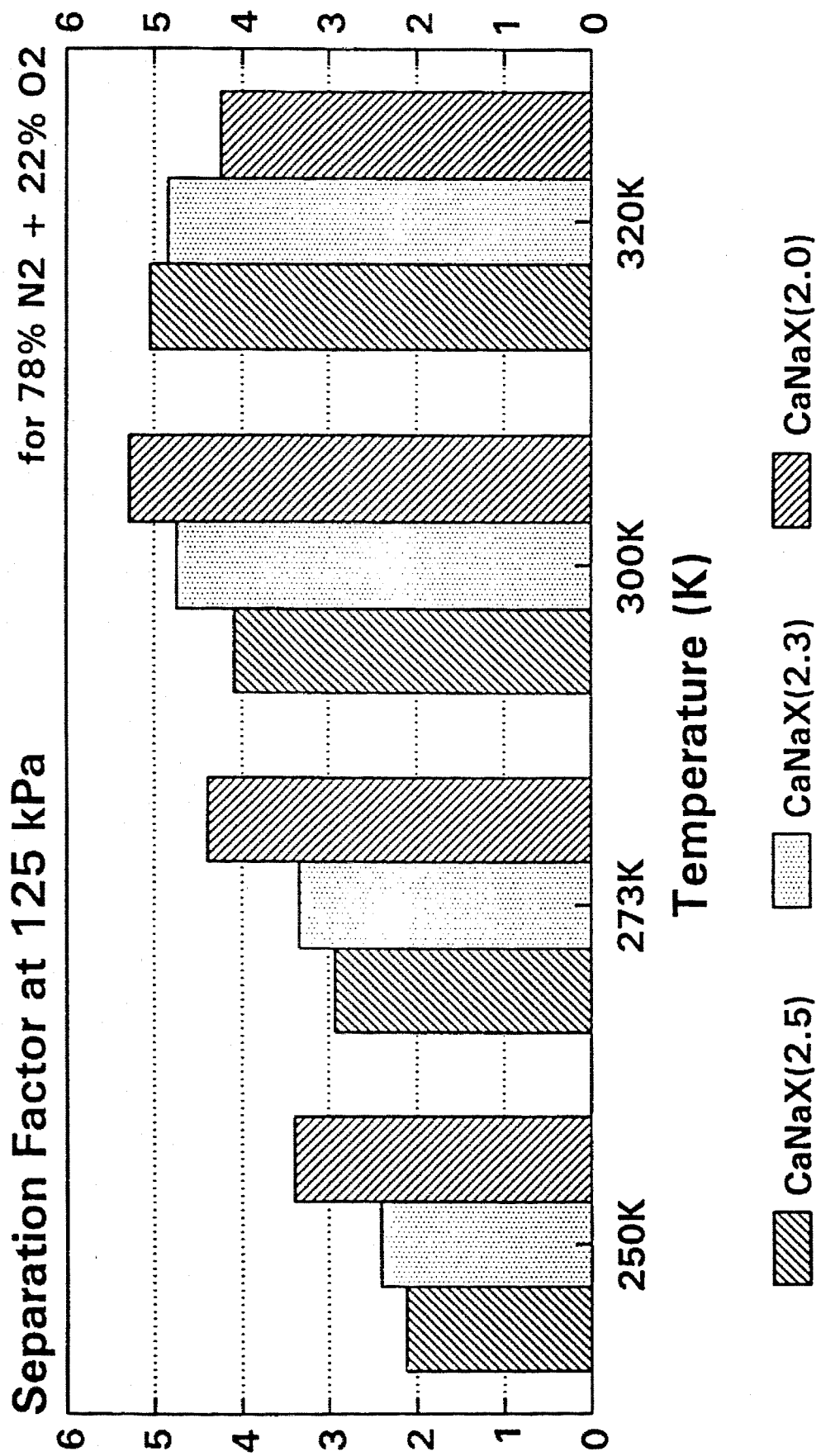
FIG. 7e is a chart illustrating the nitrogen selectivity of said adsorbents at different recited operating conditions.
Figure 7F:
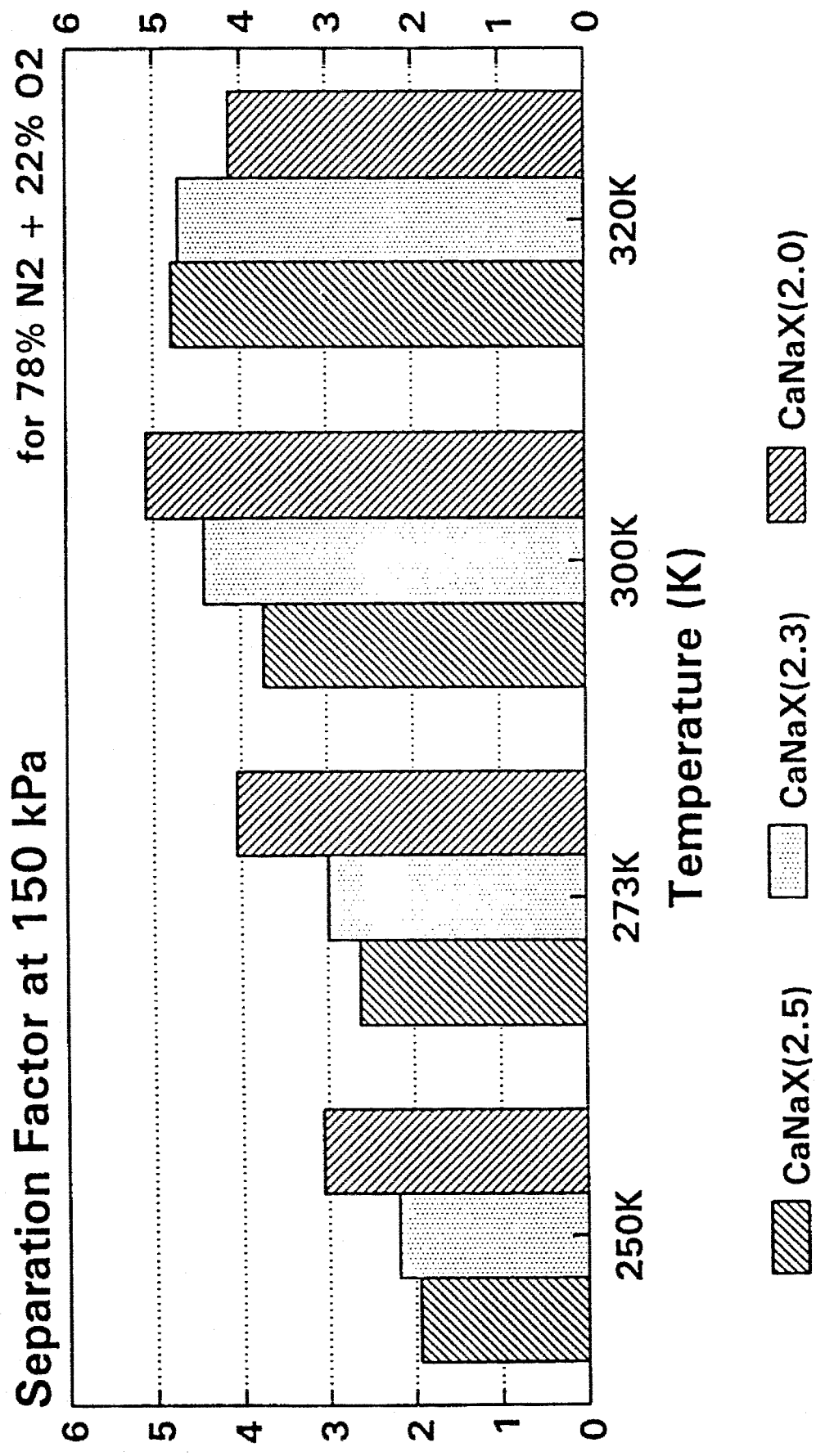
FIG. 7f is a chart illustrating the nitrogen selectivity of said adsorbents at different recited operating conditions.

The results shown in FIG. 7b and in FIG. 7c indicate surprisingly superior performance for the 2.3 material at 300K for the indicated operating conditions.

EXAMPLE 4

Figure 8A:
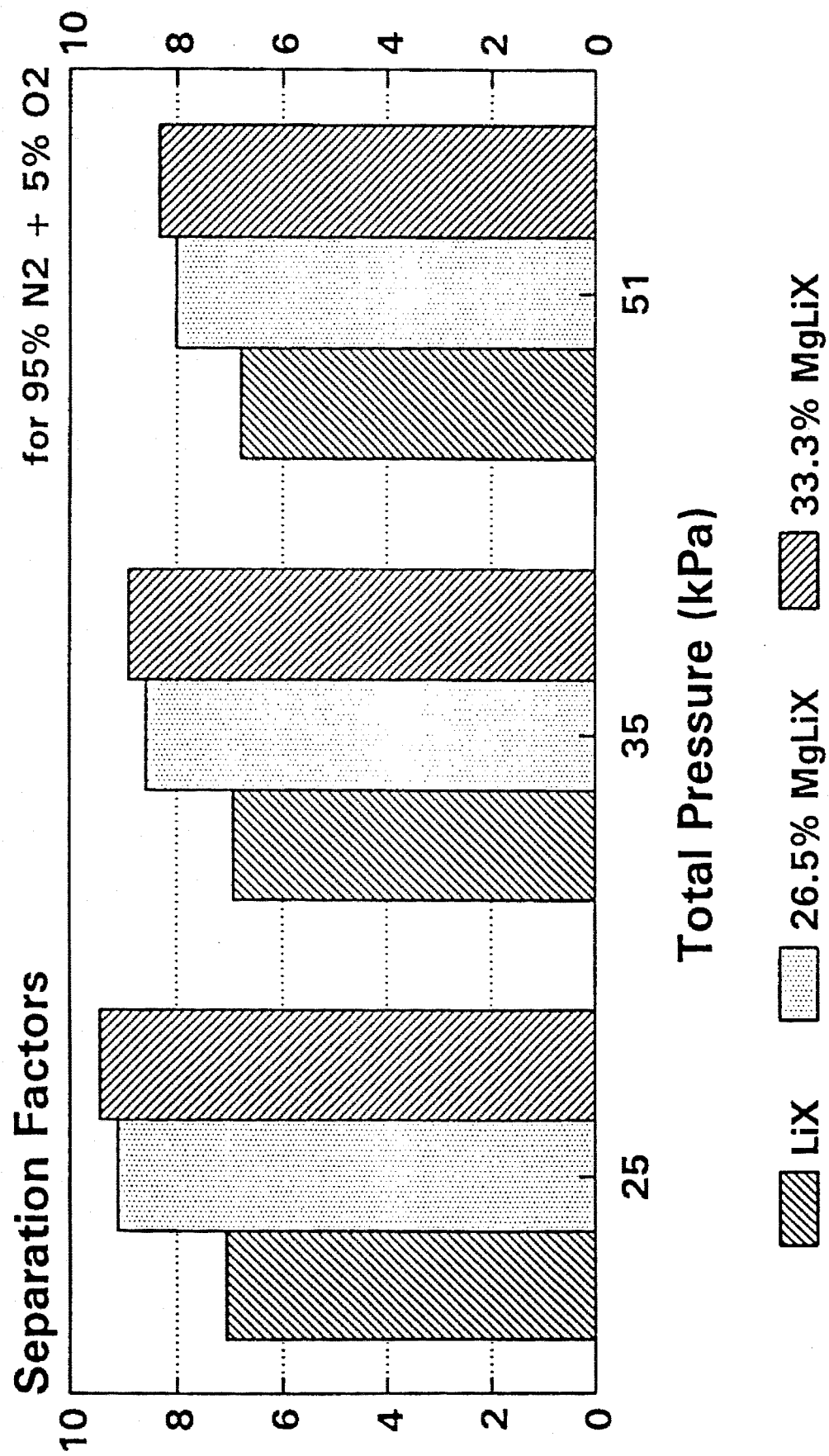
FIG. 8a is a chart illustrating the nitrogen selectivity of MgLiX (2.0) adsorbents at a preferred cation composition and a non-preferred cation composition at recited operating conditions.
Figure 8B:
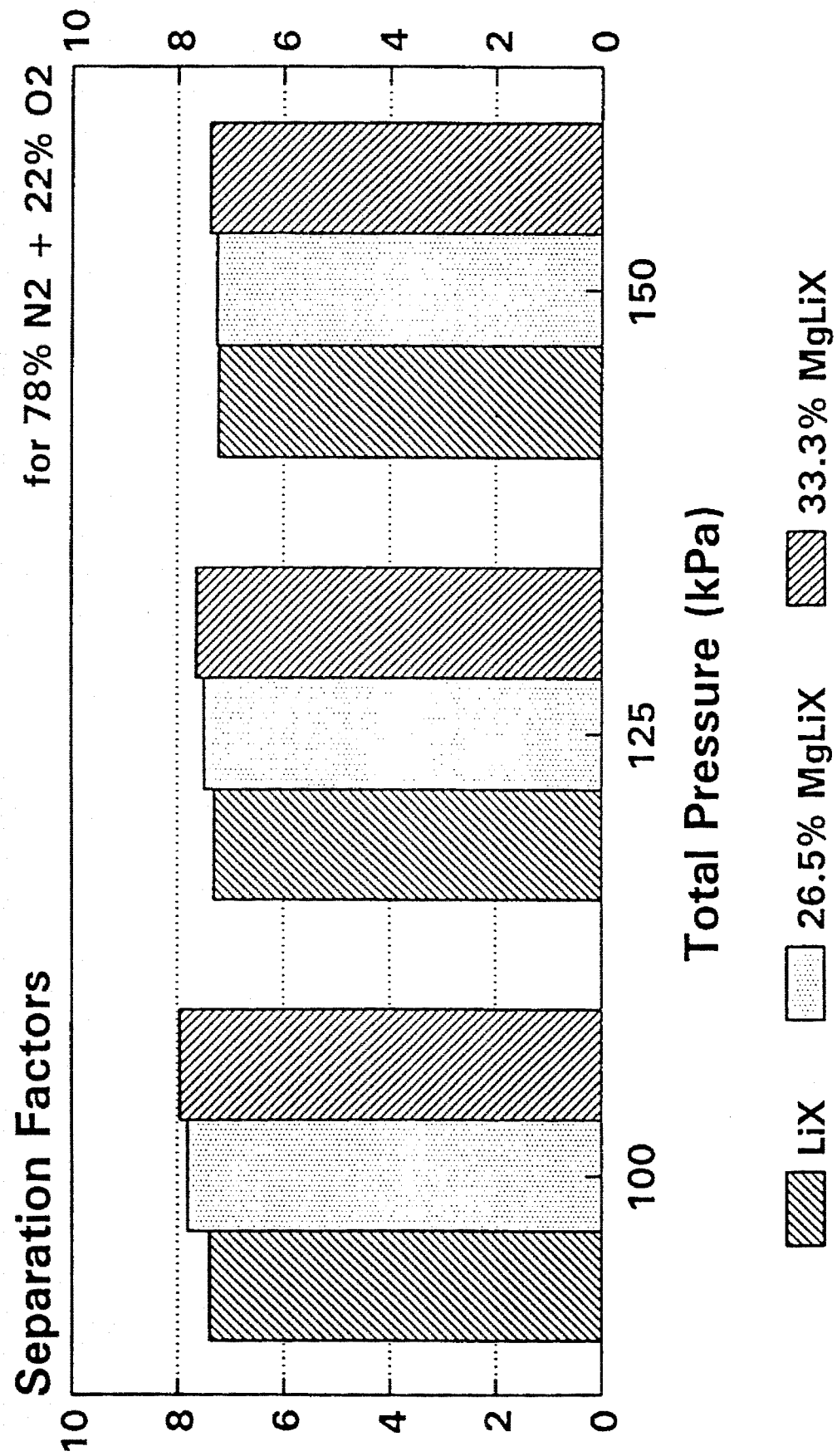
FIG. 8b is a chart illustrating the nitrogen selectivity of said adsorbents at different recited operating conditions.

This example illustrates the pattern of preferred compositions with regard to cation compositions. As shown in FIG. 8a and FIG. 8b of the drawings, the two illustrative compositions are both of the symmetric X (2.0) composition, but the 33.3% MgLiX (2.0) is a preferred cation composition as shown by Table 8 above, while the 26.5% MgLiX (2.0) is not. In all six cases tested, the preferred composition shows higher separation factors than the non-preferred one. It is clear that, for a given framework composition, the preferred cation composition can readily be identified by using the convenient methods described herein.

EXAMPLE 5

Figure 9A:
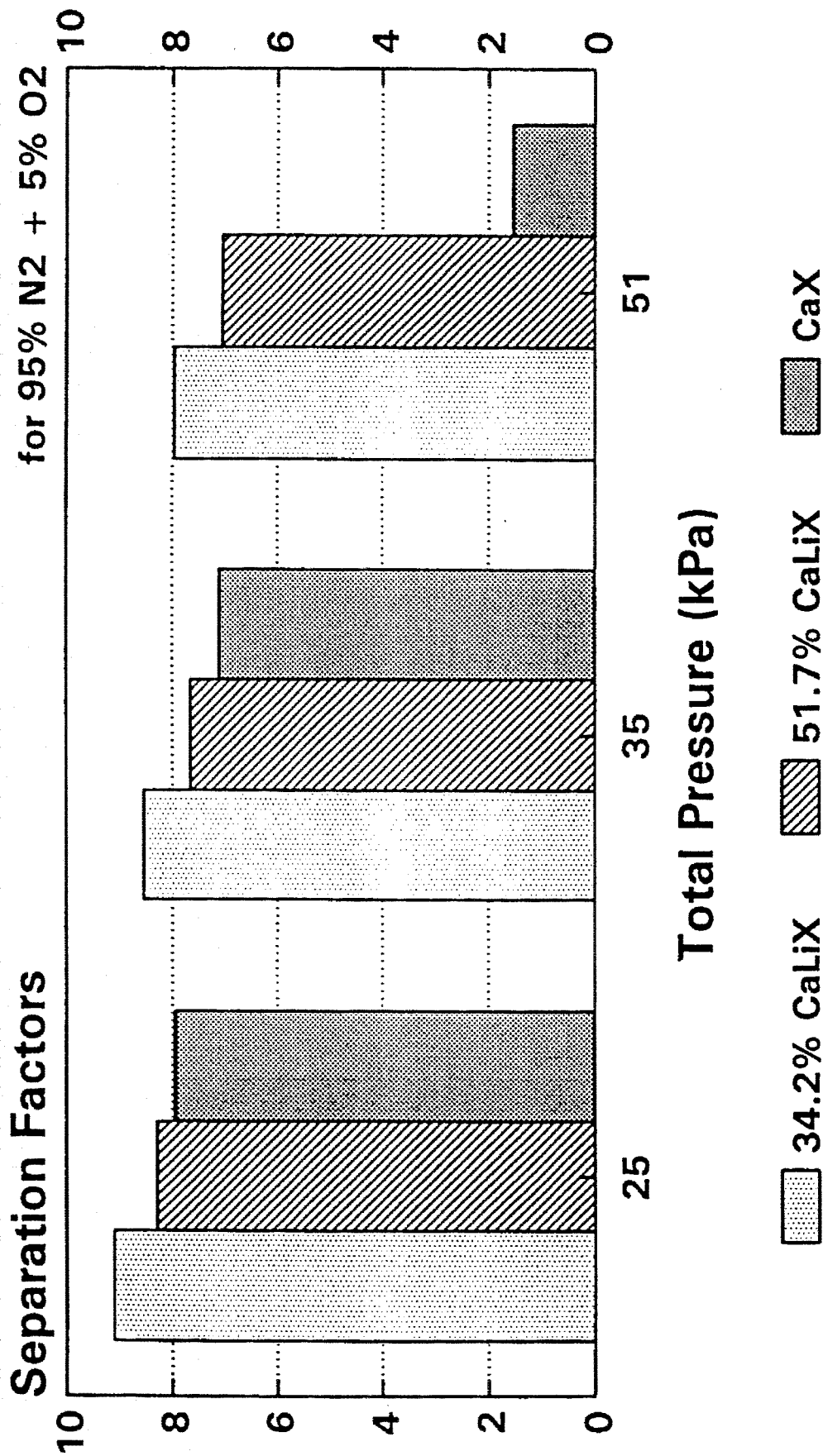
FIG. 9a is a chart illustrating the nitrogen selectivity of CaLiX (2.0) adsorbent powders at two preferred and one non-preferred cation compositions at recited operating conditions.
Figure 9B:
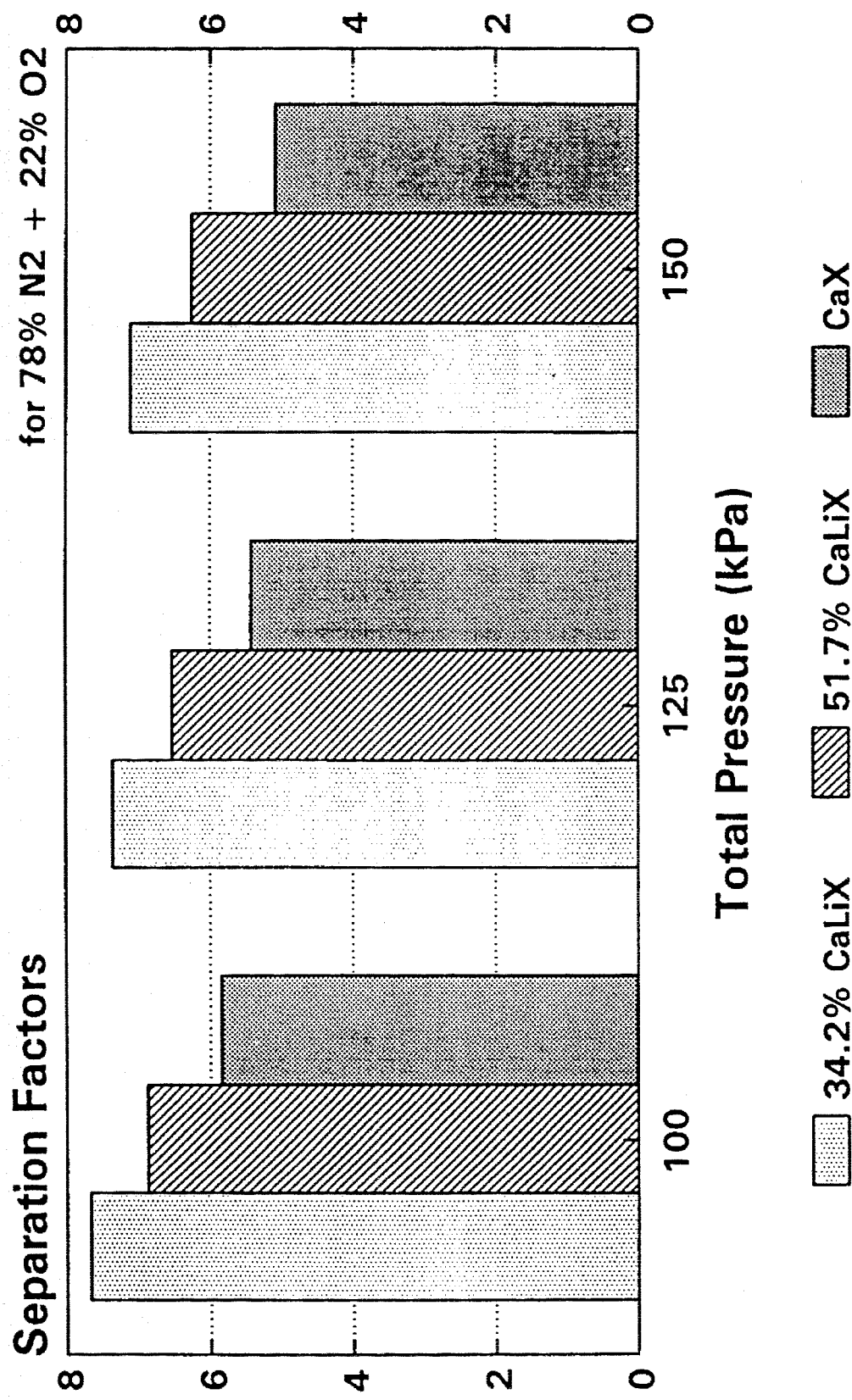
FIG. 9b is a chart illustrating the nitrogen selectivity of said adsorbents at different recited operating conditions.
Figure 10A:
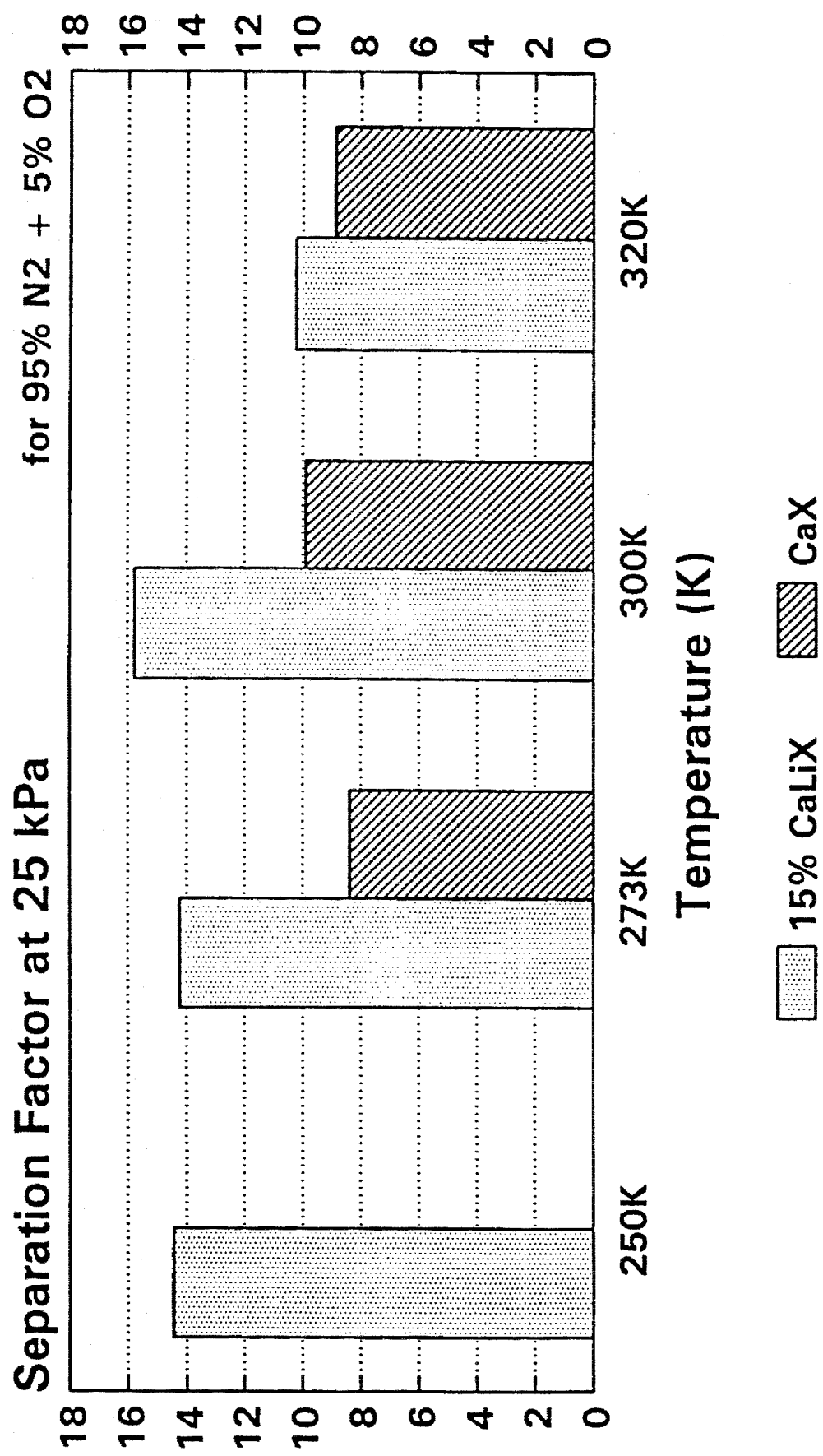
FIG. 10a is a chart illustrating the nitrogen selectivity of CaLiX (2.0) and CaX (2.0) adsorbent beads at different recited operating conditions.
Figure 10B:
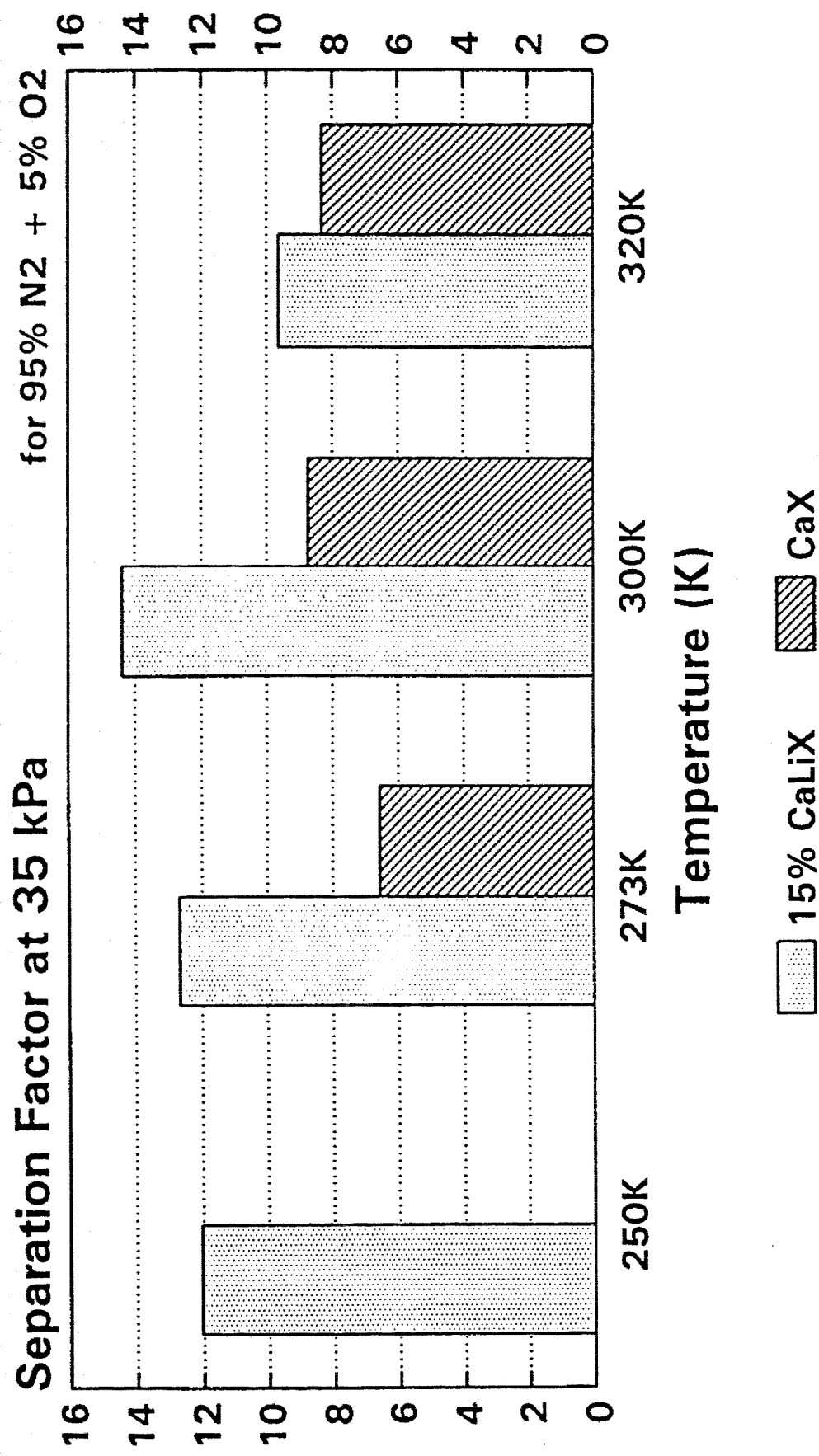
FIG. 10b is a chart illustrating the nitrogen selectivity of said adsorbents at different recited operating conditions.
Figure 10C:
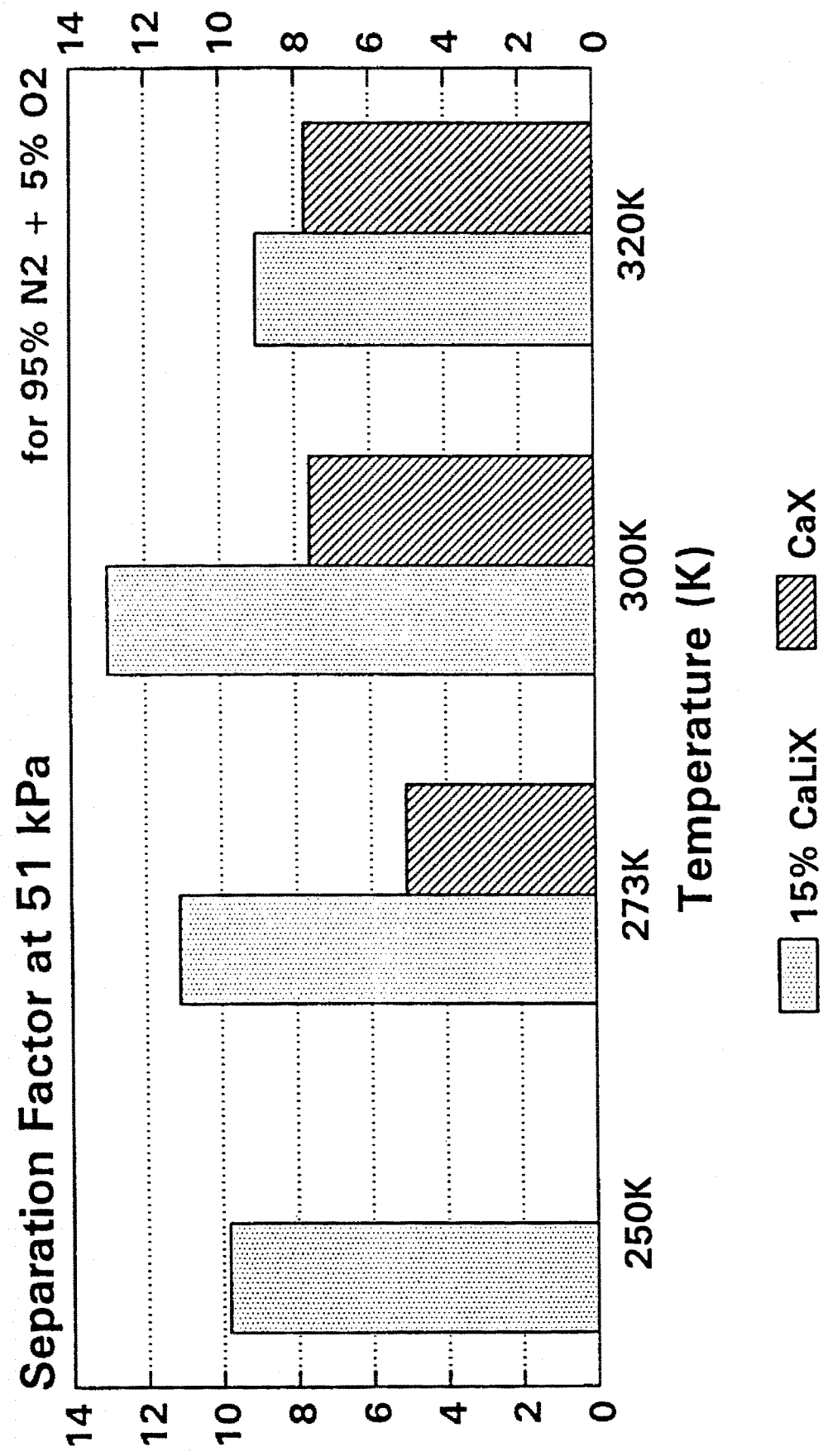
FIG. 10c is a chart illustrating the nitrogen selectivity of said adsorbents at different recited operating conditions.
Figure 10D:
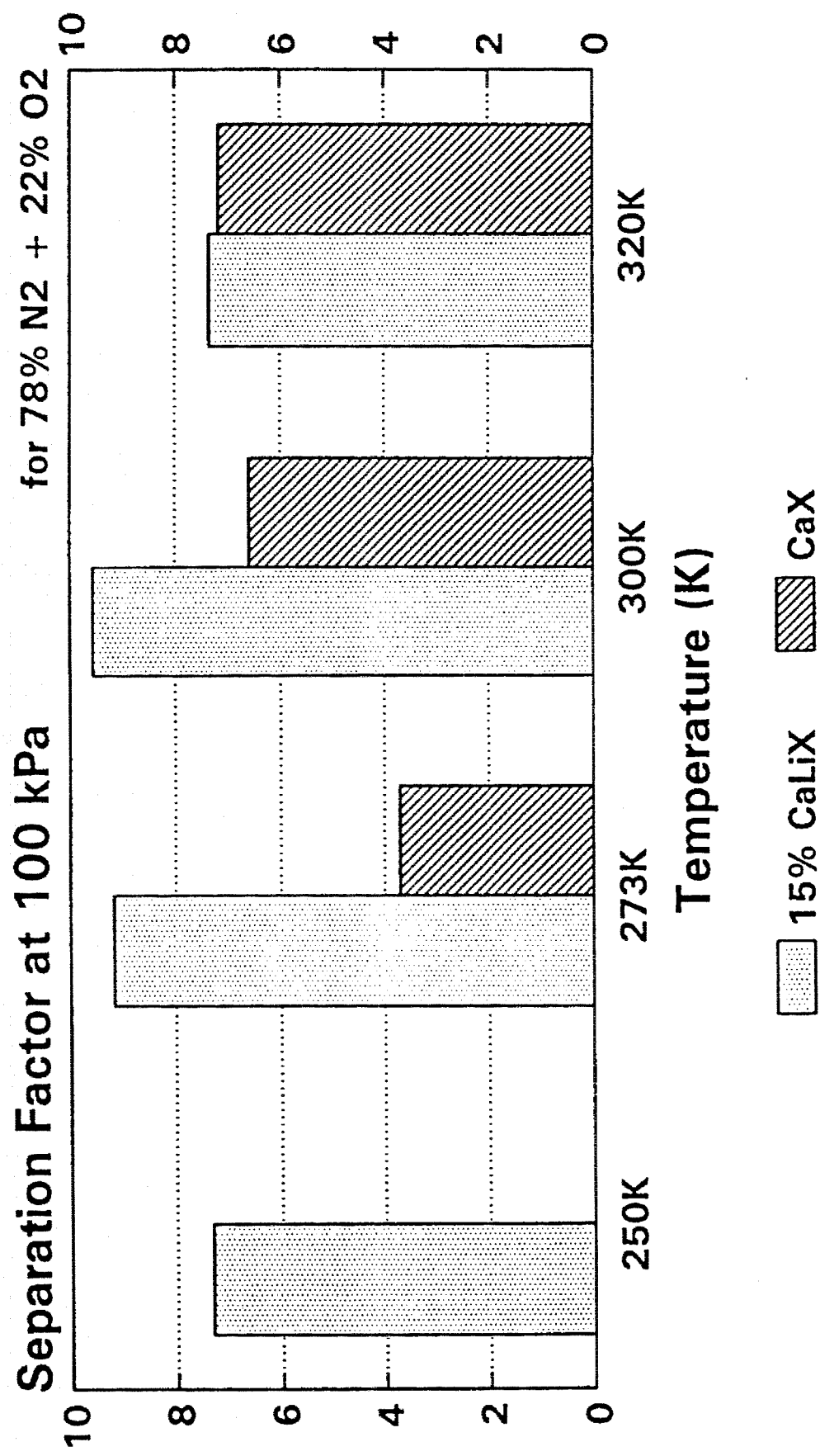
FIG. 10d is a chart illustrating the nitrogen selectivity of said adsorbents at different recited operating conditions.
Figure 10E:
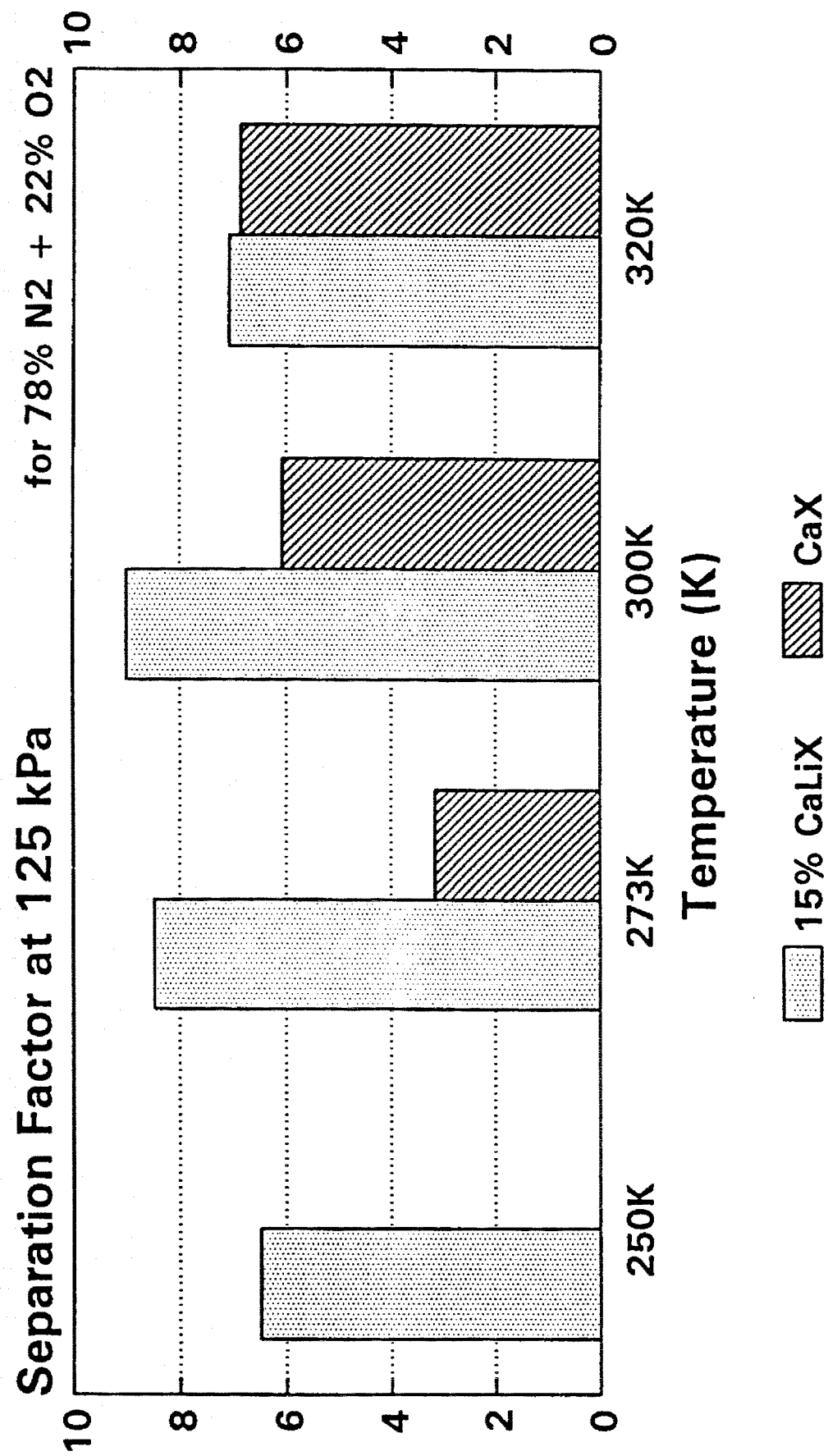
FIG. 10e is a chart illustrating the nitrogen selectivity of said adsorbents at different recited operating conditions.
Figure 10F:
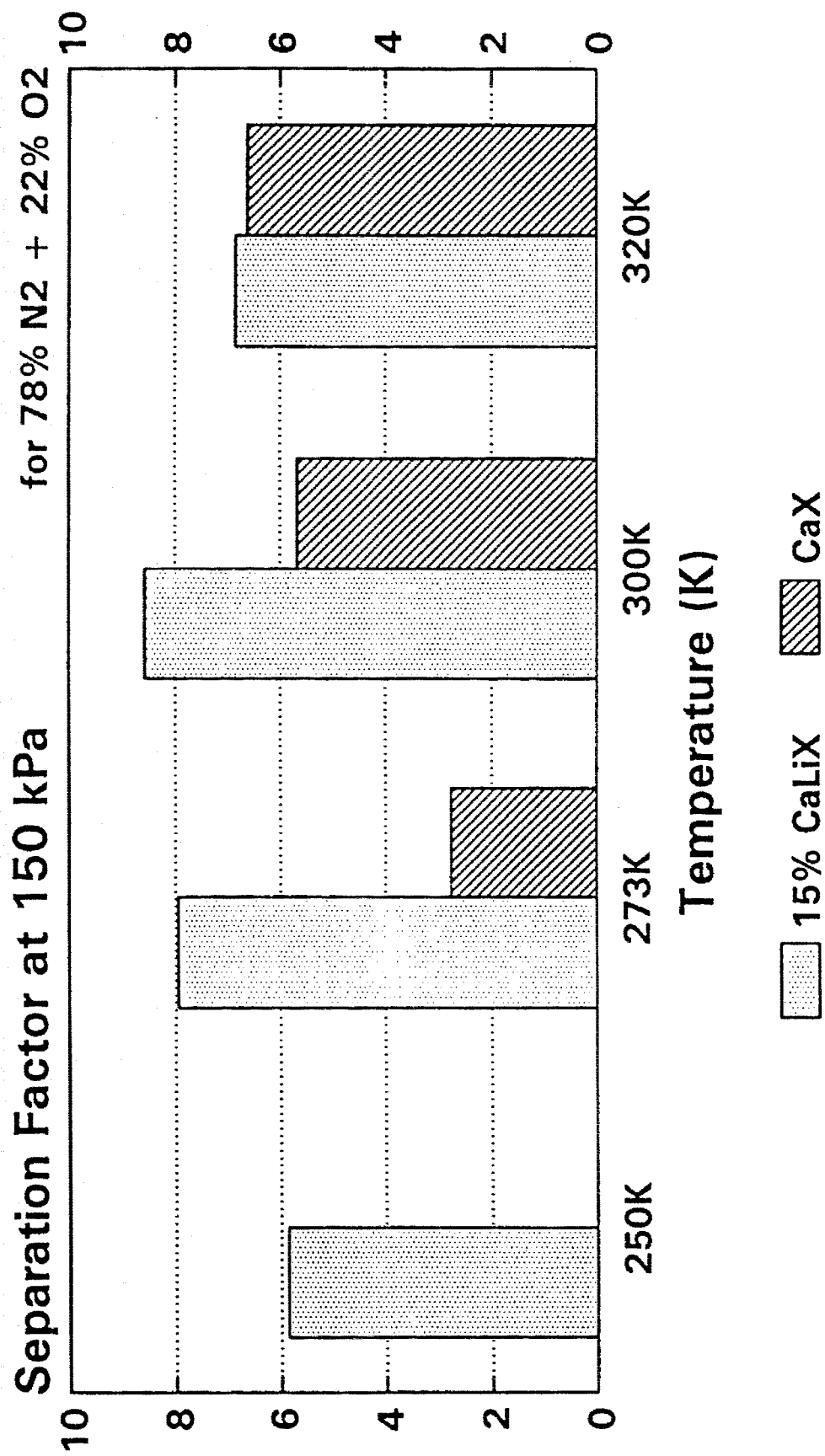
FIG. 10f is a chart illustrating the nitrogen selectivity of said adsorbents at different recited operating conditions.

Preferred vs. non-preferred cation compositions are compared in this example, the results of which are shown in FIG. 9a and FIG. 9b. Two preferred (symmetric) cation compositions of the symmetric X (2.0) composition, i.e. 34.2% CaLiX (2.0) and 51.7% CaLiX (2.0), show higher separation factors than the highly exchanged CaX (2.0), a non-preferred (non-symmetric) cation composition (as shown in Table 10) in all six cases tested.

EXAMPLE 6

This example illustrates another case of preferred v. non-preferred cation compositions. The results are shown in FIGS. 10a–10f of the drawings. Both samples used in this example are of the symmetric X (2.0) composition, but the 15% CaLiX (2.0) sample is a preferred (symmetric) cation composition (Table 10), while the highly exchanged (non-symmetric) CaX (2.0) sample is not. In all 18 cases tested, the separation factors for the 15% CaLiX (2.0) beads exceed those of the CaX (2.0) beads, as expected. No data was available for CaX (2.0) at 250K.

EXAMPLE 7

Figure 11:
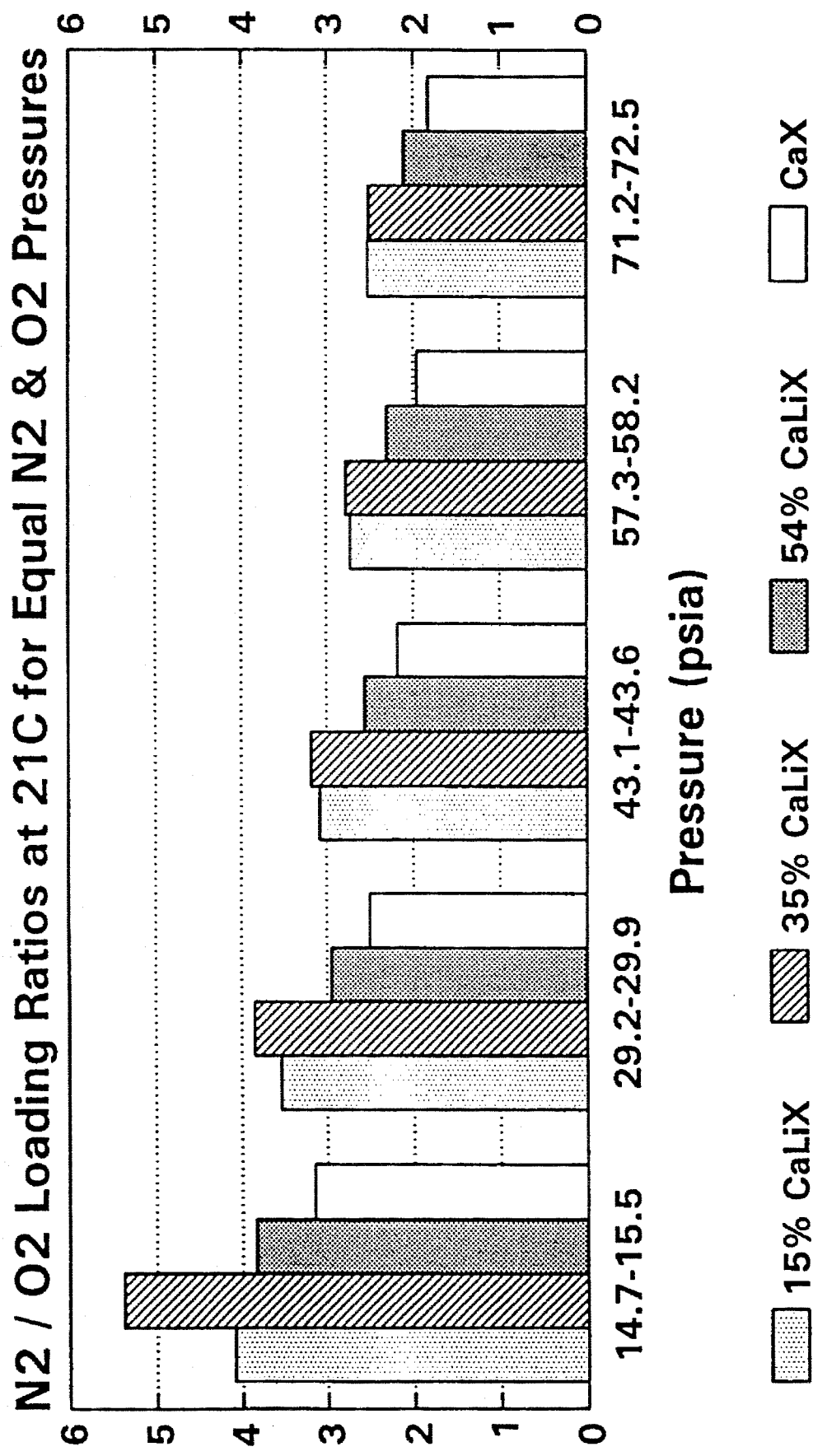
FIG. 11 is a chart illustrating the nitrogen selectivity of three different CaLiX (2.0) adsorbents and CaX (2.0) adsorbent at different recited operating conditions.

This example, the results of which are shown in FIG. 11, was taken from data in the Chao patent, U.S. Pat. No. 5,174,976 and is used to compare preferred and non-preferred cation compositions. Selectivity is expressed as $N_2/O_2$ loading ratios at 21% for equal $N_2$ and $O_2$ pressures. Four samples of the symmetric X(2.0) composition are compared: 15% CaLiX (2.0) (preferred; symmetric); 35% CaLiX (2.0) (preferred; symmetric); 54% CaLiX (2.0) (non-preferred; non-symmetric); and CaX (2.0)(non-preferred; non-symmetric). As expected, the $N_2/O_2$ loading ratios for the two preferred cation compositions are higher than those of the non-preferred cation compositions. The 54% CaLiX (2.0) sample, which is a non-preferred structure, but close to the 47.9–52.1% preferred range (Table 10), shows loading ratios in all four pressure changes in between those of the two preferred compositions, 15% CaLiX (2.0) and 35% CaLiX (2.0) and the highly non-preferred (highly exchanged) CaX (2.0 ).

TYPE X FOR AIR SEPARATION

Preferred compositions, as will be appreciated from the above, are symmetric framework/symmetric cation compositions, symmetric framework/semisymmetric cation compositions, and semisymmetric framework/semisymmetric cation compositions. Most preferred compositions presently are LiX (2.000) and LiX (2.364) for air separation purposes, with LiX (2.364) being the best performing, most preferred of the two compositions. Other cation exchanged forms of symmetric X (2.364) and X (2.000) structures will also fall within the scope of the invention, with acceptable ranges for preferred framework and cation compositions of these and other materials being as disclosed herein. The symmetric composition X (2.800), may be of particular use at lower temperatures, e.g. in self-refrigerated cycles, especially where selectivity is more important than adsorptive capacity.

Type X Compositions for Air Separation at Temperatures Near Ambient

1. X(2.000)
   a. Monovalent-Monovalent: $Li^+$ and <2.0% $Na^+$
   b. Monovalent-Divalent
      (1) $Li^+$ and
      (2) Either $Mg^{++}$ at compositions in Table 10≦68.8% $Mg^{++}$
      (3) or $Ca^{++}$ at compositions in Table 10≦52.1% $Ca^{++}$
2. X(2.364)
   a. Monovalent-Monovalent: $Li^+$ and <2.2% $Na^+$
   b. Monovalent-Divalent
      (1) $Li^+$ and
      (2) Either $Mg^{++}$ at compositions in Table 10≦75.0% $Mg^{++}$
      (3) or $Ca^{++}$ at compositions in Table 10≦56.8% $Ca^{++}$

COMPOSITIONS FOR TEMPERATURES BELOW AMBIENT

1. X(2.000)
   a. Monovalent-Monovalent
      (1) $Na^+$ and $Li^+$ at compositions in Table 5≦92.7% $Li^+$
      (2) $K^+$ and $Li^+$ at compositions in Table 5≦92.7% $Li^+$
      (3) $Na^+$ and $K^+$ at compositions in Table 5≦92.7% $K^+$
      (4) $K^+$ and $Na^+$ at compositions in Table 5≦92.7% $Na^+$
   b. Monovalent-Divalent
      (1) $Li^+$ and $Mg^{++}$ at compositions in Table 10≦18.8% $Mg^{++}$
      (2) $Li^+$ and $Ca^{++}$ at compositions in Table 10≦35.4% $Ca^{++}$
      (3) $Na^+$ and $Mg^{++}$ at compositions in Table 10≦35.4% $Mg^{++}$
      (4) $Na^+$ and $Ca^{++}$ at compositions in Table 10≦52.1% $Ca^{++}$
      (5) $K^+$ and $Mg^{++}$ at compositions in Table 10≦52.1% $Mg^{++}$
      (6) $K^+$ and $Ca^{++}$ at compositions in Table 10≦68.8% $Ca^{++}$
2. X.(2.364)
   a. Monovalent-Monovalent
      (1) $Na^+$ and $Li^+$ at compositions in Table 5≦92.0% $Li^+$
      (2) $K^+$ and $Li^+$ at compositions in Table 5≦92.0% $Li^+$
      (3) $Na^+$ and $K^+$ at compositions in Table 5≦92.0% $K^+$
      (4) $K^+$ and $Na^+$ at compositions in Table 5≦92.0% $Na^+$
   b. Monovalent-Divalent
      (1) $Li^+$ and $Mg^{++}$ at compositions in Table 10≦20.5% $Mg^{++}$
      (2) $Li^+$ and $Ca^{++}$ at compositions in Table 10≦38.6% $Ca^{++}$
      (3) $Na^+$ and $Mg^{++}$ at compositions in Table 10≦38.6% $Mg^{++}$
      (4) $Na^+$ and $Ca^{++}$ at compositions in Table 10≦56.8% $Ca^{++}$
      (5) $K^+$ and $Mg^{++}$ at compositions in Table 10≦56.8% $Mg^{++}$
      (6) $K^+$ and $Ca^{++}$ at compositions in Table 10≦75.0% $Ca^{++}$
3. X(2.800)
   a. Monovalent-Monovalent
      (1) $Na^+$ and $Li^+$ at compositions in Table 5≦91.3% $Li^+$
      (2) $K^+$ and $Li^+$ at compositions in Table 5≦91.3% $Li^+$ (3) Na$^+$ and K$^+$ at compositions in Table 5≦91.3% K$^+$
(4) K$^+$ and Na$^+$ at compositions in Table 5≦91.3% Na$^+$ b. Monovalent-Divalent
  (1) Li$^+$ and Mg$^{++}$ at compositions in Table 10≦22.5% Mg$^{++}$
  (2) Li$^+$ and Ca$^{++}$ at compositions in Table 10≦42.5% Ca$^{++}$
  (3) Na$^+$ and Mg$^{++}$ at compositions in Table 10≦42.5% Mg$^{++}$
  (4) Na$^+$ and Ca$^{++}$ at compositions in Table 10≦62.5% Ca$^{++}$
  (5) K$^+$ and Mg$^{++}$ at compositions in Table 10≦62.5% Mg$^{++}$
  (6) K$^+$ and Ca$^{++}$ at compositions in Table 10≦82.4% Ca$^{++}$ Type A Compositions for Air Separation at Temperatures Near Ambient 1. A(2.000)
a. Monovalent-Monovalent: Li$^+$ and <2.0% Na$^+$
b. Monovalent-Divalent
  (1) Li$^+$ and
  (2) Either Mg$^{++}$ at compositions in Table 10≦68.8% Mg$^{++}$
  (3) Or Ca$^{++}$ at compositions in Table 10≦52.1% Ca$^{++}$ 2. A(2.364.)
a. Monovalent-Monovalent: Li$^+$ and <2.2% Na$^+$
b. Monovalent-Divalent
  (1) Li$^+$ and
  (2) Either Mg$^{++}$ at compositions in Table 10≦75.0% Mg$^{++}$
  (3) Or Ca$^{++}$ at compositions in Table 10≦56.8% Ca$^{++}$

COMPOSITIONS FOR TEMPERATURES BELOW AMBIENT

1. A(2.364)
a. Monovalent-Monovalent
  (1) Na$^+$ and Li$^+$ at compositions in Table 5≦92.0% Li$^+$
  (2) K$^+$ and Li$^+$ at compositions in Table 5≦92.0% Li$^+$
b. Monovalent-Divalent
  (1) Li$^+$ and Mg$^{++}$ at compositions in Table 10≦20.5% Mg$^{++}$
  (2) Li$^+$ and Ca$^{++}$ at compositions in Table 10≦38.6% Ca$^{++}$
  (3) Na$^+$ and Mg$^{++}$ at compositions in Table 10≦38.6% Mg$^{++}$
  (4) Na$^+$ and Ca$^{++}$ at compositions in Table 10≦56.8% Ca$^{++}$ Type X Compositions for Air Prepurification 1. X(2.800)
a. Monovalent-Monovalent
  (1) Na$^+$ and Li$^+$ at compositions in Table 5≦91.3% Li$^+$
  (2) K$^+$ and Li$^+$ at compositions in Table 5≦91.3% Li$^+$
  (3) Na$^+$ and K$^+$ at compositions in Table 5≦91.3% K$^+$
  (4) K$^+$ and Na$^+$ at compositions in Table 5≦91.3% Na$^+$
b. Monovalent-Divalent
  (1) Li$^+$ and Mg$^{++}$ at compositions in Table 10≦22.5% Mg$^{++}$
  (2) Li$^+$ and Ca$^{++}$ at compositions in Table 10≦42.5% Ca$^{++}$
  (3) Na$^+$ and Mg$^{++}$ at compositions in Table 10≦42.5% Mg$^{++}$
  (4) Na$^+$ and Ca$^{++}$ at compositions in Table 10≦62.5% Ca$^{++}$
  (5) and Mg$^{++}$ at compositions in Table 10≦62.5% Mg$^{++}$
  (6) and Ca$^{++}$ at compositions in Table 10≦82.5% Ca$^{++}$ 2. X(2.571)
a. Monovalent-Monovalent
  (1) Na$^+$ and Li$^+$ at compositions in Table 5≦96.4% Li$^+$
  (2) K$^+$ and Li$^+$ at compositions in Table 5≦96.4% Li$^+$
  (3) Na$^+$ and K$^+$ at compositions in Table 5≦96.4% K$^+$
  (4) K$^+$ and Na$^+$ at compositions in Table 5≦96.4% Na$^+$
b. Monovalent-Divalent
  (1) Li$^+$ and Mg$^{++}$ at compositions in Table 10≦21.4% Mg$^{++}$
  (2) Li$^+$ and Ca$^{++}$ at compositions in Table 10≦40.5% Ca$^{++}$
  (3) Na$^+$ and Mg$^{++}$ at compositions in Table 10≦40.5% Mg$^{++}$
  (4) Na$^+$ and Ca$^{++}$ at compositions in Table 10≦59.5% Ca$^{++}$
  (5) K$^+$ and Mg$^{++}$ at compositions in Table 10≦59.5% Mg$^{++}$
  (6) K$^+$ and Ca$^{++}$ at compositions in Table 10≦78.6% Ca$^{++}$ 3. X(3.053)
a. Monovalent-Monovalent
  (1) Na$^+$ and Li$^+$ at compositions in Table 5≦96.1% Li$^+$
  (2) K$^+$ and Li$^+$ at compositions in Table 5≦96.1% Li$^+$
  (3) Na$^+$ and K$^+$ at compositions in Table 5≦96.1% K$^+$
  (4) K$^+$ and Na$^+$ at compositions in Table 5≦96.1% Na$^+$
b . Monovalent-Divalent
  (1) Li$^+$ and Mg$^{++}$ at compositions in Table 10≦23.7% Mg$^{++}$
  (2) Li$^+$ and Ca$^{++}$ at compositions in Table 10≦44.7% Ca$^{++}$
  (3) Na$^+$ and Mg$^{++}$ at compositions in Table 10≦44.7% Mg$^{++}$
  (4) Na$^+$ and Ca$^{++}$ at compositions in Table 10≦65.8% Ca$^{++}$
  (5) K$^+$ and Mg$^{++}$ at compositions in Table 10≦65.8% Mg$^{++}$
  (6) K$^+$ and Ca$^{++}$ at compositions in Table 10≦86.8% Ca$^{++}$ TYPE Y Compositions for Air Prepurification 1. Y(3.333)
a. Monovalent-Monovalent
  (1) Na$^+$ and Li$^+$ at compositions in Table 5≦90.3% Li$^+$
  (2) K$^+$ and Li$^+$ at compositions in Table 5≦90.3% Li$^+$
  (3) Na$^+$ and K$^+$ at compositions in Table 5≦90.3% K$^+$
  (4) K$^+$ and Na$^+$ at compositions in Table 5≦90.3% Na$^+$
b. Monovalent-Divalent
  (1) Li$^+$ and Mg$^{++}$ at compositions in Table 10≦25.0% Mg$^{++}$
  (2) Li$^+$ and Ca$^{++}$ at compositions in Table 10≦47.2% Ca$^{++}$
  (3) Na$^+$ and Mg$^{++}$ at compositions in Table 10≦47.2% Mg$^{++}$
  (4) Na$^+$ and Ca$^{++}$ at compositions in Table 10≦69.4% Ca$^{++}$
  (5) K$^+$ and Mg$^{++}$ at compositions in Table 10≦69.4% Mg$^{++}$
  (6) K$^+$ and Ca$^{++}$ at compositions in Table 10≦88.9% Ca$^{++}$ Various combinations of preferred framework and cation compositions of X, Y and A structures can be used in the practice of the invention. The combinations can be summarized as follows:

(1) Symmetric framework composition/symmetric cation compositions;

(2) Symmetric framework composition/semisymmetric cation compositions; and (3) Semisymmetric framework composition/semisymmetric cation compositions.

Specific preferred framework compositions for X, Y and A structures are given in Table 2. Specific preferred cation compositions are given for monovalent-monovalent, divalent-divalent, and monovalent-divalent exchange in Tables 5, 7 and 10, respectively.

Cation combinations for monovalent-monovalent exchanges are desirably taken from the groups:

(a) $H^+$, $Li^+$, $Na^+$, and $K^+$, and (b) $H^+$, $Li^+$, $Na^+$, and $K^+$.

For divalent-divalent exchange, combinations are desirably taken from the groups:

(a) $Mg^{++}$, $Ca^{++}$, $Sr^{++}$, and $Ba^{++}$, and (b) $Mg^{++}$, $Ca^{++}$, $Sr^{++}$, and $Ba^{++}$. For monovalent-divalent exchanges, combinations are desirably taken from the groups:

(a) $H^+$, $Li^+$, $Na^+$, and $K^+$, and (b) $Mg^{++}$, $Ca^{++}$, $Sr^{++}$, and $Ba^{++}$.

It will be understood that the selection of cations for the present invention should avoid certain combinations of larger ions such as $K^+$, $Sr^{++}$, $Ba^{++}$, especially in the A structure, where rate selectivity occurs due to blockage of the α-cage windows.

It will be understood that various changes and modifications can be made in the details of the invention as described herein without departing from the scope of the invention as set forth in the appended claims. It will be appreciated that the zeolites of preferred compositions described herein can be prepared by known hydrothermal synthesis of the preferred framework structure, followed by ion exchange if needed. Typically the framework structure will be prepared in its alkali metal form, e.g. sodium X. In some cases, it may be necessary to convert one alkali metal form to another, for example, potassium X to sodium X, as taught by Chao in U.S. Pat. No. 4,859,217.

Typical synthetic routes for the framework structures of X, Y, A and high silica X and Y include an alumina source, a silica source, a hydroxide source and water. The stoichiometry of the final product is determined by the nature and properties of the reactants and the crystallization conditions employed in accordance with conventional methods well known in the art. The resulting zeolite powders can be ion exchanged directly, but for PSA applications, the powders are usually aggregated in beaded or extrudate form using commonly available binders.

The binders used to aggregate the zeolites may include clays, silica, alumina metal oxides and mixtures thereof. In addition, the zeolites may be formed with materials such as silica, alumina, silica-alumina, silica-magnesia, silica-zirconia, silica-theria, silica-berylia and silica-titania, as well as ternary compositions, such as silica-alumina-theria, silica-alumina-zirconia and clays present as binders. The relative proportions of the above materials and the zeolites may vary widely with the zeolite content ranging from about 1 to about 99% by weight of the composite. When the zeolite is to be formed into aggregates prior to use, such aggregates are desirably about 1 to about 4 mm in diameter.

Ion exchange is performed on the framework zeolites by contacting the powders or aggregated forms with an aqueous solution of the metal salt. As is well known in the art, the ion concentration, reaction temperature and pH conditions employed will control the final composition of the product. In the absence of established ion exchange isotherms, empirical methods are used to obtain exact cation compositions. Such ion exchange techniques are well known and widely practiced in the art, and are disclosed, for example, in patents such as Chao et al., U.S. Pat. Nos. 5,174,979, Chao, 4,859,217, and Coe et al., U.S. Pat. No. 5,152,813.

It is also known in the art that proper thermal activation of molecular sieves is used to attain optimum performance. A thermal activation overnight at about 350° C. under vacuum conditions, with the temperature being raised slowly over several hours, commencing with ambient temperature, is generally sufficient. Examples of various activation conditions are also disclosed in the three patents referred to above.

In addition to air separation, for the production of oxygen or nitrogen, and air prepurification, for the removal of water, $C_2$ or other impurities, the invention can also be used for various other gas separation processes in which the separation of major or minor constituents from bulk gas streams is desired. The major or minor constituents could be nitrogen, methane, carbon monoxide, carbon dioxide, or mixtures thereof, while the bulk gases could be argon, hydrogen, helium, krypton, neon, or mixtures thereof.

The practice of the invention enables air separation and other commercially significant PSA gas separation operations to be carried out advantageously using preferred zeolitic adsorbent compositions. The symmetrical features for framework compositions and cation compositions of preferred zeolite adsorbents enables preferred adsorbents to be selected for desirable PSA gas separation operations, limiting the number of experiments needed to optimize a particular gas separation operation and enabling lower cost compositions to be advantageously employed, resulting in substantial savings in any given air separation or other important PSA gas separation operation.

We claim:

1. An enhanced process for the selective adsorption of a more readily adsorbable component of a gas mixture containing said component and a less readily adsorbable component in an adsorption system containing at least one bed of adsorbent material capable of selectively adsorbing the more readily adsorbable component from the gas mixture, each bed in said adsorption system undergoing, on a cyclic basis, a processing sequence comprising:

(a) introducing the gas mixture at an upper adsorption pressure to said bed containing adsorbent material comprising an X or A type zeolitic adsorbent composition having true unit cells of 8 β-cages, each true unit cell having a symmetrical framework composition and a symmetrical cation composition, said symmetrical cation composition being monovalent, divalent, or mixtures thereof, said symmetrical framework composition having an equal average number of Al atoms per β-cage in all 8 β-cages of each true unit cell and said symmetrical cation composition having the same average number of either monovalent or divalent cations, or of mixtures of each type, distributed in each β-cage of the true unit cell, said symmetrical framework composition having a $SiO_2/Al_2O_3$ ratio from about 2.741 to about 2.861;

(b) depressurizing the bed by the release of gas therefrom so as to decrease the pressure in the bed from said upper adsorption pressure to a lower desorption pressure so as to desorb said more readily adsorbable component and pass it from the bed;

(c) repressurizing the bed from the lower desorption pressure to said upper adsorption pressure; and (d) introducing additional quantities of the feed gas mixture to the bed as the cyclic processing sequence is carried out in each bed in the adsorption system, whereby enhanced equilibrium selectivity for the adsorption of the more readily adsorbable component of the gas mixture is achieved.

2. The process of claim 1 in which said gas mixture comprises air.

3. The process of claim 1 in which said zeolitic adsorbent composition comprises LiX (about 2.800) adsorbent.

4. The process of claim 1 in which said zeolitic adsorbent composition comprises CaLiX (about 2.800) adsorbent.

5. The process of claim 1 in which said zeolitic adsorbent composition comprises CaNaX (about 2.800) adsorbent.

6. The process of claim 1 in which said zeolitic adsorbent comprises MgLiX (about 2.800) adsorbent.

7. An enhanced process for the selective adsorption of a more readily adsorbable component of a gas mixture containing said component and a less readily adsorbable component in an adsorption system containing at least one bed of adsorbent material capable of selectively adsorbing the more readily adsorbable component from the gas mixture, each bed in said adsorption system undergoing, on a cyclic basis, a processing sequence comprising:

(a) introducing the gas mixture at an upper adsorption pressure to said bed containing adsorbent material comprising an X or A type zeolitic adsorbent composition having true unit cells of 8 β-cages, each true unit cell having a symmetrical framework composition and a symmetrical cation composition, said symmetrical cation composition being monovalent, divalent, or mixtures thereof, said symmetrical framework composition having an equal average number of Al atoms per β-cage in all 8 β-cages of each true unit cell and said symmetrical cation composition having the same average number of either monovalent or divalent cations, or of mixtures of each type, distributed in each β-cage of the true unit cell, said symmetrical framework composition having a $SiO_2/Al_2O_3$ ratio from about 2.800; 3.333; 4.000; 4.857; 6.000; 7.600 or 10.000;

(b) depressurizing the bed by the release of gas therefrom so as to decrease the pressure in the bed from said upper adsorption pressure to a lower desorption pressure so as to desorb said more readily adsorbable component and pass it from the bed;

(c) repressurizing the bed from the lower desorption pressure to said upper adsorption pressure; and (d) introducing additional quantities of the feed gas mixture to the bed as the cyclic processing sequence is carried out in each bed in the adsorption system, whereby enhanced equilibrium selectivity for the adsorption of the more readily adsorbable component of the gas mixture is achieved.

8. The process of claim 7 in which said zeolitic adsorbent composition comprises LiX (about 3.333) absorbent.

9. The process of claim 7 in which said zeolitic adsorbent comprises LiX (about 4.000) adsorbent.

10. An X or A type zeolite adsorbent composition capable of enhanced selectivity for the adsorption of a more readily adsorbable component from a gas mixture and having true unit cells of 8 β-cages, each true unit having a symmetrical framework composition and a symmetrical cation composition, said symmetrical cation composition being monovalent, divalent, or mixtures thereof, said symmetrical framework composition having the same average number of Al atoms per β-cage in all 8 β-cages of each true cell unit and said symmetrical cation composition having the same average number of either monovalent or divalent cations, or of mixtures of each type, distributed in each β-cage of the true unit cell, said symmetrical framework composition having a $SiO_2/Al_2O_3$ ratio from about 2.741 to about 2.861.

11. The zeolite adsorbent composition of claim 10 in which said zeolite adsorbent composition comprises LiX.

12. The zeolite adsorbent composition of claim 10 in which said zeolite adsorbent composition comprises CaLiX adsorbent.

13. The zeolite adsorbent composition of claim 10 in which said zeolite adsorbent composition comprises CaNaA adsorbent.

14. The zeolite adsorbent composition of claim 10 in which said zeolite adsorbent composition comprises MgLiX adsorbent.

15. The zeolite composition of claim 10 in which said adsorbent is of the A or X type, each true unit cell has a symmetrical framework, with a $SiO_2/Al_2O_3$ ratio of about 2.800.

* * * * *